United States Patent [19]

Yamakawa

[11] Patent Number: 5,206,718
[45] Date of Patent: Apr. 27, 1993

[54] COLOR IMAGE PROCESSOR FOR CREATING SHADOWS AND MASKS

[75] Inventor: Shinji Yamakawa, Kawasaki, Japan

[73] Assignee: Ricoh Company, Ltd., Tokyo, Japan

[21] Appl. No.: 568,716

[22] Filed: Aug. 17, 1990

[30] Foreign Application Priority Data

Aug. 19, 1989 [JP] Japan ............................. 1-212115
Aug. 23, 1989 [JP] Japan ............................. 1-214834
Mar. 26, 1990 [JP] Japan ............................. 2-73373
Jul. 20, 1990 [JP] Japan ............................. 2-190821

[51] Int. Cl.$^5$ ............................................. H04N 1/46
[52] U.S. Cl. ..................................... 358/75; 358/80; 358/461
[58] Field of Search ............... 358/452, 461, 75, 79, 358/80; 355/328, 22, 46

[56] References Cited

U.S. PATENT DOCUMENTS 4,789,892 12/1988 Tsuzuki et al. .................... 358/80
4,843,426 1/1989 Levine ............................... 355/328
4,847,689 7/1989 Yamamoto et al. ............... 358/80
4,922,332 5/1990 Taniguchi et al. ................. 358/75

Primary Examiner—Edward L. Coles, Sr.
Assistant Examiner—Jill Jackson
Attorney, Agent, or Firm—Oblon, Spivak, McClelland, Maier & Neustadt

[57] ABSTRACT

An image processing apparatus for joining a shadow to, masking, or otherwise processing a color image. When an original color image is processed to have a shadow or to be masked, for example, the processed image is adequately colored. A shadow whose color components are consistent with those of an original color image is formed in a predetermined direction. An image produced by masking is also consistent in color with an original color image. Such mask processing and shadow processing may even be executed in combination without any contradiction in color.

28 Claims, 64 Drawing Sheets

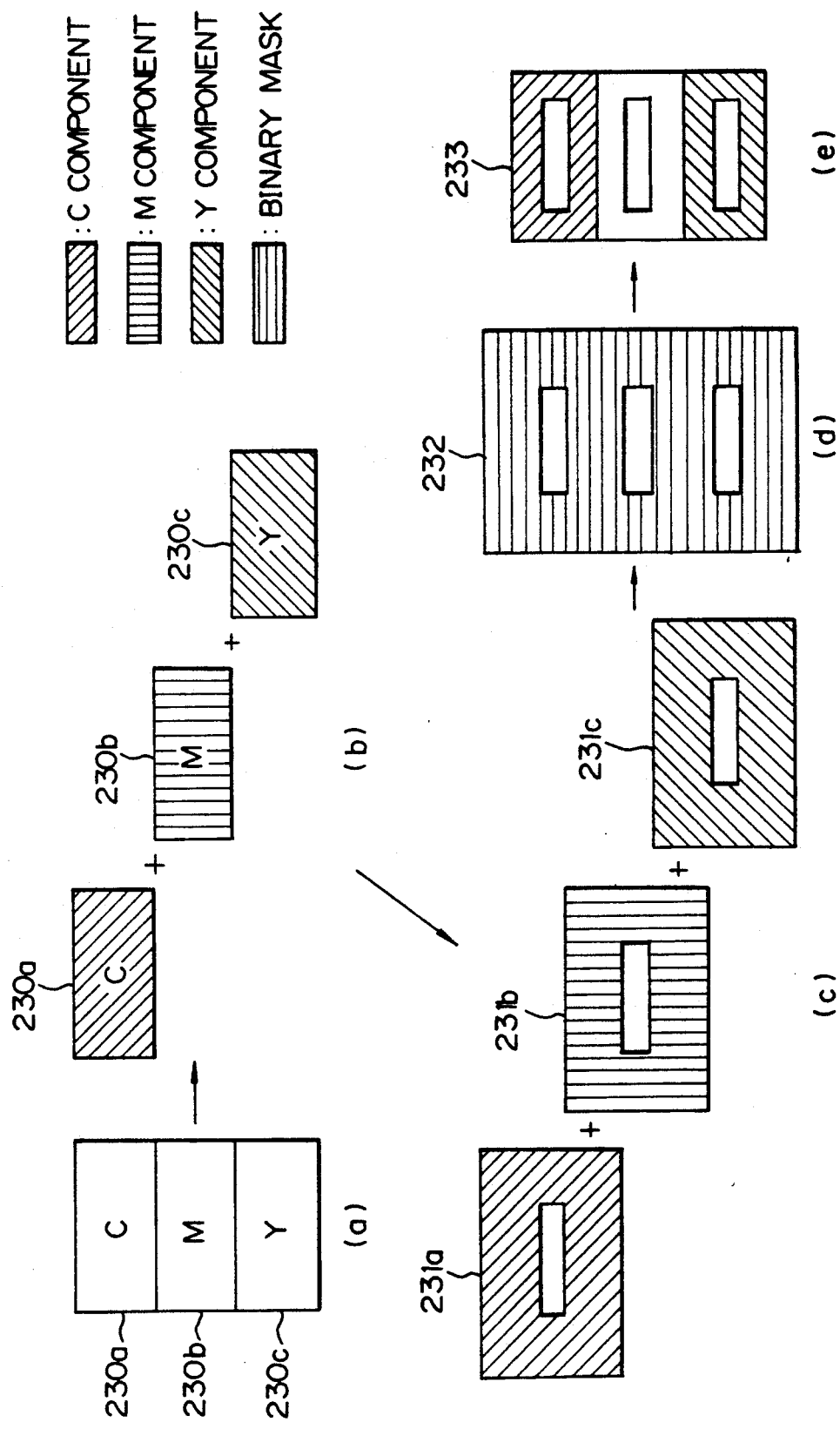

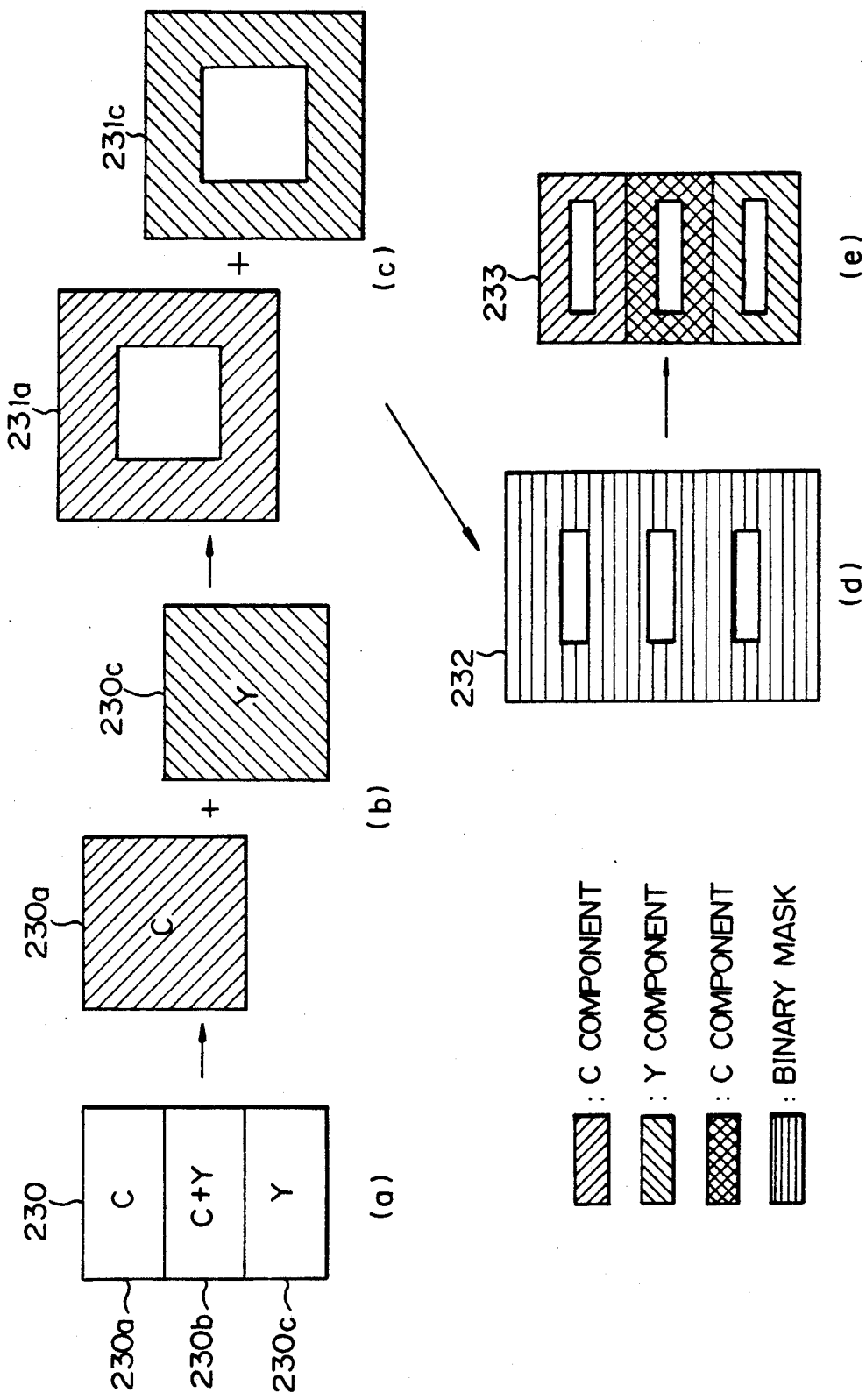

Fig. 33

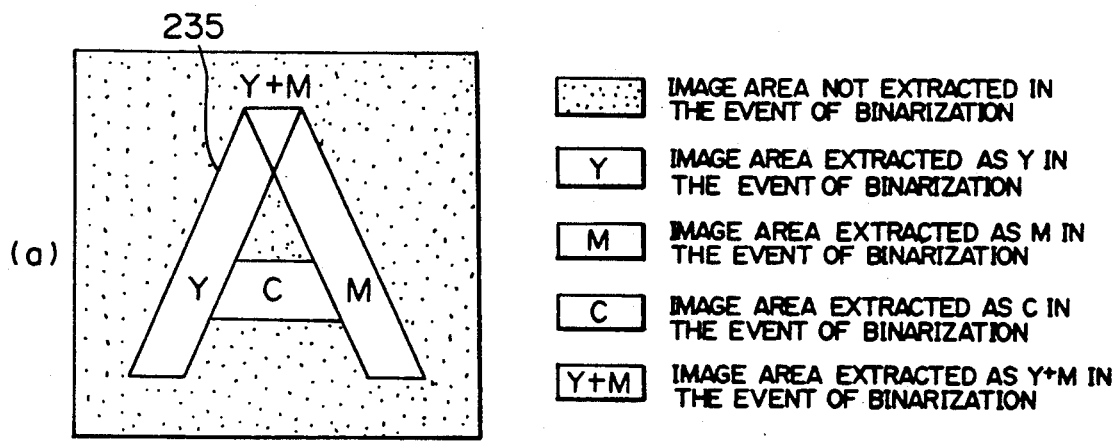

- ░░ IMAGE AREA NOT EXTRACTED IN THE EVENT OF BINARIZATION
- Y  IMAGE AREA EXTRACTED AS Y IN THE EVENT OF BINARIZATION
- M  IMAGE AREA EXTRACTED AS M IN THE EVENT OF BINARIZATION
- C  IMAGE AREA EXTRACTED AS C IN THE EVENT OF BINARIZATION
- Y+M  IMAGE AREA EXTRACTED AS Y+M IN THE EVENT OF BINARIZATION

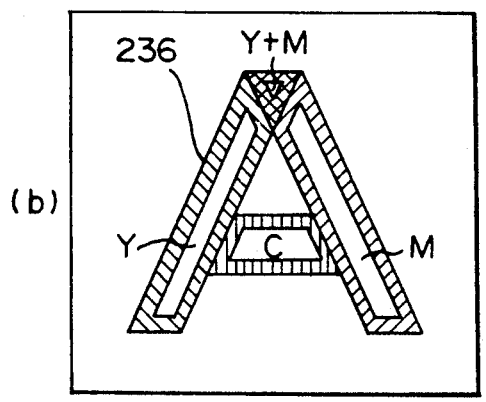
(b)

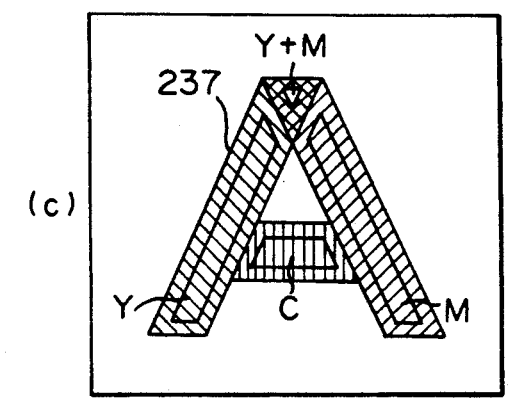
(c)

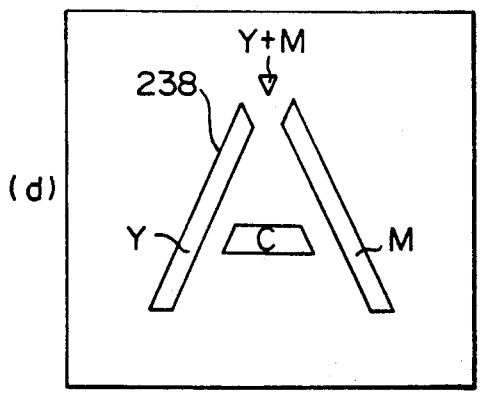
(d)

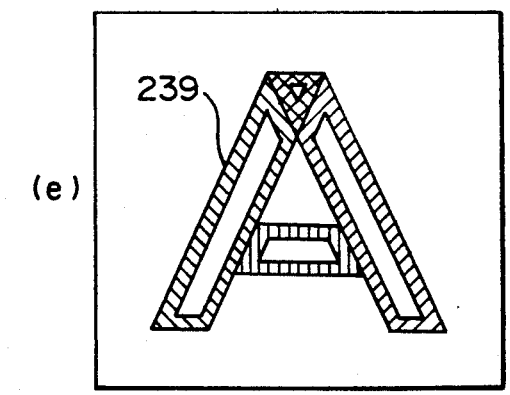
(e)

- ▨ COLOR DATA 1 OF Y
- ▨ COLOR DATA 1 OF M
- ▥ COLOR DATA 1 OF C
- ▦ COLOR DATA 1 OF Y+M
- ▨ COLOR DATA 2 OF Y
- ▨ COLOR DATA 2 OF M
- ▥ COLOR DATA 2 OF C
- ▦ COLOR DATA 2 OF Y+M

Fig. 40
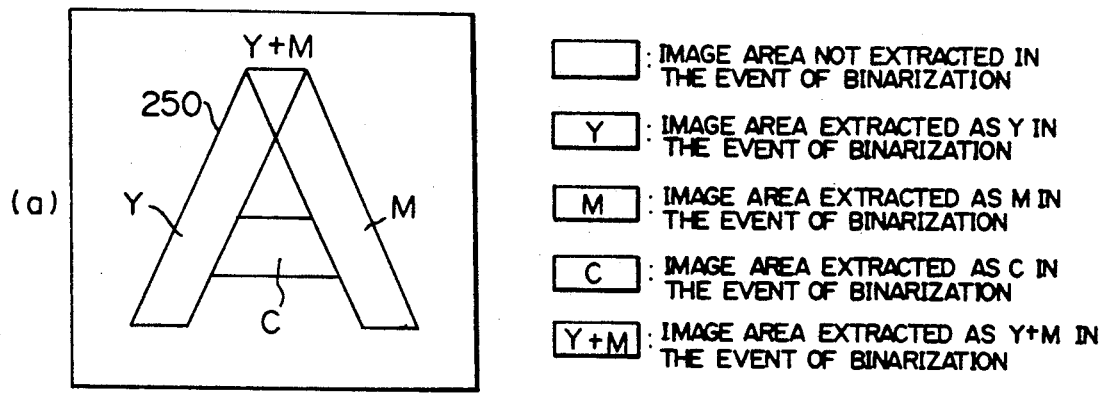
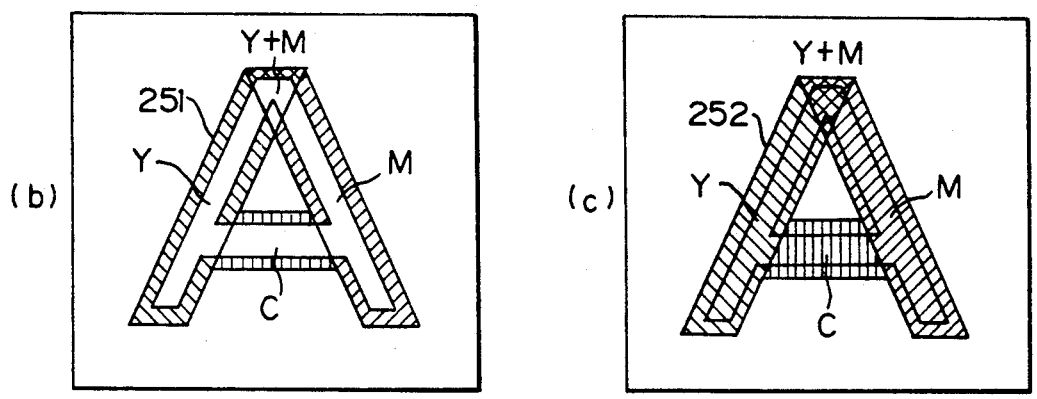
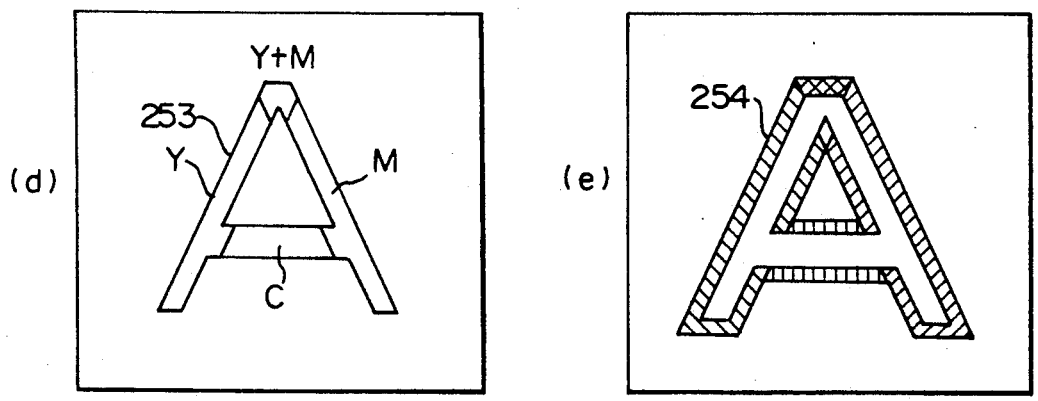

Fig.56

| 361 | 362 | 363 | 364 | 365 | 366 360 |
|---|---|---|---|---|---|
| COLOR MANIPULATE | CREATE | MOVE | BOOK ERASE | COLOR SELECTION | MAGNIFICATION CHANGE |
| | MASK | | | FULL COLOR | 100 % |
| | COLOR MODE 1mm | | | | |
| | STANDARD | | | | |

Fig. 57

| 361 | 362 | | 363 | 364 | 365 | 360 366 |
|---|---|---|---|---|---|---|
| COLOR MANIPULATE | CREATE | | MOVE | BOOK ERASE | COLOR SELECTION | MAGNIFICATION CHANGE |
| | MASK | | | | FULL COLOR | 100 % |
| | WHITE MODE 0.5mm | | | | | |
| | OPTION | | | | | |

Fig.62

| COLOR MANIPULATE | CREATE | MOVE | BOOK ERASE | COLOR SELECTION | MAGNIFICATION CHANGE |
|---|---|---|---|---|---|
| 361 | 362 | 363 | 364 | 365 | 360 / 366 |
| | SHADOW / PLAIN 5mm / STANDARD | | | FULL COLOR | 100 % |

Fig.63

| 361 | 362 | 363 | 364 | 365 | 366 360 |
|---|---|---|---|---|---|
| COLOR MANIPULATE | CREATE | MOVE | BOOK ERASE | COLOR SELECTION | MAGNIFICATION CHANGE |
|  | SHADOW <br> STEREO 3mm <br> OPTION |  |  | FULL COLOR | 100% |

Fig.65
(a)
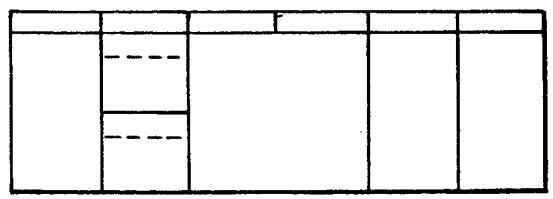
(b)
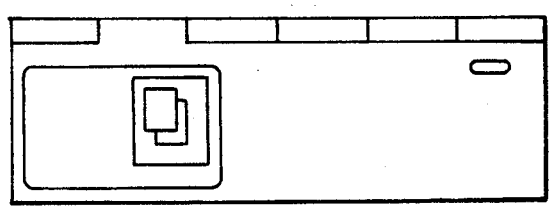
(c)
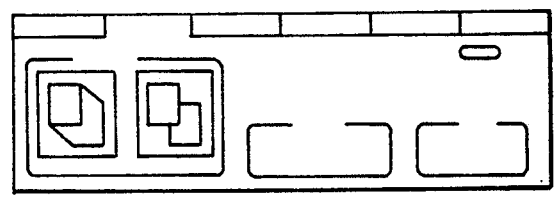
(d)
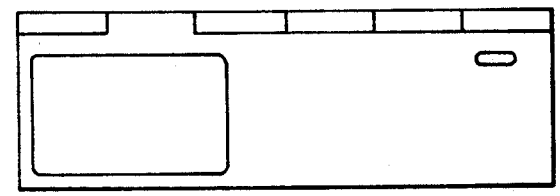
(e)
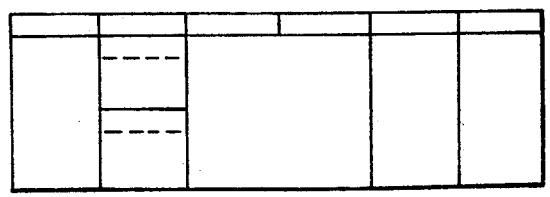

Fig.67

| 361 | 362 | 363 | 364 | 365 | 366 |
|---|---|---|---|---|---|
| COLOR MANIPULATE | CREATE | MOVE | BOOK ERASE | COLOR SELECTION | MAGNIFICATION CHANGE |
| | SHADOW | | | FULL COLOR | 100% |
| | PLAIN 5mm | | | | |
| | STANDARD | | | | |
| | MASK | | | | |
| | COLOR MODE 1mm | | | | |
| | STANDARD | | | | |

| 361 | 362 | 363 | 364 | 365 | 366 360 |
|---|---|---|---|---|---|
| COLOR MANIPULATE | CREATE | MOVE | BOOK ERASE | COLOR SELECTION | MAGNIFICATION CHANGE |
| | MASK / COLORMODE 1mm / STANDARD / SHADOW / PLAIN 5mm / STANDARD | | | FULL COLOR | 100% |

COLOR IMAGE PROCESSOR FOR CREATING SHADOWS AND MASKS

BACKGROUND OF THE INVENTION

The present invention relates to an image processing apparatus and, more particularly, to an image processing apparatus capable of joining a shadow to, masking, or otherwise processing a color image.

Various kinds of image processing have customarily been executed for ornamental purposes, e.g. providing an image with a shadow and masking an image to leave its interior blank in a reproduction. A digital copier, for example, implements such image processing by using a frame memory and a CPU (Central Processing Unit). The CPU fetches data associated with necessary points from the frame memory each time. This kind of implementation is not feasible for real-time processing. With a black-and-white copier, shadow processing which forms a shadow in a position 45 degrees rightward and downward of an image is conventional. There is an increasing demand for a color copier capable of forming a shadow for each of different color portions in a corresponding color.

SUMMARY OF THE INVENTION

It is therefore a primary object of the present invention to provide an image processing apparatus capable of processing a color image to join a shadow thereto and/or to mask it while insuring adequate coloring.

It is another object of the present invention to provide an image processing apparatus capable of forming a shadow of a color image in a predetermined direction while freeing individual color components from contradiction.

It is another object of the present invention to provide an image processing apparatus capable of forming a masked image free from contradiction in color.

It is another object of the present invention to provide an image processing apparatus capable of executing mask processing and shadow processing in combination.

In accordance with the present invention, an image processing apparatus comprises a reading section for reading a color image to produce multi-level data representative of the color image, a recording section for recording the color image read by the reading section, an operation control section for causing the reading section and recording section to operate on a real time basis, a binarizing section for binarizing the color image color by color, a moving section for moving each binary data of a particular color component produced by the binarizing section in a predetermined direction by referencing color components other than the particular color component, and a combining section for combining the binary data of the individual colors and moved data produced by the moving section.

Also, an image processing apparatus of the present invention comprises a reading section for reading a color image to produce multi-level image data representative of the color image, a storing section for binarizing the multi-level image data color by color and storing the binarized image data, an operating section for performing logical matrix operations with the binarized image data stored in the storing section, a combining section for combining results of operations produced by the operating section and each being associated with a particular color, an operation processing section for forming a processed image by performing logical operations with a combined result produced by the combining means and the binary data, a recording section for recording the processed image, and an operation control section for causing the reading section and recording section to operate on a real time basis.

Further, an image processing apparatus of the present invention comprises a reading section for reading a color image to produce multi-level image data representative of the color image, a storing section for binarizing the multi-level image data color by color and storing the binarized multi-level image data, a combining section for combining the binary data stored in the storing section, an operating section for performing logical matrix operations with the combined binary data produced by the combining means, an operation processing section for forming a processed image by performing logical operations with results of operation produced by the operating section and the binary data, a recording section for recording the processed image, and an operation control section for causing the reading section and recording section to operate on a real time basis.

Moreover, an image processing apparatus of the present invention comprises a reading section for reading a color image to produce multi-level image data representative of the color image, a storing section for binarizing the multi-level image data color by color and storing the binarized multi-level image data, an operating section for performing logical operations with the binary data stored in the storing section by referencing individual colors, an operation processing section for forming an auxiliary image on the basis of results of operations produced by the operating section, a recording section for recording the auxiliary image, and an operation control section for causing the reading section, storing section, operating section, operation processing section, and recording section to operate on a real time basis.

BRIEF DESCRIPTION OF THE DRAWINGS

The above and other objects, features and advantages of the present invention will become more apparent from the following detailed description taken with the accompanying drawings in which:

FIGS. 31 and 32 each show image processing;

FIG. 33 shows specific image processing executed with alphabet A;

FIG. 40 shows specific image processing executed with alphabet A;

FIGS. 49 through 63 each show a particular picture associated with the menu;

FIGS. 64 and 65 each show a particular procedure in which the picture is changed; and FIGS. 66 through 69 each show a particular picture associated with the menu.

DESCRIPTION OF THE PREFERRED EMBODIMENTS

To better understand the present invention, various kinds of image processing on which the present invention is based will be described first.

Figure 1:
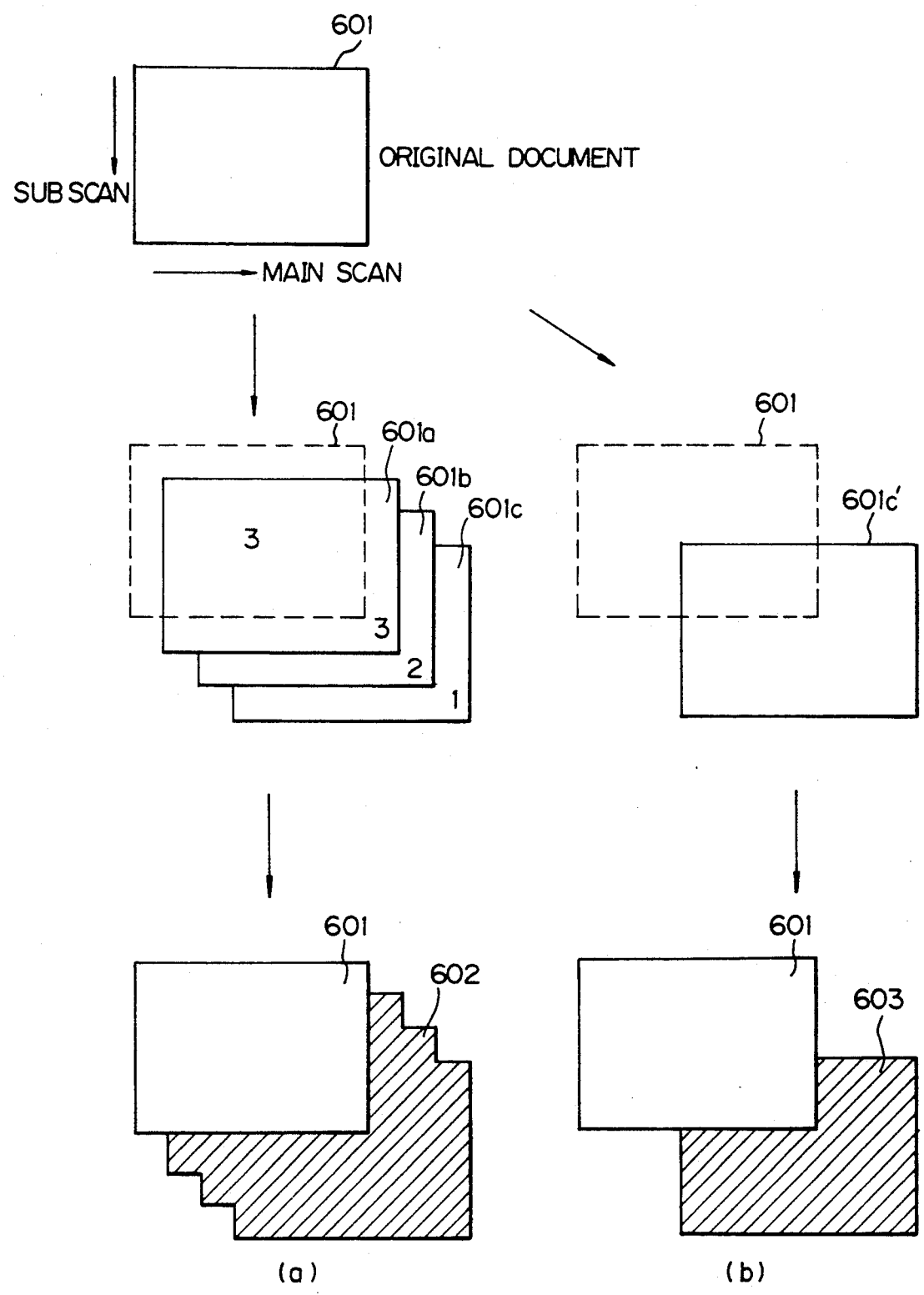
FIG. 1 shows the principle of shadow processing.

FIG. 1 shows the principle of shadow processing. As shown, an image 601 is 45 degrees shifted rightward and downward by image shifting means to form shifted images 601a, 601b and 601c. A part of the shifted image 601a forms the shadow of the image 601, a part of the shifted image 601b forms the shadow of the shifted image 601a, and a part of the shifted image 601c forms the shadow of the shifted image 601b. The resulting composite shadow 602 is combined with the image 601. This kind of shadow processing is generally referred to as stereoscopic shadow processing ((a), FIG. 1). On the other hand, the image 601 is 45 degrees downward by 45 degrees by a displacement 3 corresponding to the displacement of the shifted image 601c to form a shifted image 601c'. A part of the shifted image 601c' forms the shadow of the image 601. This kind of shadow processing is known as plain shadow processing ((b), FIG. 1).

Figure 2:
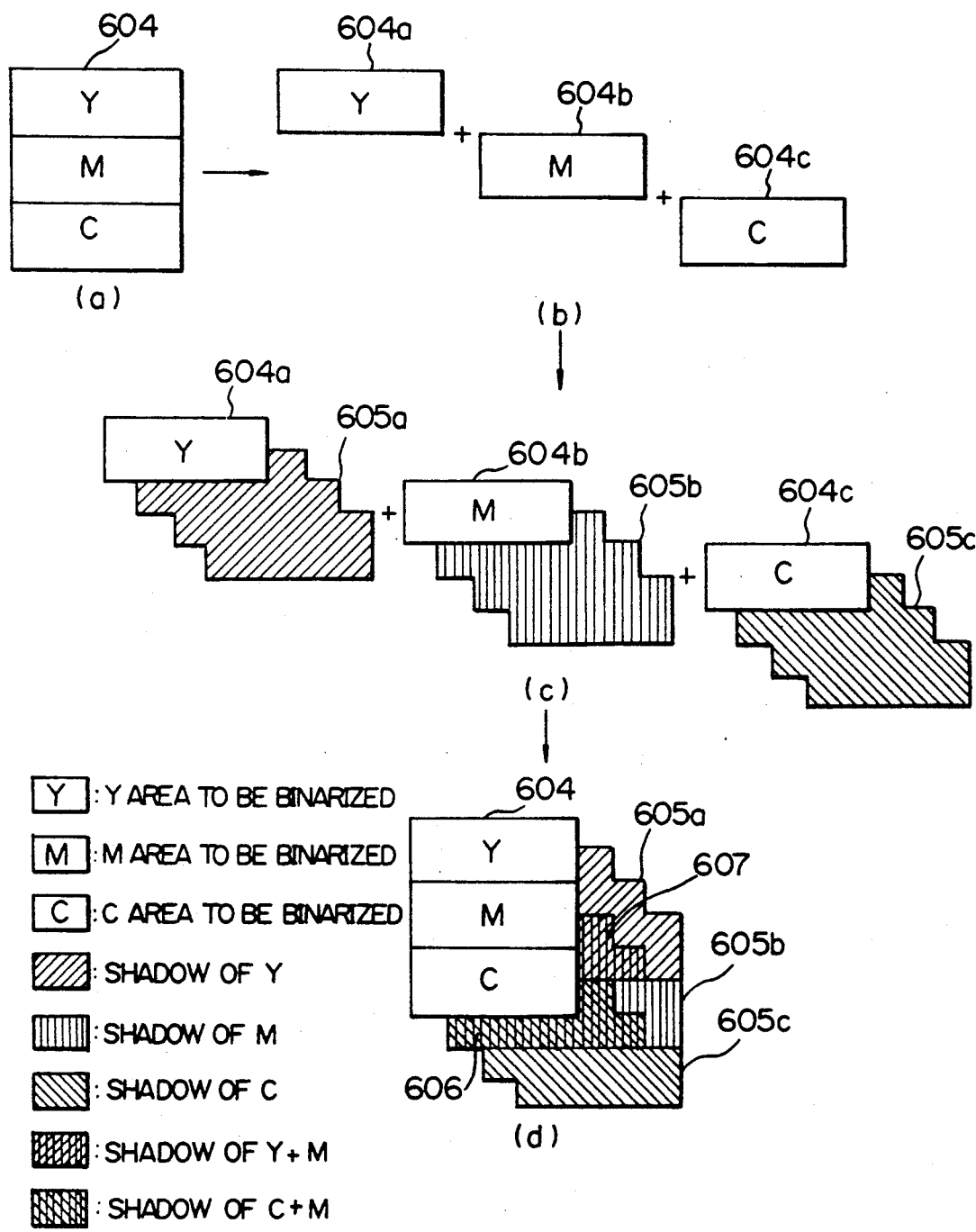
FIG. 2 shows a procedure for forming a stereoscopic shadow.

FIG. 2 shows the stereoscopic shadow processing more specifically. As shown, an image 604 ((a), FIG. 2) is separated into a yellow (Y), a magenta (M) and a cyan (C) color component 604a, 604b and 604c ((b), FIG. 2). The color components 604a, 604b and 604c are respectively provided with shadows 605a, 605b and 605c each resulted from displacements 1, 2 and 3 ((c), FIG. 2). Then the image 604 and the shadows 605a to 605c are combined with priority given to the original in areas where the shadows and original overlap each other ((d), FIG. 2).

Figure 3:
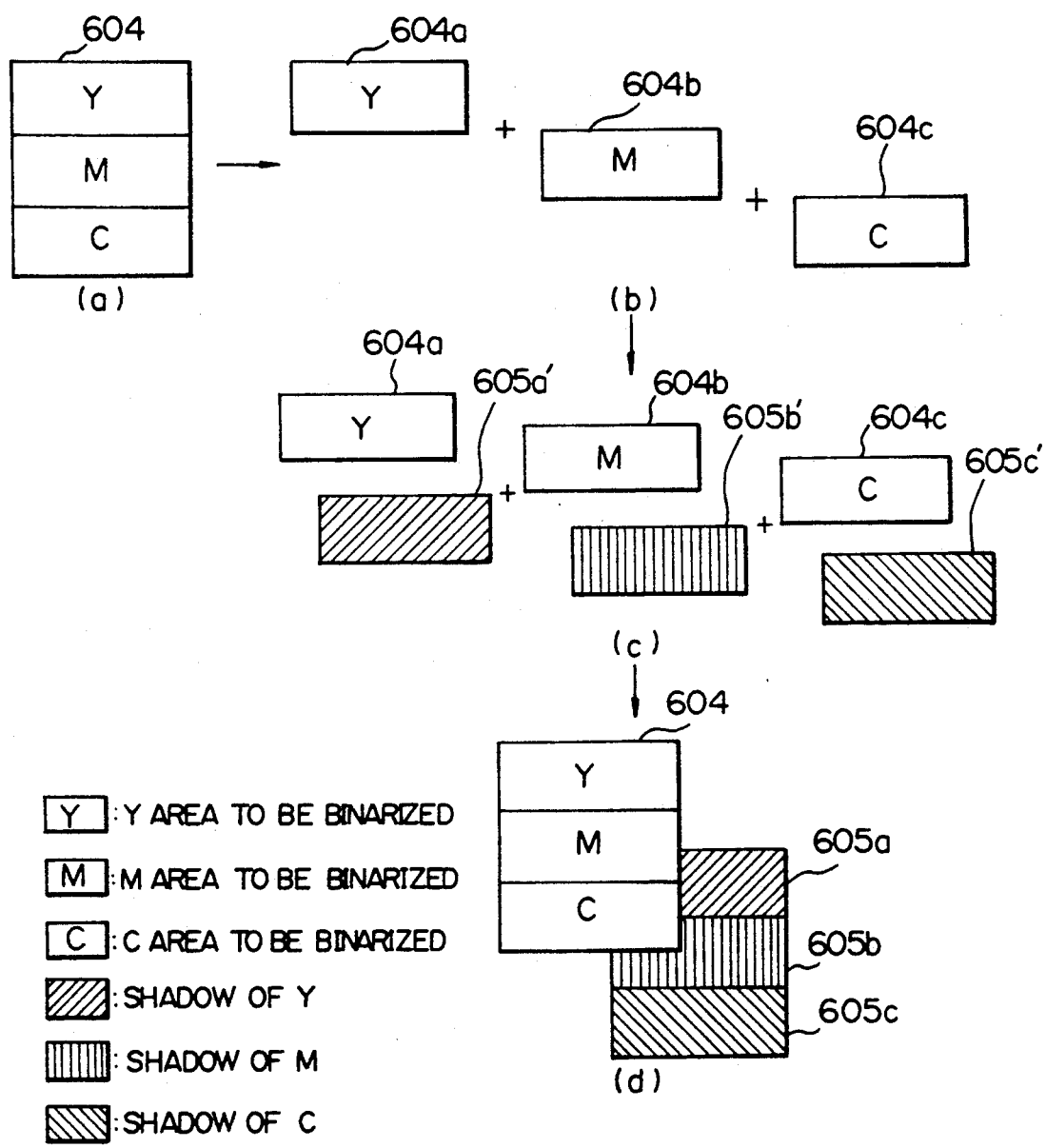
FIG. 3 shows a procedure for forming a plain shadow.

FIG. 3 shows the plain shadow processing more specifically. Again, the image 604 ((a), FIG. 3) is separated into color components 604a, 604b and 604c ((b), FIG. 3). The color components 604a, 604b, 604c are respectively provided with shadows 605a', 605b' and 605c' each corresponding to a displacement 3 ((c), FIG. 3). Thereupon, the image 604 and shadows 605a', 605b' and 605c' are combined with priority given to the original in areas where the shadows and image overlap each other ((d), FIG. 3).

There is an increasing demand for image processing capable of thinning or thickening an original image or masking the interior of an original image to make it blank. An image processor implementing such capabilities with a frame memory and a CPU has already been put to practical use with a black-and-white copier. The problem with a conventional image processing apparatus for a black-and-white copier is that the frame memory and CPU not only complicate the structure but also obstruct real-time processing. An image processing apparatus of the type described and adapted for color images has a problem concerning color processing when it comes to masking.

Figure 4:
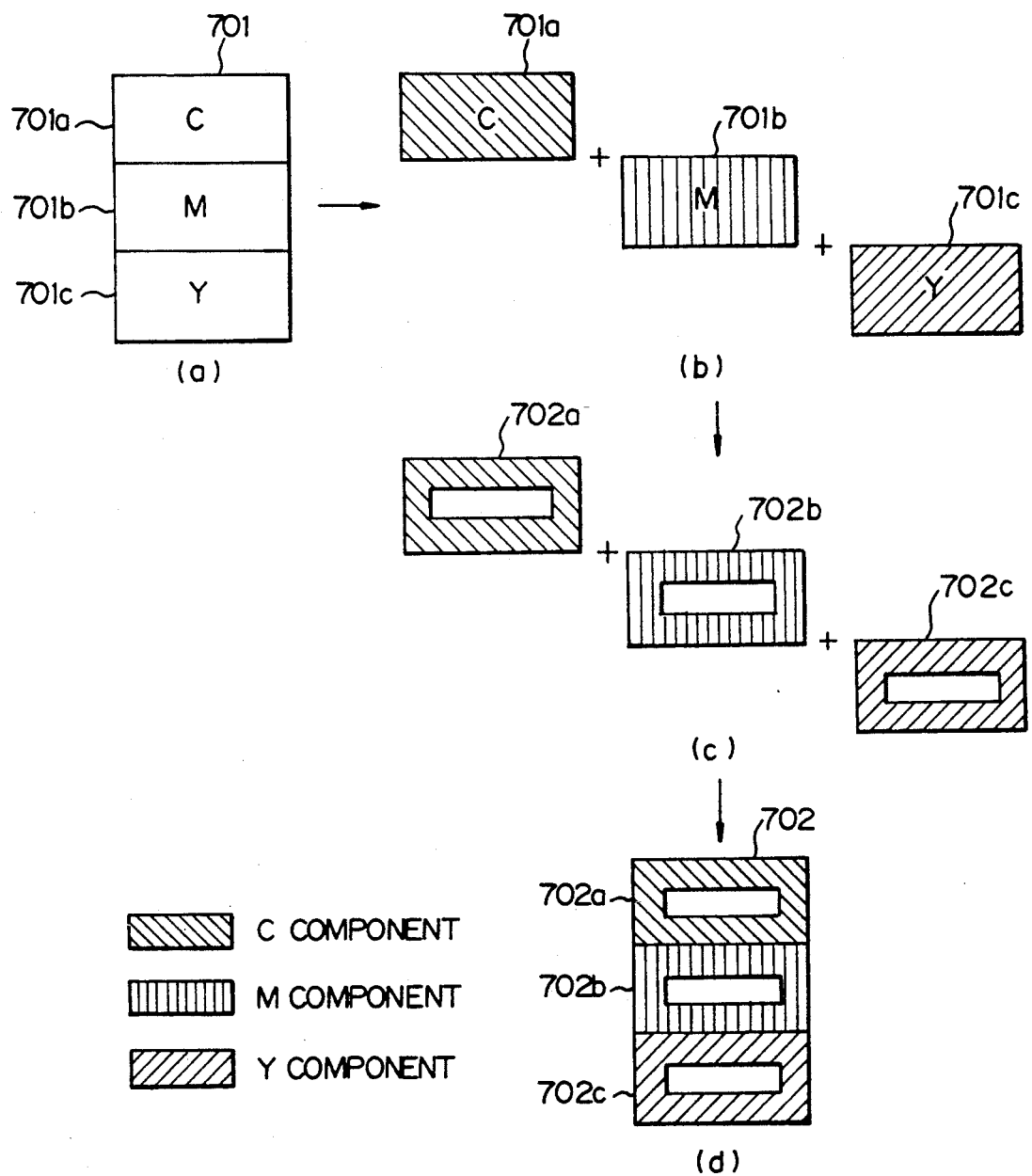
FIGS. 4 and 5 each show conventional mask processing.

FIG. 4 shows masking processing for removing the interior of a color image specifically. As shown, a color image 701 having a C component 701a, an M component 701b and a Y component 701c ((a), FIG. 4) is separated into the individual color components 701a to 701c ((b), FIG. 4). Then, the individual color components 701a to 701c are masked by the thinning technique to produce hollow images 702a to 702c ((c), FIG. 4). Thereafter, the individual color components 702a to 702c are combined to produce a composite hollow image 702 ((d), FIG. 4). The composite image 702 having the individually hollowed color components 702a to 702c is satisfactory in the aspect of colors.

Figure 5:
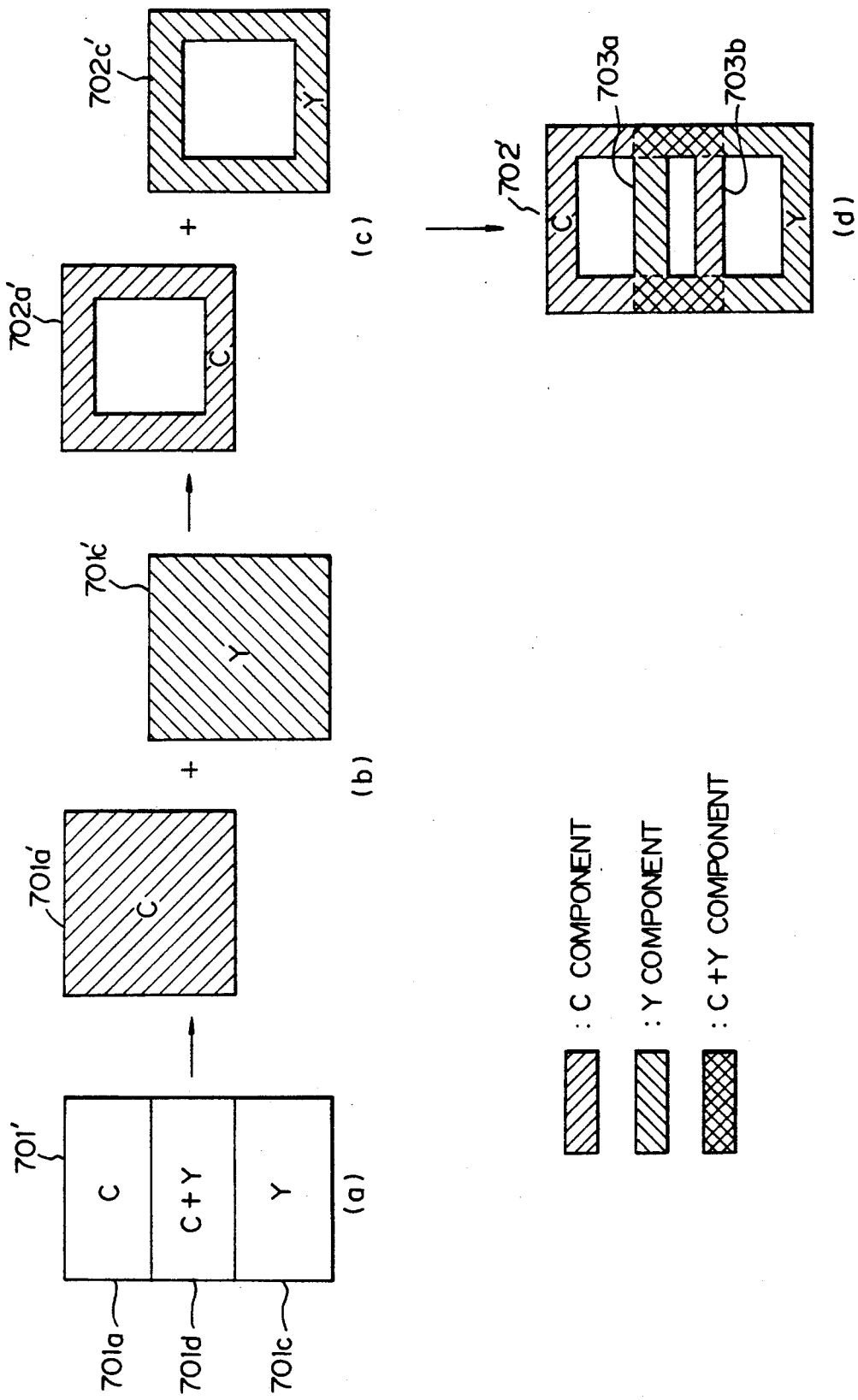

FIG. 5 demonstrates another processing available for masking a color image. A specific color image 701' shown in the figure has a C component 701a, a C+Y (green) component 701d, and a Y component 701c ((a), FIG. 5). Separating such a color image 701' produces a C component 701a' and a Y component 701c' ((b), FIG. 5). Then, the color components 701a' and 701c' are individually masked by the thinning process to produce hollow components 702a' and 702c' ((c), FIG. 5). Finally, the hollow components 702a' and 702c' are combined to complete a composite hollow image 702' ((d), FIG. 5). In the composite image 702', arms 703a and 703b appear in colors Y and C, respectively.

In the previously stated plain shadow processing, the shadows 605a' to 605c' associated respectively with the color components 604a to 604c of the image 604 are each successfully formed in the associated color at a position shifted rightward and downward by the displacement 3. However, when it comes to the stereoscopic shadow processing, the shadows 605b and 605c overlap each other in a portion 606 while the shadows 605a and 605b overlap each other in a portion 607 ((d), FIG. 2). In these portions 606 and 607, the different colors interfere with each other and, therefore, appear unnatural to the eye. Further, when the color image 701' is masked as shown in FIG. 5, the arms 703a and 703b are not consistent in color and are, therefore, unnatural. To eliminate these problems, there has been proposed a color image processing apparatus which produces a color image with a shadow by adding an auxiliary image to a basic image which is representative of a color original image, and then subjecting the basic and auxiliary images to color conversion. This type of color image processing apparatus will be described hereinafter.

Figure 6:
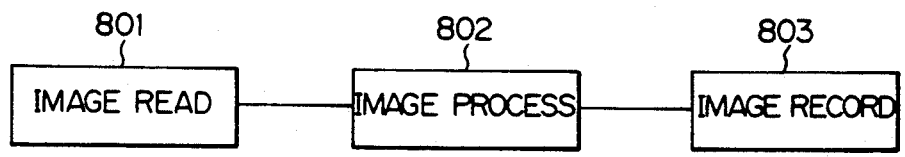
FIG. 6 is a block diagram schematically showing an overall image processing sequence.
Figure 7:
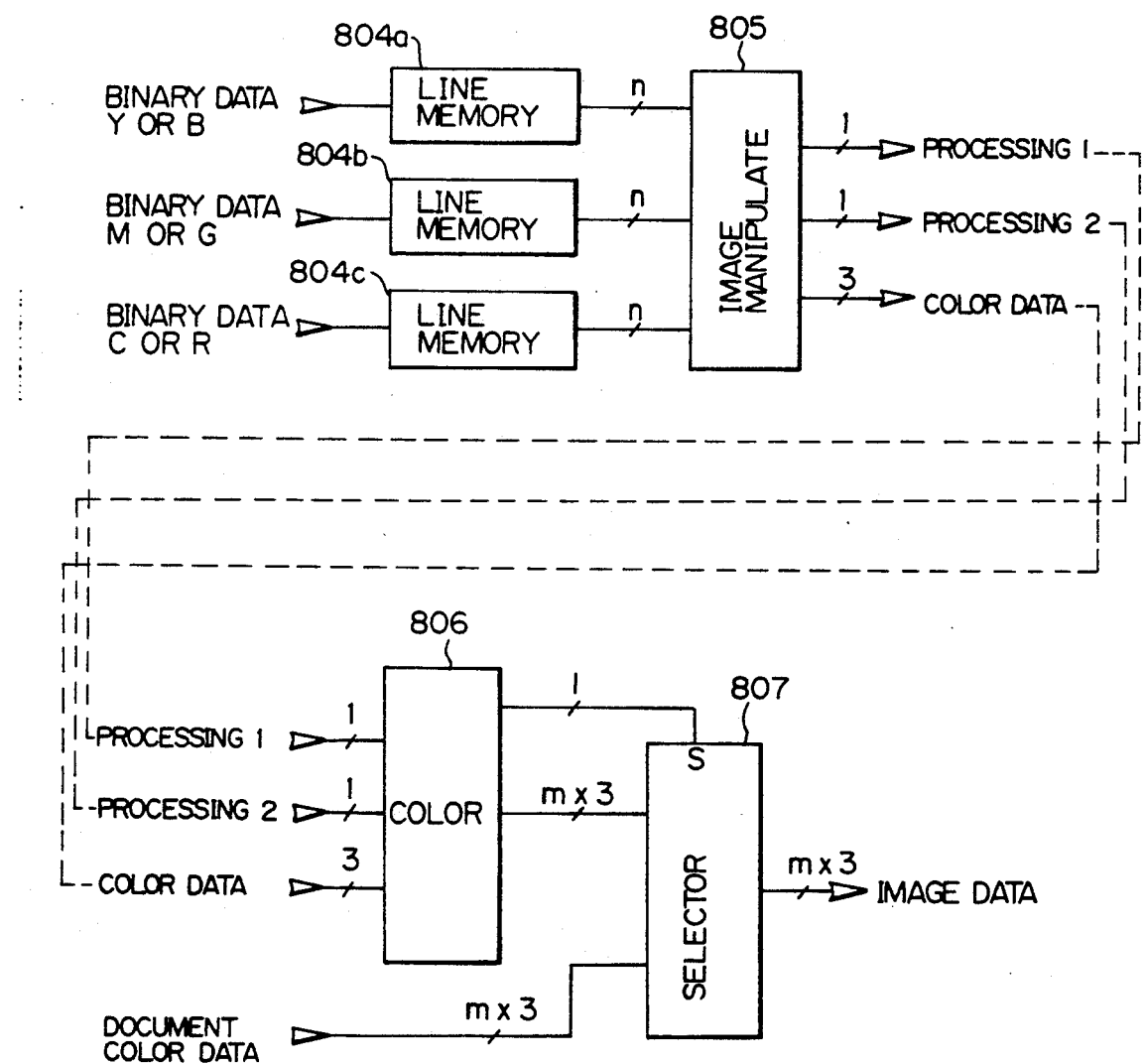
FIG. 7 is a block diagram schematically showing an image processing section.

Referring to FIG. 6, such an apparatus has an image reading section 801 for reading an original color image to produce separated color data each being associated with a respective one of three colors, an image processing section 802, and an image recording section 803. FIG. 7 shows a specific construction of the image processing section 802. As shown, the image processing section 802 has line memories 804a to 804c, an image manipulating section 805, a coloring section 806, and a selector 807. As shown in FIG. 7, color data outputted by the image reading section, or image sensor, 801 and associated with three different colors are converted into two levels with respect to a threshold level value. The resultant binary color data are applied color by color to the line memories 804a to 804c. The outputs of the line memories 804a to 804c are connected to the image manipulating section 805.

Color image data is reproduced by the mixture of three primary colors. The three primary colors are red (R), green (G) and blue (B) in a television or similar imaging system which uses additive mixture, while they are cyan (C), magenta (M) and yellow (Y) in photography or printing which uses subtractive mixture. The image manipulating section 805 is connected to the coloring section 806 which is in turn connected to the selector 807. Original three-color data is applied to the selector 807 in addition to the output of the coloring section 806. Image data appearing on the output of the selector 807 is fed to the image recording section 803.

The image manipulating section 805 adds an auxiliary image or color shadow to the basic image associated with the original color image which is read by the image reading section 801. The coloring section 806 colors the basic and auxiliary images in either one of a seven color mode and an optional color mode. Receiving the output image data of the selector 807, the image recording section 803 forms and records a complete color image. When different colors overlap each other in the color conversion processing and shadow processing associated with the basic image, priority is given to the color conversion processing if the processing is different.

Figure 8:
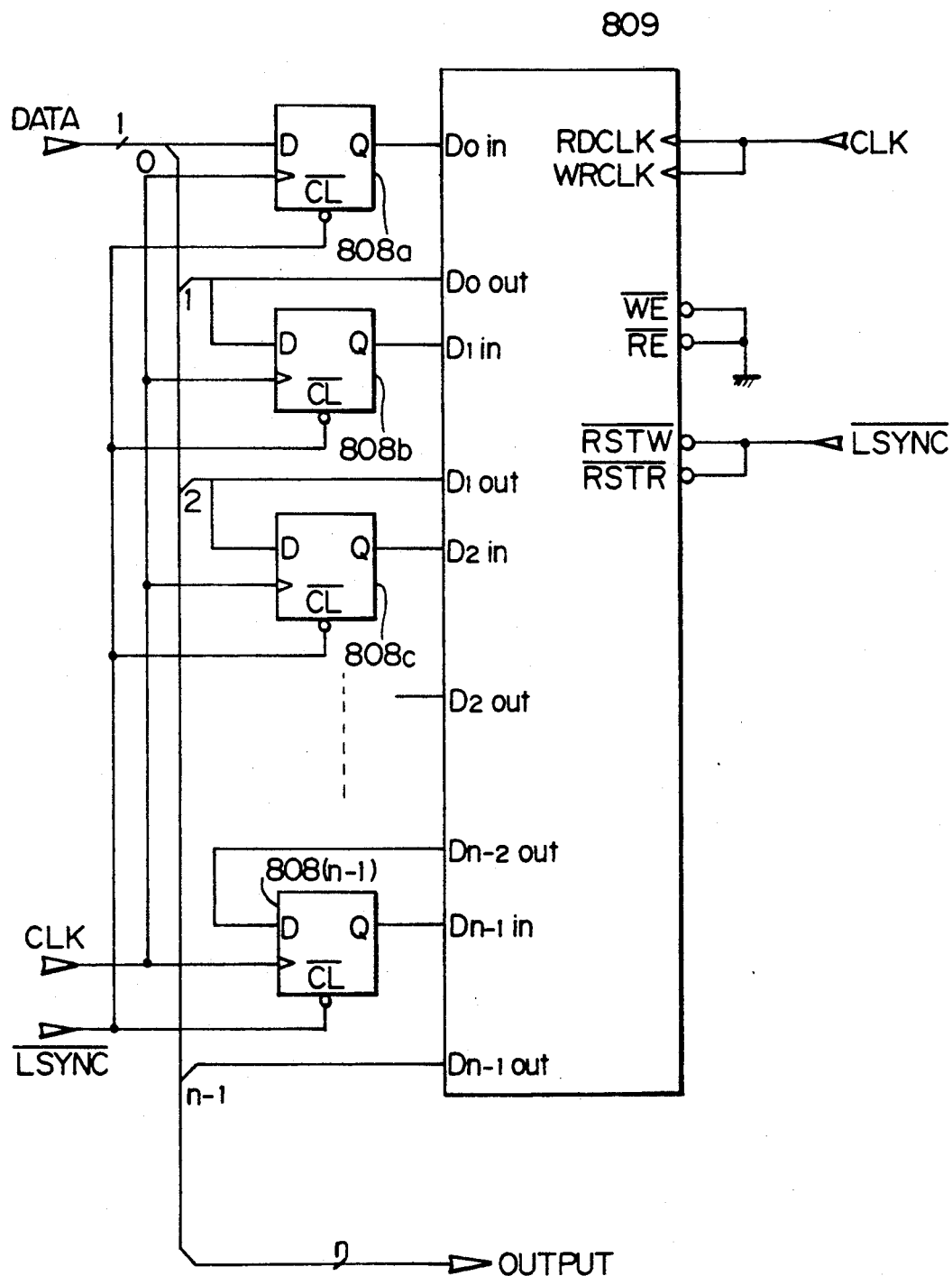
FIG. 8 shows connections of terminals of a line memory.

FIG. 8 shows a specific construction of the line memory. There are shown in FIG. 8 registers 808a to 808(n−1), a circuit board 809, data inputs $D_{0in} D_{(n-1)in}$, data outputs $D_{0out}$ to $D_{(n-1)out}$, a clock CLK, a read clock RDCLK, a write clock WRCLK, a write enable input WE, a read enable input RE, a synchronizing signal LSYNC, a reset/write input RSTW, a reset/read input RSTR, and input data Data. 1-bit data is delayed by one clock by the register 808a to constitute the data input $D_{0in}$, while the data output $D_{0out}$ is delayed by one clock by the register 808b to constitute the input data $D_{1in}$. Such a connection is repeated up to the input data $D_{(n-1)in}$ with the result that the output of the line memory is shifted 45 degrees relative to the input data.

Figure 9:
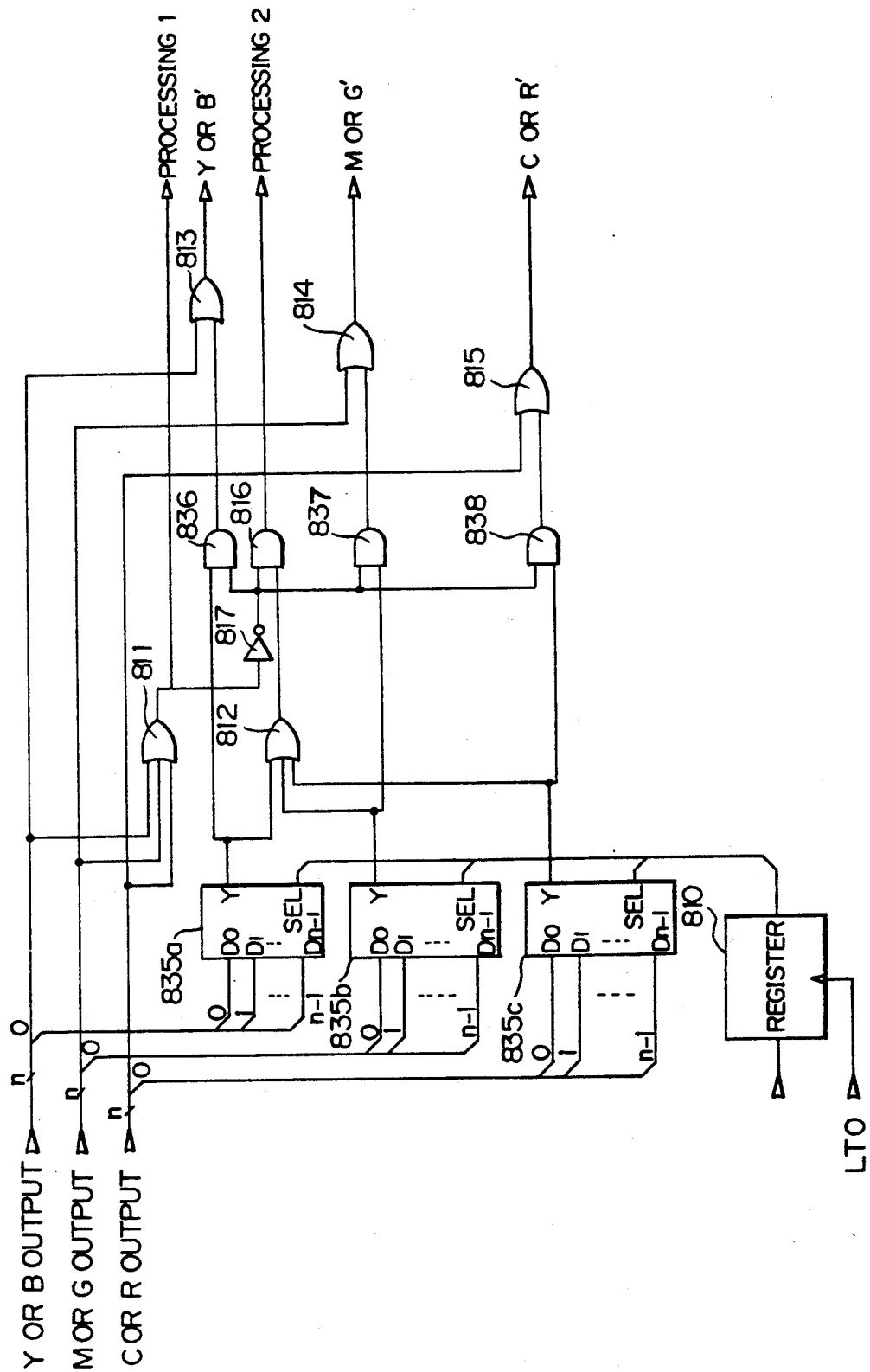
FIG. 9 is a block diagram schematically showing an essential part of an image manipulating section.

FIG. 9 shows an essential part of the image manipulating section 805. As shown, the section 805 has selectors 835a to 835c, a register 810, OR gates 811 to 815, AND gates 816 and 836 to 838, and an inverter 817. The selectors 835a to 835c are each associated with OUTPUT, FIG. 8, of the associated line memories 804a to 804c. The output of the register 810 is connected to the select terminals of the selectors 835a to 835c. Control data is applied to the register 810 in response to a write strobe LTO. The outputs of the selectors 835a to 835c are connected to the input of the OR gate 812 whose output is in turn connected to one input of the AND gate 816. Input data of individual colors are fed to the OR gate 811 whose output is connected to the other input of the AND gate 816 via the inverter 817. The outputs of the selector 835a and inverter 817 are delivered to the AND gate 836. The outputs of the selector 835b and inverter 817 are applied to the AND gate 837. Further, the outputs of the selector 835c and inverter 817 are coupled to the AND gate 838. Input Y (or B) data and the output of the AND gate 836 are fed to the OR gate 813, input M (or G) data and the output of the AND gate 837 are applied to the OR gate 814. Input C (or R) data and the output of the AND gate 838 are applied to the OR gate 815.

Figure 10:
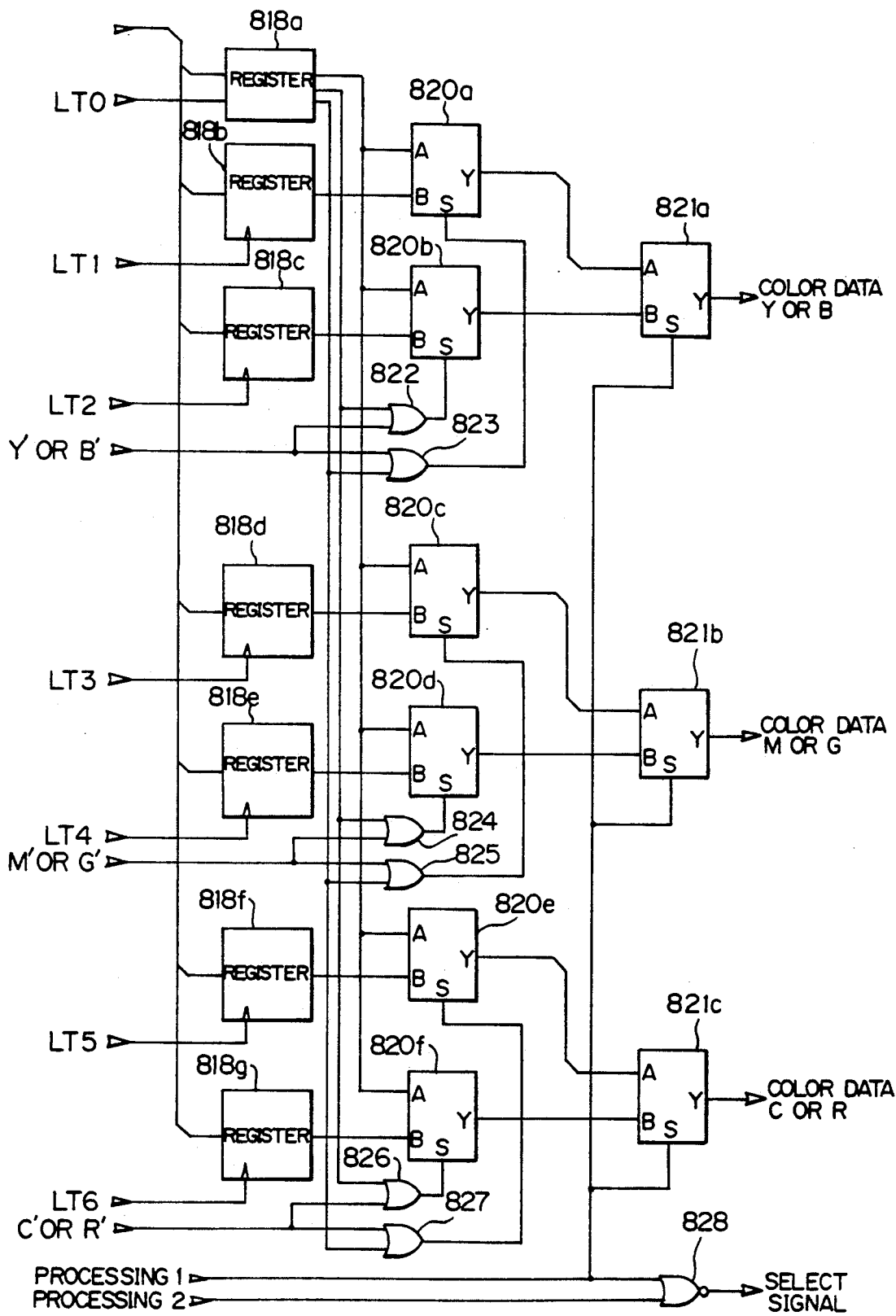
FIG. 10 is a block diagram schematically showing a coloring section.

A specific construction of the coloring section 806 is shown in FIG. 10. There are shown in the figure registers 818a to 818g, selectors 820a to 820f, selectors 821a to 821c, OR gates 822 to 827, and an OR gate 828. The registers 818a to 818g are connected to a CPU bus. The output of the register 818a is connected to the terminals A of the selectors 820a to 820f. The outputs of the registers 818b to 818g are connected to the B terminals of the selectors 820a to 820f, respectively. The outputs of the selectors 820a and 820b are connected respectively to the terminals A and B of the selector 821a. Likewise, the outputs of the selectors 820c and 820d are connected respectively to the terminals A and B of the selector 821b, while the outputs of the selectors 820e and 820f are connected respectively to the terminals A and B of the selector 821c.

The control signal from the register 818a and the output of the OR gate 813, FIG. 9, are applied to the OR gate 823. The output of the OR gate 823 is connected to the select terminal of the selector 820a. The control signal from the register 818a and the output of the OR gate 23 are applied to the OR gate 822 whose output is connected to the select terminal of the selector 820b. The control signal from the register 818a and the output of the OR gate 814, FIG. 9, are applied to the OR gates 825 and 824. The outputs of the OR gates 825 and 824 are connected to the select terminals of the selectors 220c and 220d, respectively. The control signal from the register 818a and the output of the OR gate 815, FIG. 9, are fed to the OR gates 827 and 826 which are connected respectively to the select terminals of the selectors 820e and 820f. The output of the OR gate 811, FIG. 9, is connected to the select terminals of the selectors 821a to 821c and one input of the NOR gate 828. The output of the AND gate 816, FIG. 9, is connected to the other input of the NOR gate 828.

Conversion color data are applied to the registers 818b and 818d and register 818f in response to write strobes LT1, LT3 an LT5, respectively, in order to execute color conversion processing with the basic image (processing 1). Conversion color data meant for the processing of the auxiliary image (processing 2) are applied to the registers 818c, 818e and 818g in response to write strobes LT2, LT4 and LT6, respectively. Control data is fed to the register 818a in response to a write strobe LT0. In response, the register 818a outputs control signals to implement color conversion in the seven color mode or the optional color mode, and to respond to "0" data in the event of RMC subtractive mixture or to "1" data in the event of BGR additive mixture.

In operation, the image reading section or image sensor 801 reads a color original document to output color data associated with three primary colors, i.e. Y, M and C or B, G and R. The color data are binarized with respect to a threshold value and then written to the associated line memories 804a to 804c one line at a time. For the color conversion processing associated with the basic image of the color original (processing 1), the three primary color data coming out of the OR gate 811 are directly used. The processing 1 will be executed when any one of color data Y (or B), M (or G) and C (or R) is detected. When the processing 1 is executed, the output of the inverter 17 and, therefore, the outputs of the AND gates 816, 836, 837 and 838 turn to "0". Hence, the processing associated with the auxiliary image, or shadow, is not executed. When the processing 1 is not executed, the processing 2 is executed by producing output data from the line memories 804a to 804c while deviating them by 45 degrees relative to the associated input data. More specifically, during the processing 2, any one line of the selectors 835a to 835c is selected in response to the output of the register 810 which is controlled by the write strobe LT0.

In the processing 1 and 2, Y (or B) data, M (or G) data and C (or R) data are fed respectively to the OR gates 822 and 823, OR gates 824 and 825, and OR gates 826 and 827, FIG. 10, via the OR gates 813, 814 and 815. It is to be noted that when all the three primary colors B, G and R are detected, i.e., in a high density condition, the outputs of the OR gates 811 and 812, FIG. 9, turn to "0".

While the processing 1 is under way, the select terminals of the selectors 821a to 821c, FIG. 10, are "1" and, therefore, select the inputs on the terminals A. In this instance, when the outputs of the OR gates 813 to 815, FIG. 9, are "1", the selectors 820a to 820f will have selected the inputs on the terminals B. Hence, in the processing 1, color data are produced from the selectors 821a to 821c on the basis of the conversion color data which are inputted in response to the write strobe signals LT1, LT3 and LT5. Likewise, while the processing 2 is under way, the selectors 821a to 821c select the inputs on the terminals B and, hence, color data are produced from the selectors 821a to 821c on the basis of the conversion color data inputted in response to the write strobes LT2, LT4 and LT6.

Such color data are fed to the image recording section 803, FIG. 6. As a result, the basic image and auxiliary image (shadow) each is recorded in a particular converted color.

When a particular color is designated by the control data LT0, the control signal from the register 818a and the inputs to the OR gates 822, 824 and 826 or the OR gates 823, 825 and 827 are turned to "1" to effect the optional color mode in place of the seven color mode. Further, when the outputs of the OR gates 811 and 812 turn to "0", the register 818a delivers a control signal for effecting processing associated with data "0" and "1" which will appear in the event of YMC subtractive mixture and BGR additive mixture, respectively. This control signal is outputted by the selector 807, FIG. 7. On the stop of such processing, color data representative of the original document is outputted. The NOR gate 828 produces a select signal indicating that the processing 1 or 2 is under way.

Figure 11:
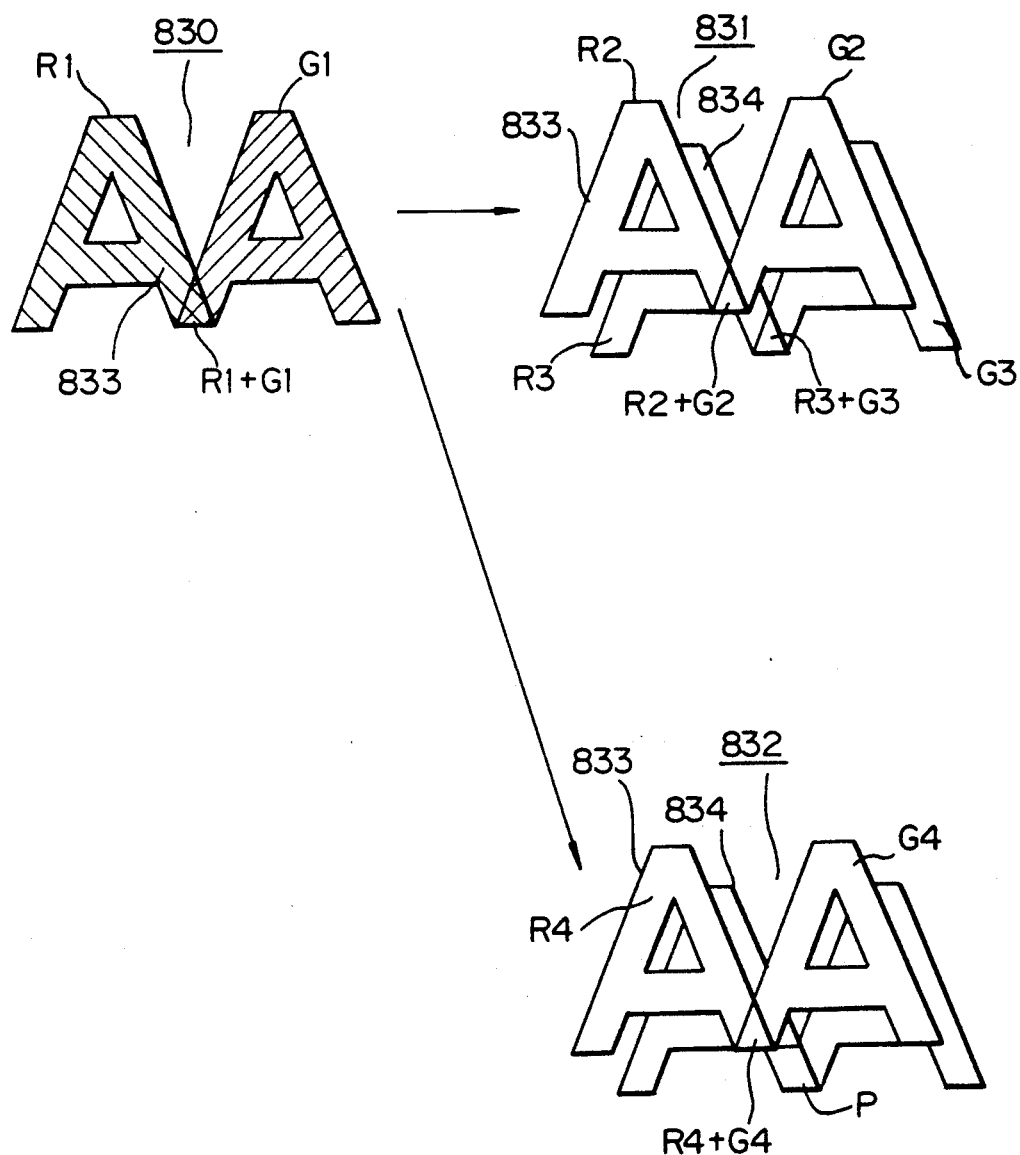
FIG. 11 shows how an image is formed by shadow processing.

FIG. 11 shows a color original image 830, a color image 831 formed by the seven color mode, a color image 832 formed by the optional color mode, a basic image 833, and an auxiliary image (shadow) 834. As shown, characters printed in colors R1 and G1, respectively, are interconnected at their ends. Concerning the color image 830 having a color R1+G1 at the connecting portion, characters of colors R2 and G2 are interconnected at their ends. The basic image 833 of a color R2+G2 at the connecting portion and characters of colors R3 and G3 are interconnected at their ends. The resultant color image 831 has the shadow 834 which is colored in R3+G3 in the connecting portion thereof. On the other hand, in the optional color mode, characters of colors R4 and G4 are interconnected at their ends. Hence, the resultant color image 832 is made up of the basic image 833 which is colored in R4+G4 at the connecting portion, and the shadow 834 of designated color P.

As stated above, either the color conversion for forming a basic image (processing 1) or the addition of a shadow (auxiliary image) (processing 2) is effected smoothly with priority given to the processing 1 in the event of color superpose processing. This is successful in producing a color image with a shadow.

This example is practicable with an apparatus which is simple in construction and easy to operate. By selecting either one of the seven color mode or the optional color mode, it is possible to form a color image of any desired color, e.g., in a light seven color mode for processing 1 and a dark seven color mode for the processing 2.

While the above example has concentrated on an auxiliary image in the form of a shadow, it is also capable of adding an under-pattern to the basic image, for example.

In the above example, the optional color mode is such that a shadow is formed in a designated color. Alternatively, the basic image and the shadow may be formed in different colors.

The construction and operation stated above implements processing which forms a shadow without any contradiction in colors. Nevertheless, there has been a demand for other various kinds of processing. The present invention contemplates to realize various kinds processing even more advanced than the processing described above, as will be described hereinafter.

First Embodiment

Figure 12:
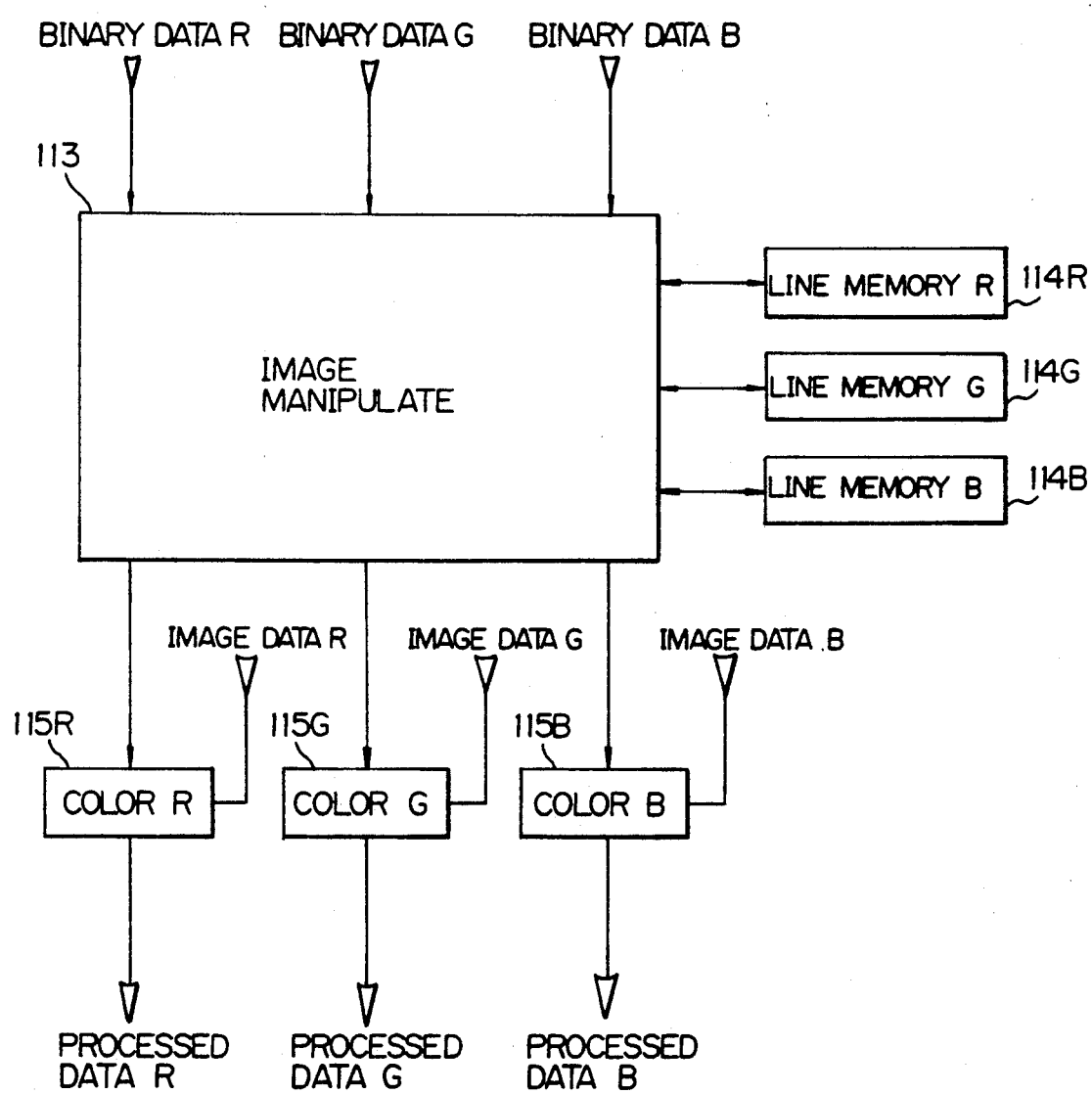
FIG. 12 is a block diagram schematically showing a first embodiment of the image processing apparatus in accordance with the present invention.

Referring to FIG. 12, a first embodiment of the image processing apparatus in accordance with the present invention is shown. Since this embodiment has a construction similar to the construction of FIG. 6, similar components are designated by the same reference numerals, and redundant description will be avoided for simplicity.

In FIG. 12, line memories 114R, 114G and 114B assigned to R, G and B, respectively, and coloring sections 115R, 115G and 115B also assigned to R, G and B, respectively, are connected to an image manipulating section 113. Binarizing means binarizes image data read by a reading section by using a threshold value and delivers the resultant data to the image manipulating section 113. The image manipulating section 113 reads data out of the line memories 114R, 114G and 114B. The illustrative embodiment is constructed and arranged to add shadows of colors corresponding to those of a color original image at a position 45 degrees downward of the original image. The image manipulating section 113 executes such processing. Processed data from the section 113 are inputted to the line memories 114R, 114G and 114B and the coloring sections 115R, 115G and 115B. Also fed to the coloring sections 115R, 115G and 115B are the binary R, G and B data. In this configuration, the processed data and the binary data are provided with colors and written over the image data, thereby adding shadows to the original image.

Figure 13:
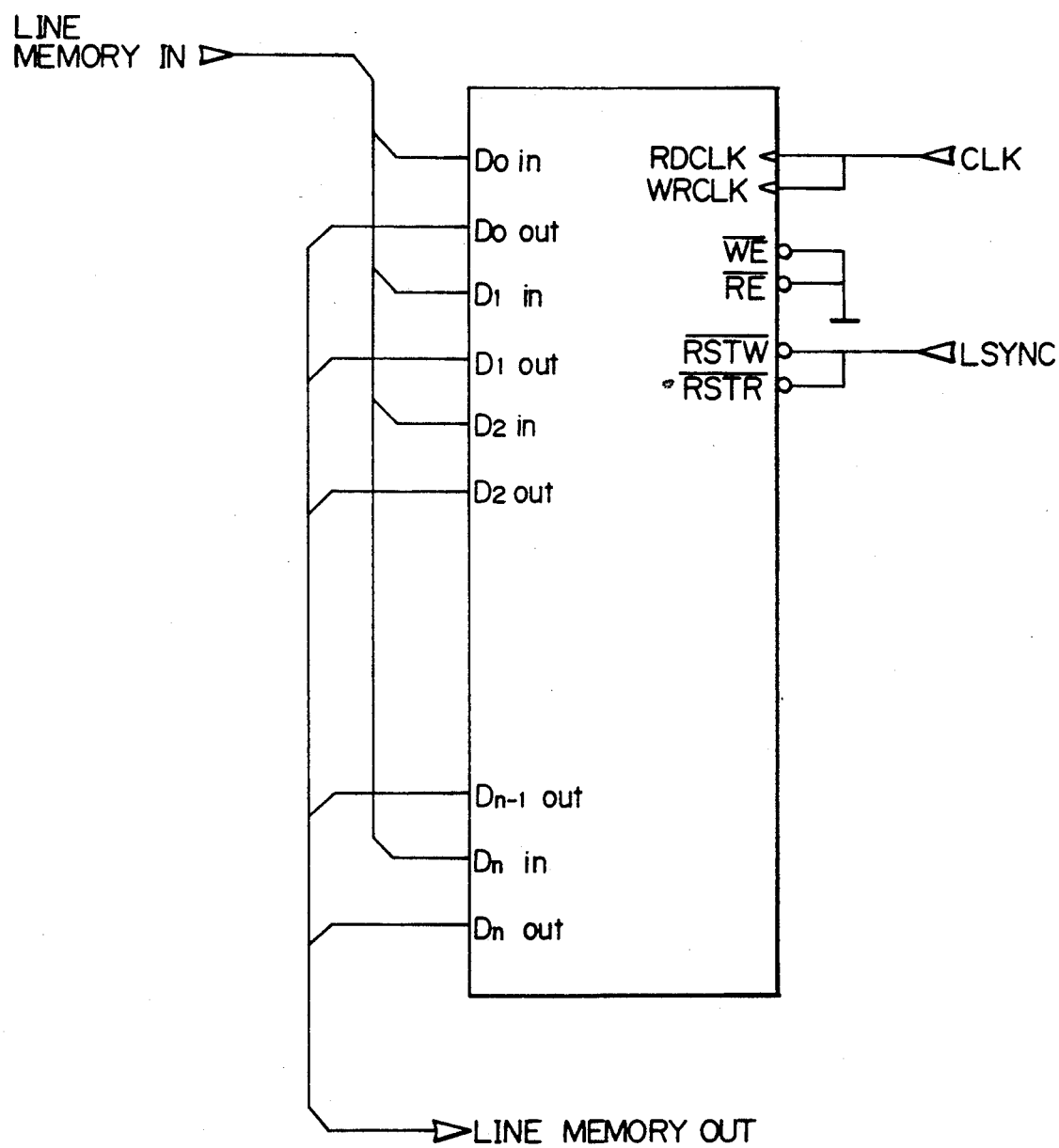
FIG. 13 shows connections of terminals of a line memory.

FIG. 13 shows a specific construction of one of the line memories 114R, 114G and 114B. In the specific construction, a memory device is implemented with NEC μPD42505C which has a 5048 words by 8 bits FIFO (First-In-First-Out) configuration and holds (n+1) bits of data of the immediately preceding line.

Figure 14:
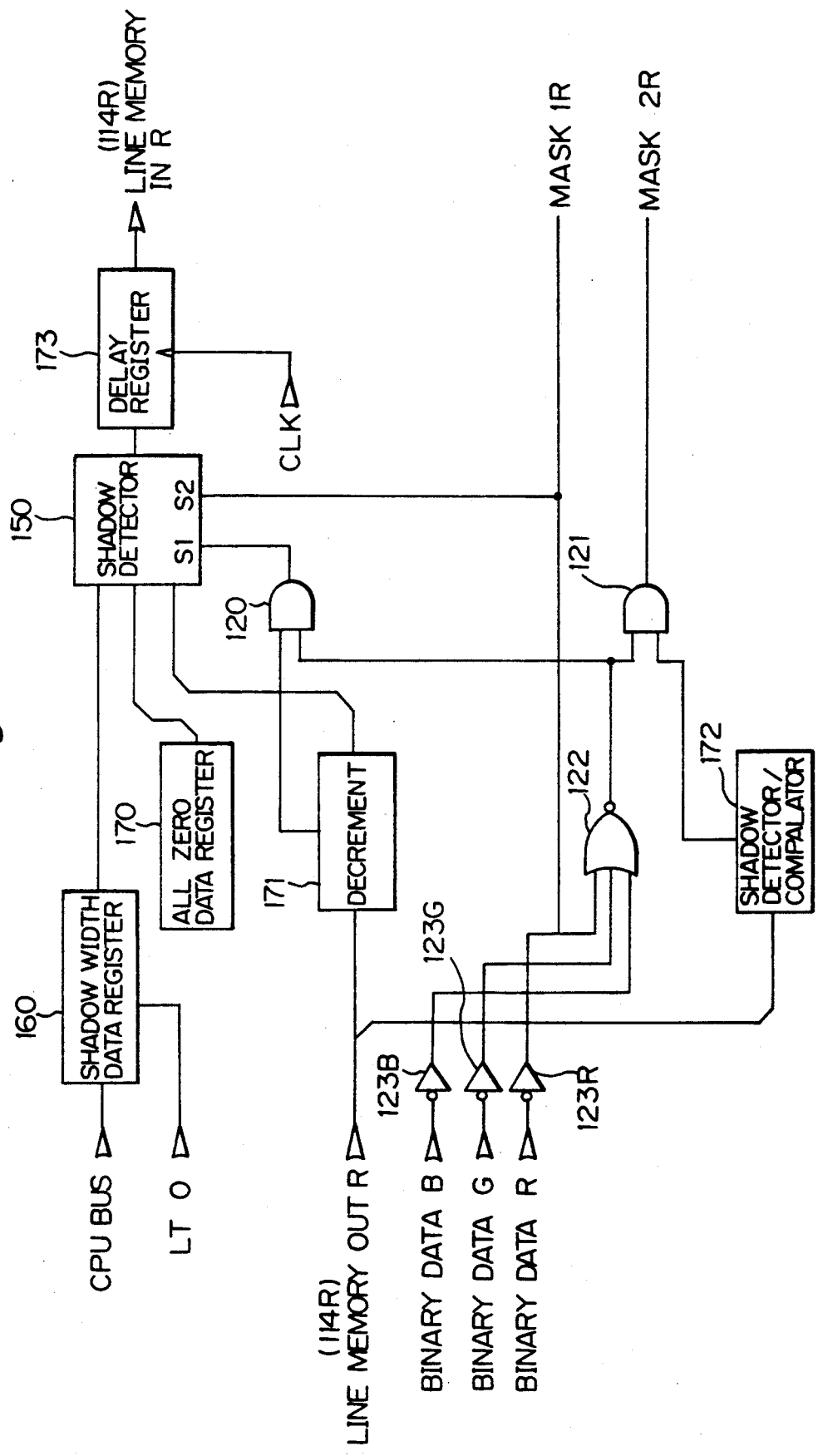
FIGS. 14 through 16 show image manipulating circuits assigned to red (R), green (G), and blue (B), respectively.
Figure 15:
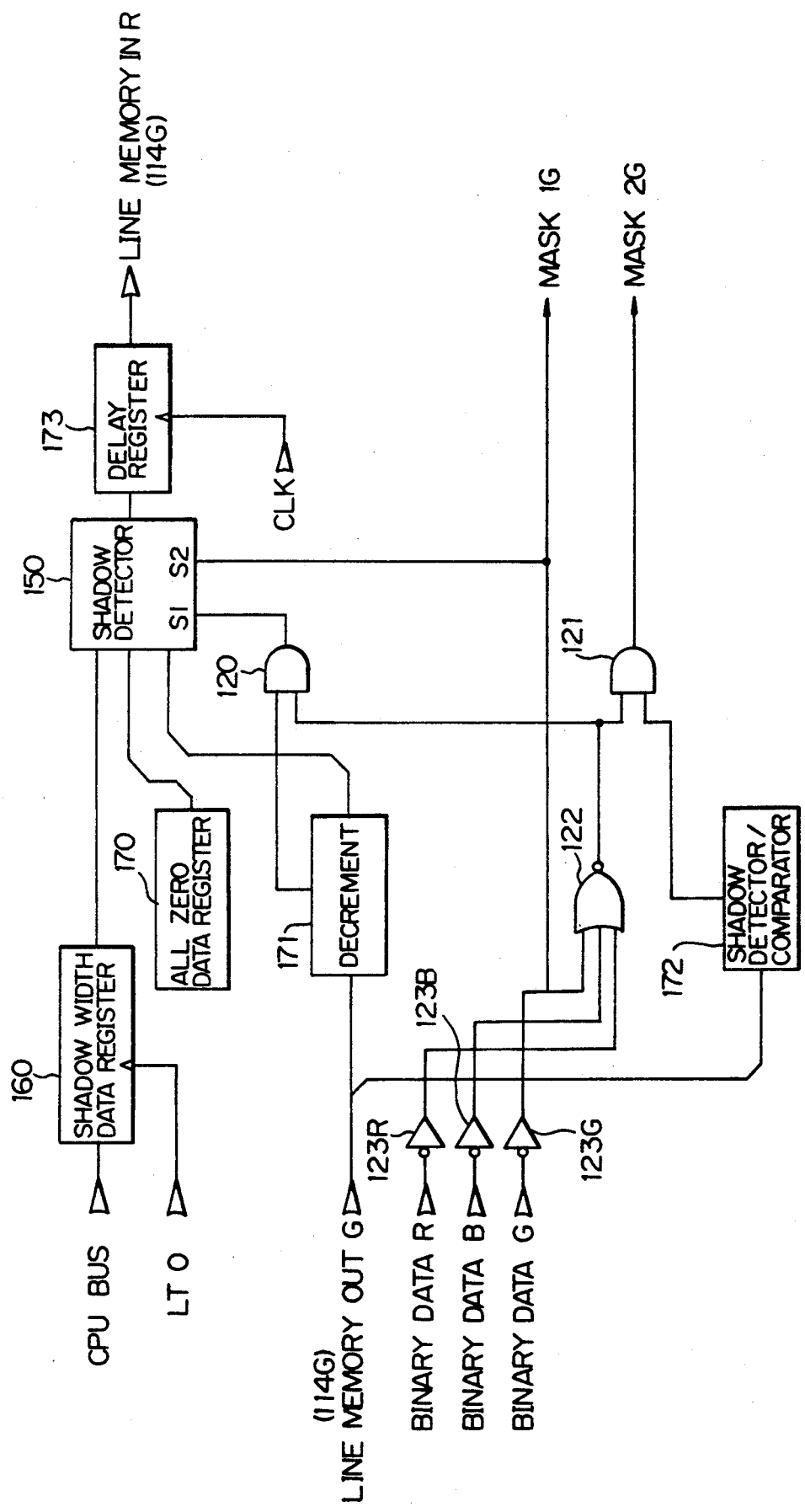
Figure 16:
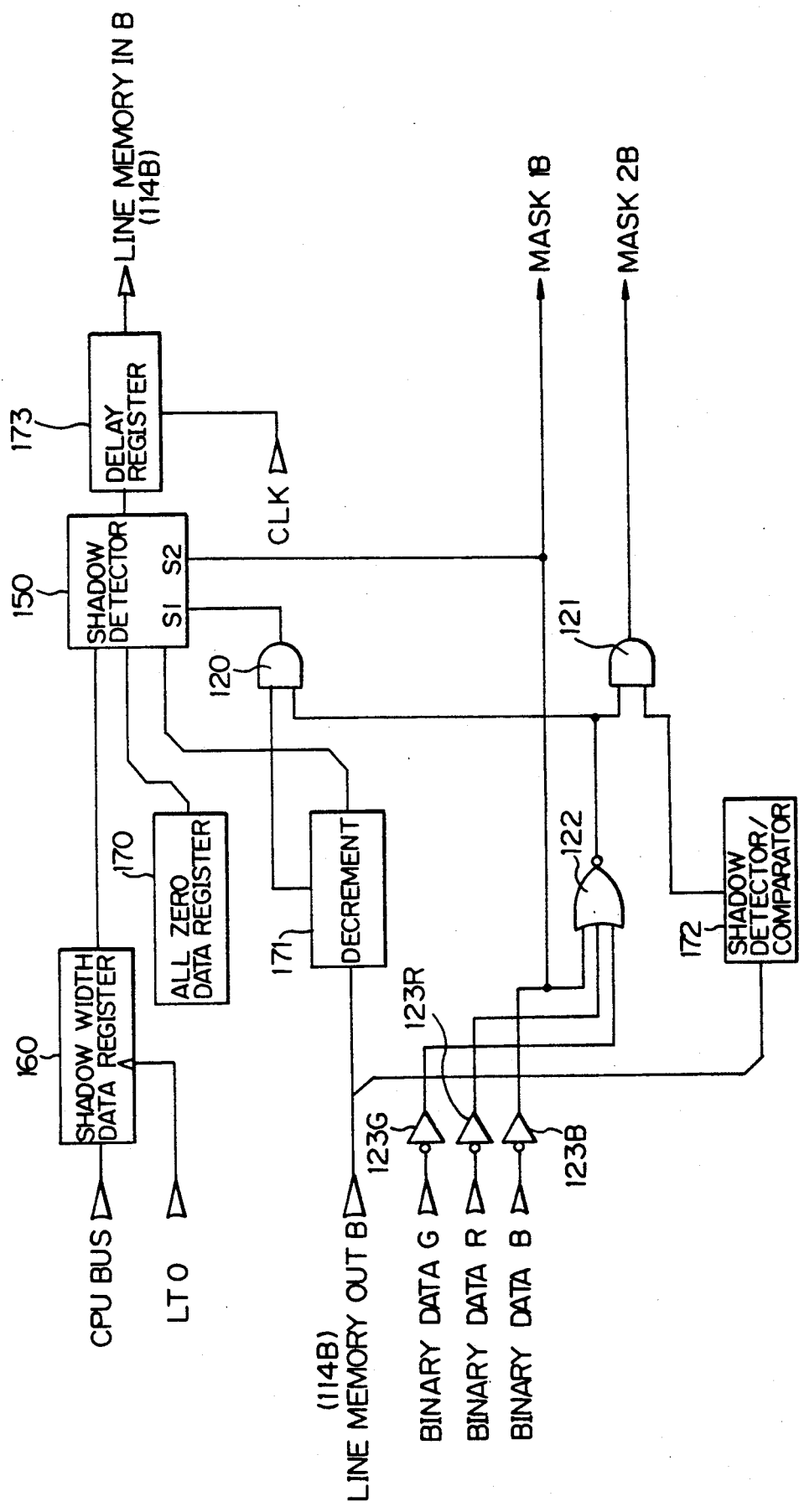

FIGS. 14 through 16 show image manipulating circuits each being assigned to a respective one of the colors. Since the image manipulating circuits are identical in construction except for the positions of terminals to which the binary data of the individual colors are applied, the following description will concentrate on the image manipulating circuit of FIG. 14 which is assigned to R by way of example. In the illustrative embodiment, complementary color components are handled for all of the colors R, G and B.

In FIG. 14, a shadow width data register 160, an all zero data register 170 and a decrementing unit 171 are connected at the outputs thereof to a shadow selector 150. The output of the shadow selector 150 is connected to the input of a delay register 173. A CPU bus is connected to the shadow width register 160. Pulses LT0 are applied to the clock terminal of the shadow width register 160. The output of the delay register 173 is connected to the line memory 114R. A reference clock CLK is fed to the clock terminal of the delay register 173. The output of the line memory 114R is connected to the decrementing unit 171 and a shadow detector/comparator 172. The output of the decrementing unit 171 is coupled to one input of an AND gate 120, while the output of the shadow detector/comparator 172 is connected to one input of an AND gate 121. Binary data B, G and R are fed to a NOR gate 122 via inverters 123B, 123G and 123R, respectively. The output of the NOR gate 122 is connected to the other input of the AND gates 121 and 120. The shadow selector 150 has a terminal S₁ connected to the output of the AND gate 120 and receives the binary data R at a terminal S₂ thereof via the inverter 123R.

The image manipulating circuit shown in FIG. 15 is assigned to G and identical with the circuit of FIG. 14 except that binary data G is applied to the terminal S₂ of the shadow selector 150 via the inverter 123G in place of the binary data R. The image manipulating circuit shown in FIG. 16 is assigned to B and is also identical with the circuit of FIG. 14 except that binary data B is applied to the terminal S₂ of the shadow selector 150 via the inverter 123B.

Figure 17:
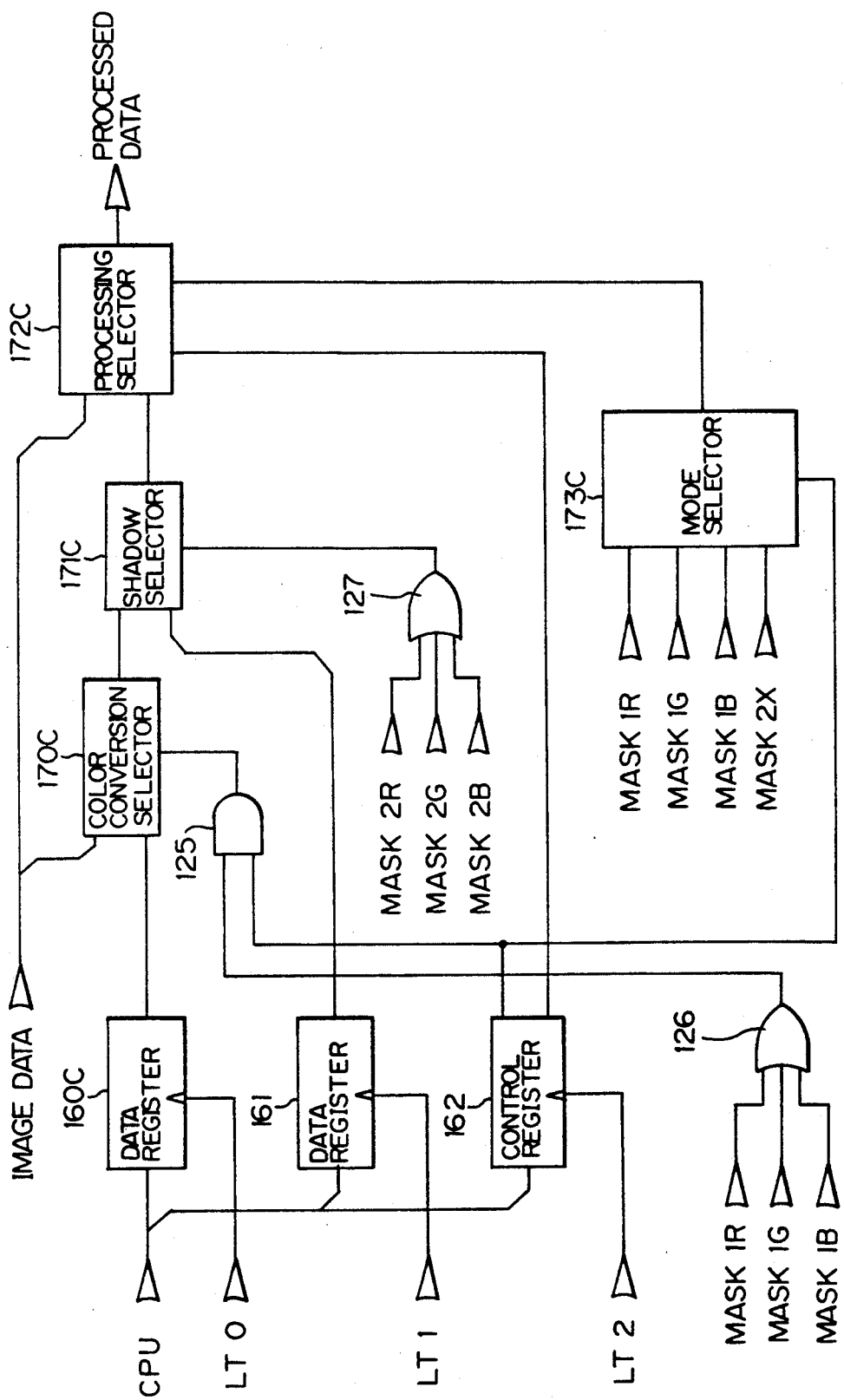
FIG. 17 is a diagram showing a coloring and combining circuit.

FIG. 17 shows a coloring circuit of the illustrative embodiment. This circuit includes data registers 160C and 161, a control register 162, a color conversion selector 170C, a shadow selector 171C, and a processing selector 172C. A CPU bus is connected to the inputs of the data registers 160C and 161 and the output of the control register 162. Strobe signals LT0, LT1 and LT2 are applied to the pulse terminals of the data registers 160C and 161 and control register 162, respectively. The outputs of the data registers 160C and 161 are connected to the inputs of the color conversion selector 170C and shadow selector 171C, respectively. The output of the color conversion selector 170C is connected to the data terminal of the shadow selector 171C. The output of this selector 171C is connected to the input of the processing selector 172C. Image data are applied to the data terminals of the color conversion selector 170C and processing selector 172C. The control register 162 is connected to one input of an AND gate 125, a mode selector 173C, and the processing selector 712C. The output of an OR gate 126 is connected to the other input of the AND gate 125. The mode selector 173C is connected to the processing selector 172C. The output of the OR gate 127 is connected to the shadow selector 171. The outputs of the inverters 123R, 123G and 123B and the output of the AND gate 121, FIGS. 14 through 16, are selectively applied to each of the OR gates 126 and 127 and mode selector 173C. A signal MASK2X fed to the mode selector 173C is associated with the color.

In operation, the R shadow width data register 160, FIG. 14, is loaded with a particular shadow width, the binary data R, G and B are taken in, and data of the immediately preceding line is taken in from the line memory 114R. When the binary data R is "L", the output of the inverter 123R and a signal MASK1R each turns to "H" while the signals on the terminals S₁ and S₂ of the shadow selector 150 turn to "L" and "H", respectively. Hence, the shadow selector 150 selects the data from the shadow width data register 160. This data is delayed by one clock by the delay register 173, then fed to the line memory 114R, and then outputted from the line memory R (114R) one line later. As a result, data shifted 45 degrees rightward and downward is produced. In this instance, signals MASK1R and MASK2R fed to the coloring and combining circuit are "H" and "L", respectively.

When all the binary data R, B and G are "H", the decrementing unit 171 decrements the data read out of the line memory 114R by 1 (one). If the resulting data is not zero, the data is written to the line memory 114R via the shadow selector 150 and delay register 173. If the data of the line memory 114R is zero, data is fed from the all zero data register 170 to the line memory 114R via the shadow selector 150 and delay register 173. When the data of the line memory R is not zero, the output of the shadow detector/comparator 172 is "H". This, coupled with the fact that the output of the NOR gate 122 is "H", turns the signal MASK2R fed to the coloring and combining circuit to "H". When the data of the line memory R is zero, the signal MASK2R turns to "L". Since the output of the inverter 123R is "L", K1R is "L".

If the binary data are not in any of the above-stated two conditions, a color component other than R should exist. Then, zero data is fed to the line memory R. In this condition, both the signals MASK1R and MASK2R turn to "L".

The procedure described above is executed with the other color components G and B as well.

Figure 18:
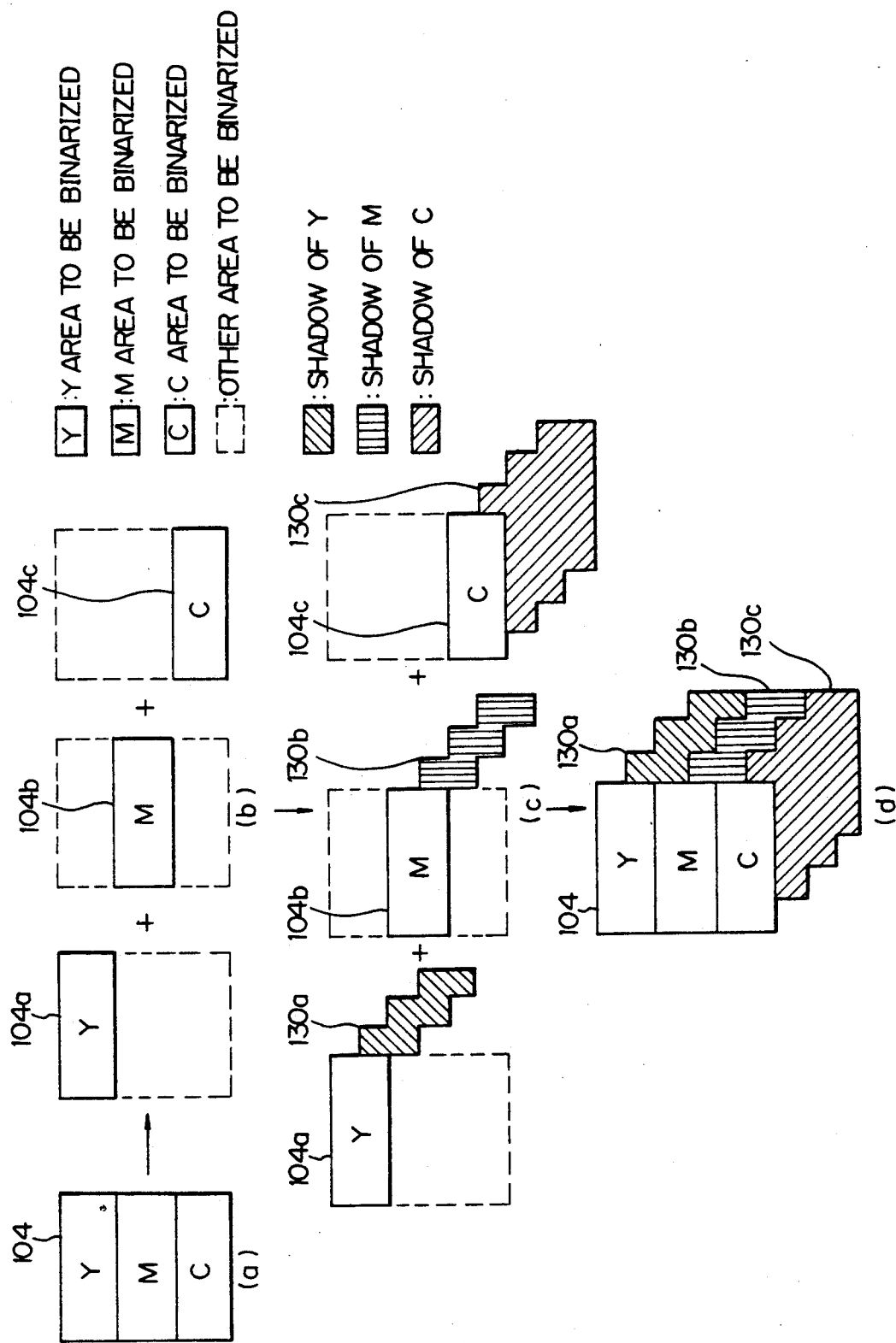
FIG. 18 shows shadow processing.

FIG. 18 demonstrates shadow processing of the illustrative embodiment. As shown, shadows 130a, 130b and 130c are associated with a Y, an M and a C color component 104a, 104b and 104c, respectively, by the shadow processing described above. In this instance, the line memories are conditioned as represented by shadows in (d) of FIG. 18.

In FIG. 17, the data registers 160C and 161 each is loaded with color data. The control register 162 causes the color conversion selector 170C to select either the image data or the color data which is fed from the data register 160C, while causing the mode selector 173C to select a particular mode. Further, the control register 162 determines whether or not to enable the entire circuitry by using the processing selector 172C. When the processing selector 172C sets up a circuit OFF state, image data are directly fed out via the processing selector 172C. When the processing selector 172C sets up a circuit ON state and the color conversion selector 170C selects image data and R, erase data (all 1) is outputted when the signal MASK2R is "H". When the signals MASK2R and MASK2G are "L" and "H", respectively, the data of the data register 161 is outputted. When the signals MASK2R and MASK2G are "L" and the signal MASK2B is "H", the data of the data register 161 is outputted. Further, when all the signals MASK2R, MASK2G and MASK2B are "L", image data are outputted.

When the circuit is ON and the color conversion selector 170 selects color data and R, the same operation as the operation occurring when the selector 170C selects image data is performed except when all the signals MASK2R, MASK2G and MASK2B are "L". When the signal MASK1R is "H" and the signals MASK2R, MASK2G and MASK2B are "L", erase data (all 1) is outputted. When the signal MASK1R is "L", the signal MASK1G is "H", and signals MASK2R, MASK2G and MASK2B are "L", the data of the data register 160C is outputted. When the signals MASK1R and MASK1G are "L", the signal MASK1B is "H", and the signals MASK2R, MASK2G and MASK2B are "L", the data of the data register 160C are outputted. Further, when the signals MASK1R, MASK1G and MASK1B are "L" and the signals MASK2R, MASK2G and MASK2B are "L", image data is outputted.

It is to be noted that the mode selector 173C functions to restore complementary components to original also.

Figure 19:
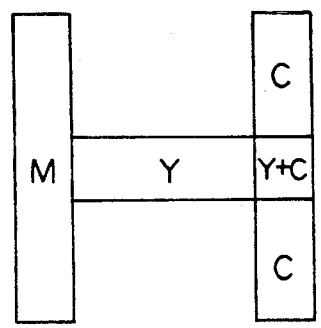
FIGS. 19 through 21 each show shadow processing.
Figure 20:
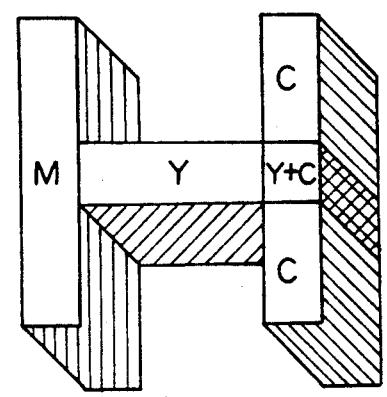
Figure 21:
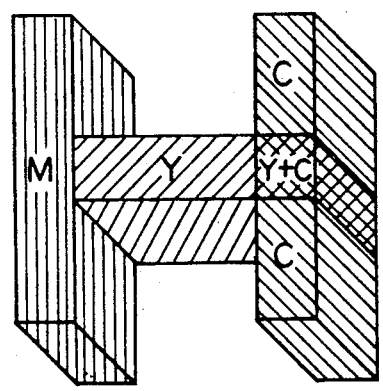

FIGS. 19 through 21 shows image processing available with the illustrative embodiment. Specifically, when the color conversion selector 170C selects image data associated with an original image shown in FIG. 19, original data are outputted as shown in FIG. 20, except for the color data portions. When the color conversion selector 170C selects color data, an image shown in FIG. 21 is produced.

As stated above, with the illustrative embodiment, it is possible to prevent colors of a shadow from interfering with each other and providing an image with a shadow at a position 45 degrees rightward and downward of the image and in colors corresponding to those of the image on a real time basis.

While this embodiment has been shown and described as forming a shadow at a position 45 degrees rightward and downward of an image, such a position and an angle are only illustrative and not limitative.

Second Embodiment

A second embodiment which will be described is also similar in construction to the device shown in FIG. 6. Hence, in the figures, similar components are designated by the same reference numerals, and redundant description will be avoided for simplicity.

Figure 22:
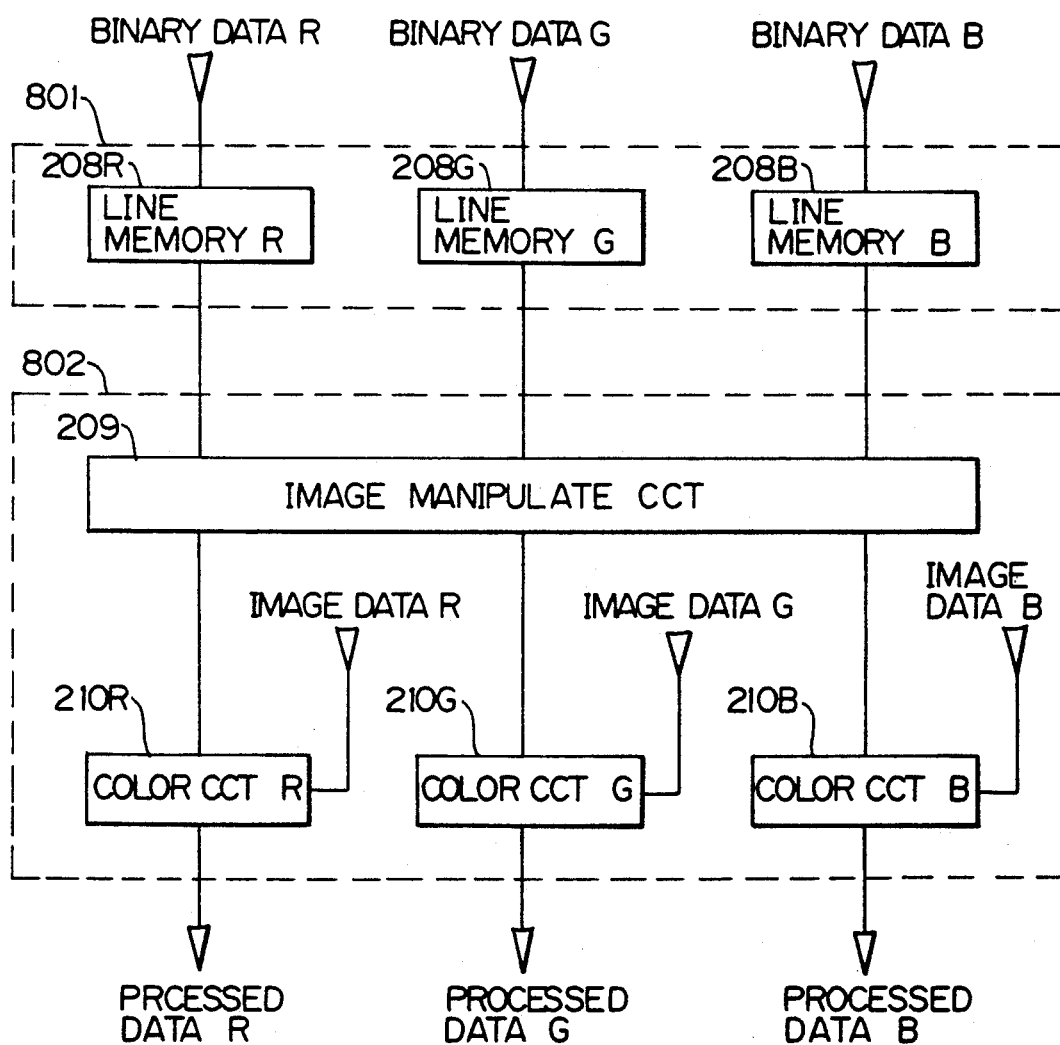
FIG. 22 is a block diagram schematically showing an image reading section and an image processing section representative of a second embodiment of the present invention.
Figure 23:
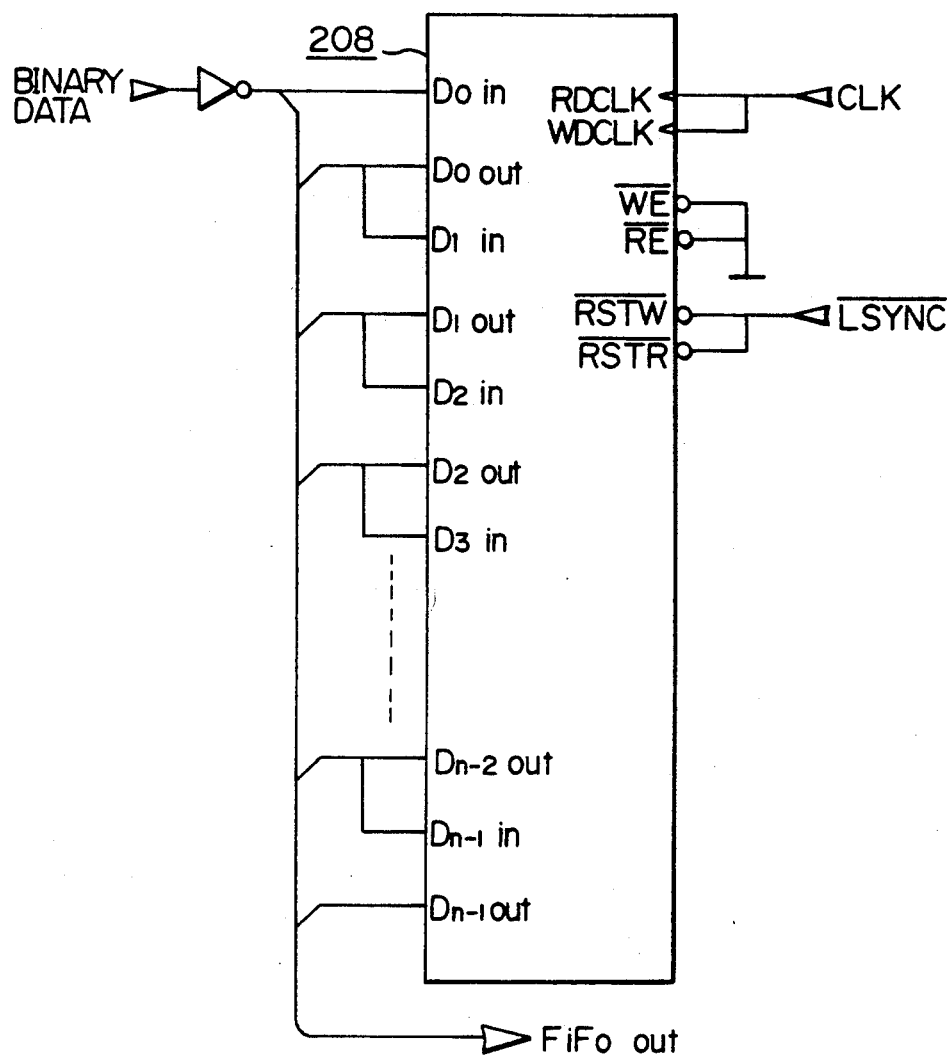
FIG. 23 shows connections of terminals of a line memory.

FIG. 22 shows the image reading section 801 and image processing section 802, FIG. 6, schematically. As shown, binary data of individual colors are applied to line memories 208R, 208G and 208B whose outputs are connected to an image manipulating circuit 209 built in the image processing section 802. Coloring circuits 210R, 210G and 210B are connected to the image manipulating circuit 209. FIG. 23 shows a specific construction of one of the line memories 208R, 208G and 208B. The line memory 208 has a memory device which is implemented with NEC μPD42505. In FIG. 23, 1-bit data which is a complementary component associated with the binary data (binary data R in the case of the line memory 208R) is applied to a terminal $D_{0in}$, while the output on the terminal $D_{0out}$ is fed to a terminal $D_{1in}$. Such connections are repeated up to a terminal $D_{n-1}$. As a result, the output of the line memory 208 is (n−1) lines of data. The line memory 208 with such a configuration is assigned to each of the colors R, G and B so as to read multi-level image data representative of a color image.

Figure 24:
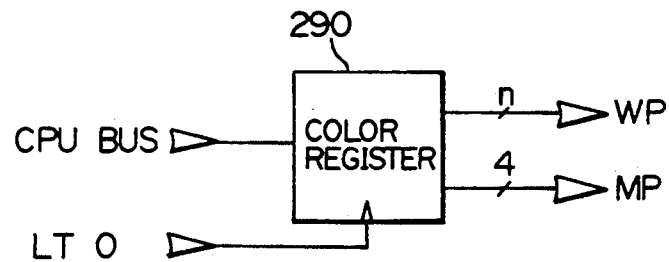
FIG. 24 shows a control register included in an image manipulating circuit.

FIG. 24 shows a specific construction of a control register 290 built in the image manipulating circuit 209. The control register 290 produces a signal WP for setting a data thinning or thickening amount, and a signal MP meant for mode selectors 256 and 257 which will be described with reference to FIG. 25.

Figure 25:
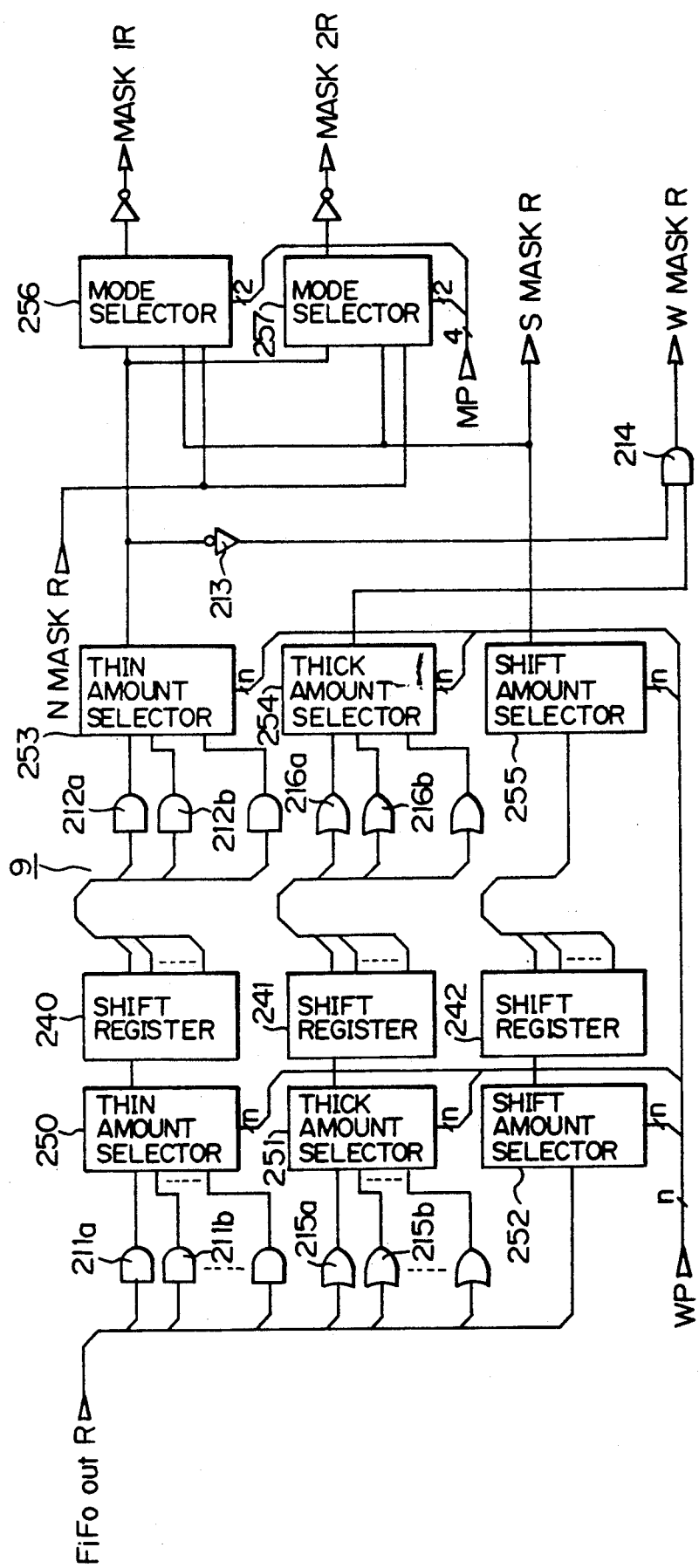
FIGS. 25, 26 and 27 are diagrams showing image manipulating circuits each being assigned to a particular color.
Figure 26:
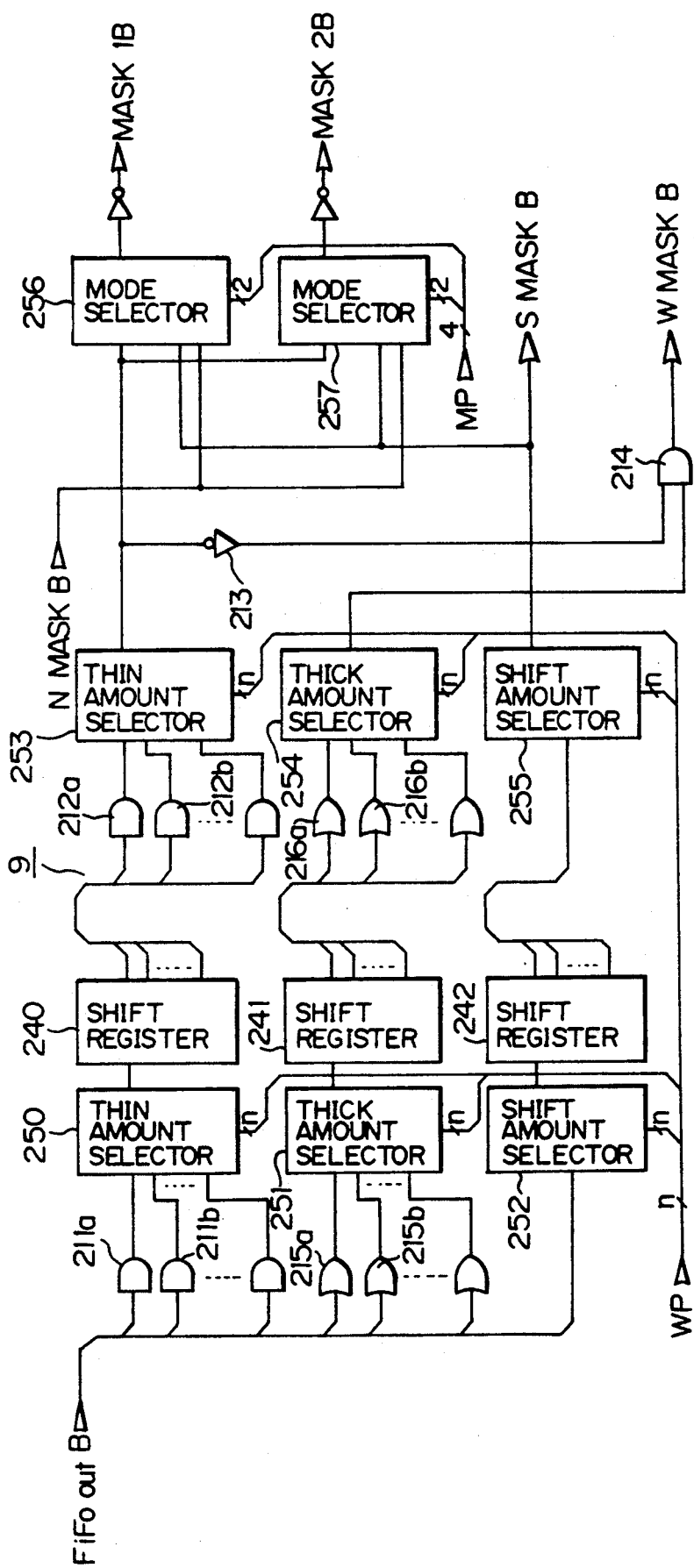
Figure 27:
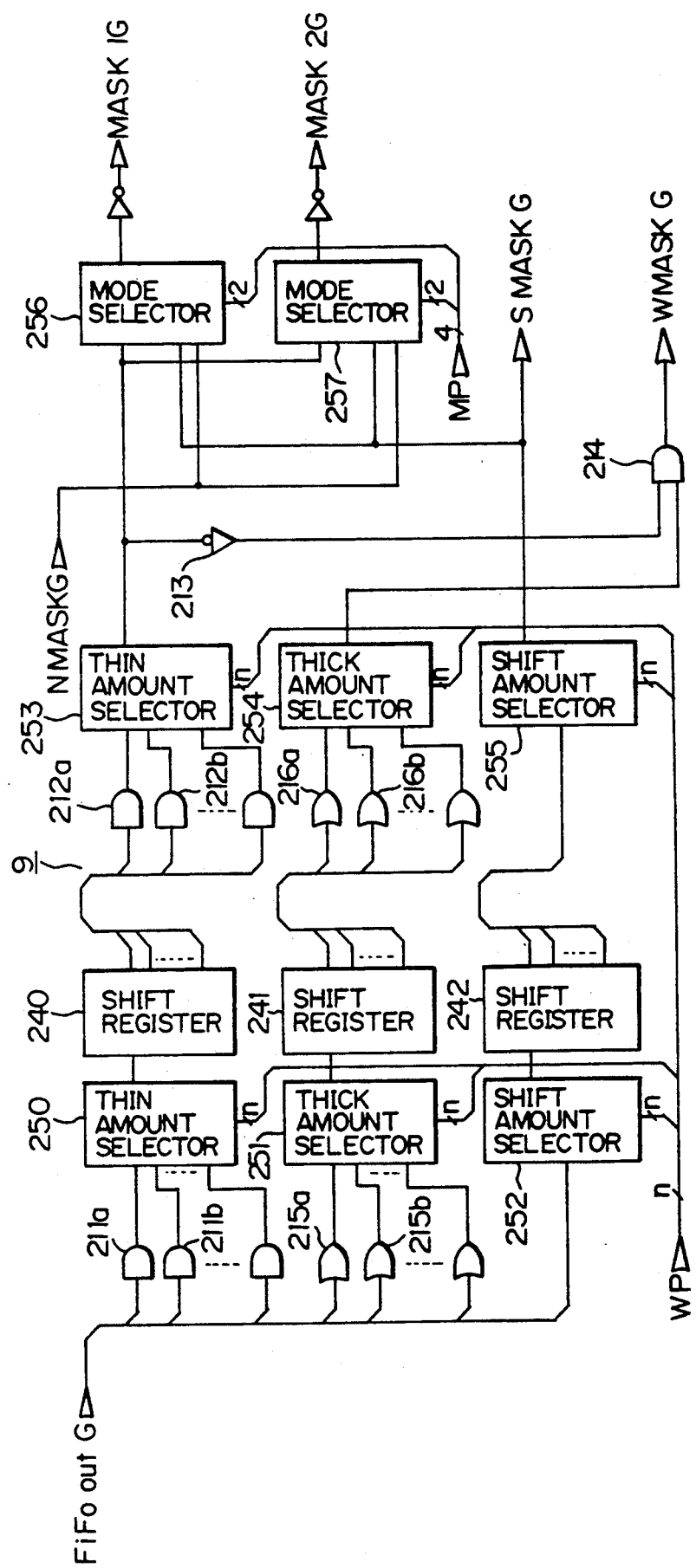

FIGS. 25 through 27 each show a specific construction of the image manipulating circuit 209 which is assigned to a respective one of the colors R, G and B. In the figures, there are shown shift registrs 240, 241 and 242, thinning amount selectors 250 and 253, thickening amount registers 251 and 254, shift amount selectors 252 and 255, and mode selectors 256 and 257. The image processing circuits associated with the individual colors are identical in construction and will be described in relation to R only by way of example.

The data from the line memory 208R (208G, 208B) is applied to (2 m+1) AND gates 211a, 211b and so on, where m is representative of a desired amount of thinning. The outputs of the AND gates 211a, 211b and so on are connected to the input of the thinning amount selector 250 whose output is in turn connected to the input of the shift register 240. The output of the shift register 240 is connected to (2 m+1) AND gates 212a, 212b and so on. The outputs of the AND gates 212a, 212b and so on are connected to the input of the thinning amount selector 253 the output of which is in turn connected to one input of an AND gate 214 via the mode selectors 256 and 257 and an inverter 213.

Likewise, the data from the line memory 208R (208G, 208B) is fed to (2 n+1) OR gates 215a, 215b and so on, n is representative of a desired amount of thickening. The outputs of the OR gates 215a, 215b and so on are connected to the input of the thickening amount selector 251 whose output is connected to the input of the shift register 241. The output of the shift register 241 is connected to (2 n+1) OR gates 216a, 216b and so on. The outputs of the OR gates 216a, 216b and so on are connected to the input of the thickening amount selector 254 whose output is in turn connected to the other input of the AND gate 214. The data from the line memory 208R (208G, 208B) is applied to the input of the shift amount selector 252. Connected to the shift amount selector 252 is the shift register 242. The input of the shift amount selector 252 is connected to the output of the shift register 242, while the output of the shift amount selector 255 is connected to the mode selectors 256 and 257.

The set signal WP from the control register 290 is fed to the thinning amount selectors 250 and 253, thickening amount selectors 251 and 254, and shift amount selectors 252 and 255. The select signal MP is applied to the mode selectors 256 and 257. Also applied to the mode selectors 256 and 257 are corrected and masked data NMASKR (NMASKG, NMASKB). The thinning amount selector 250 selects, among thinned data, any one line to set up a thinning amount in the direction of lines (subscanning direction). The thinning amount selector 253 selects any one line to set up a thinning amount in the subscanning direction. On the other hand, the thickening amount selector 251 selects, among thinned data, any one line to set up a thickening amount in the subscanning direction, while the thickening amount selector 254 selects any one line to set up a thickening amount in the main scanning direction. The shift amount selectors 252 and 255 and shift register 242 serve to correct deviations which will occur during such processing.

The output of the thinning amount selector 253, i.e., thinned data, is selected by the mode selectors 256 and 257 and then fed to a coloring circuit. The output of the thickening amount selector 254, i.e., thickened data, is fed to the AND gate 214. The AND gate 214 ANDs the thickened data and the inverted thinned data to produce a masked signal WMASKR (WMASKG, WMASKB). The shift amount selector 255 produces deviation corrected data SMASKR (SMASKG, SMASKB).

Figure 28:
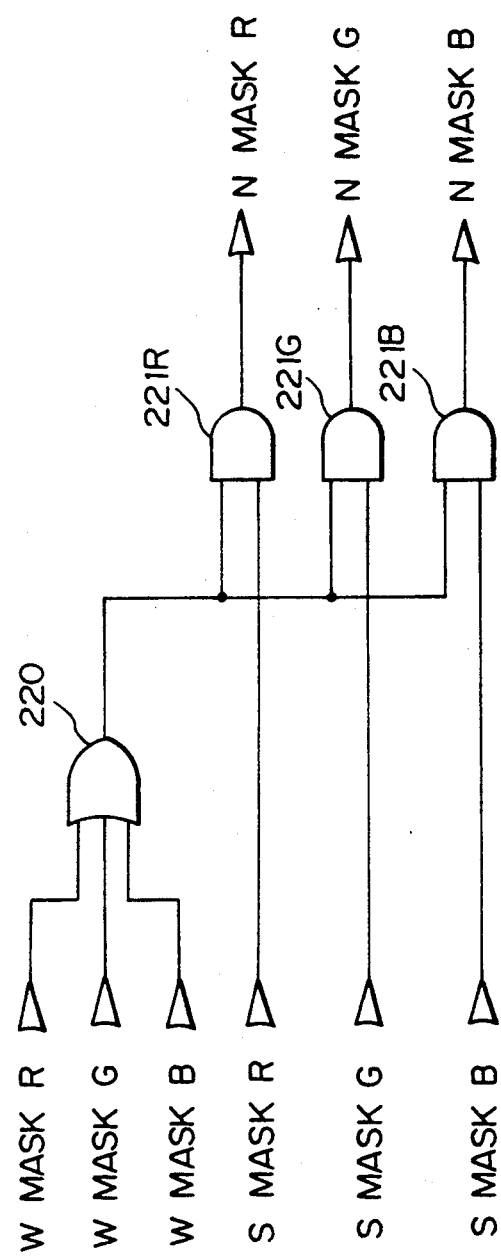
FIG. 28 is a diagram showing a correcting circuit.

FIG. 28 shows a correcting circuit having an OR gate 220 to which the masked signals associated with individual colors WMASKR, WMASKG and WMASKB are applied. AND gates 221R, 221G and 221B AND the output of the OR gate 220 and the deviation corrected data SMASKR, SMASKG and SMASKB of individual colors, respectively. As a result, corrected masked data NMASKR, NMASKG and NMASKB are produced.

Figure 29:
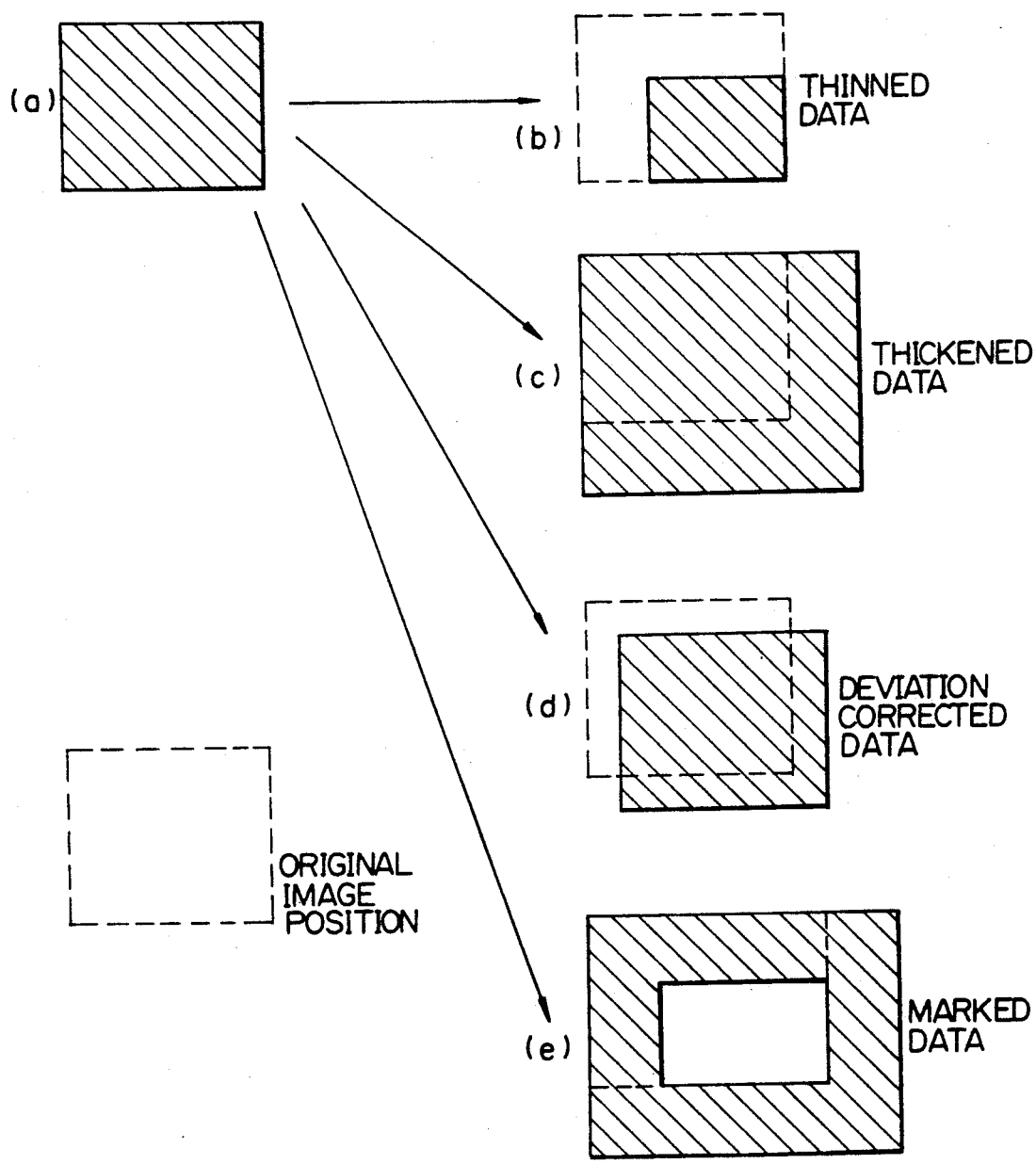
FIG. 29 shows thinned data, thickened data, corrected data, and masked data.

FIG. 29 shows original image data (a), thinned data (b), thickened data (c), corrected data (d), and masked data (e).

Figure 30:
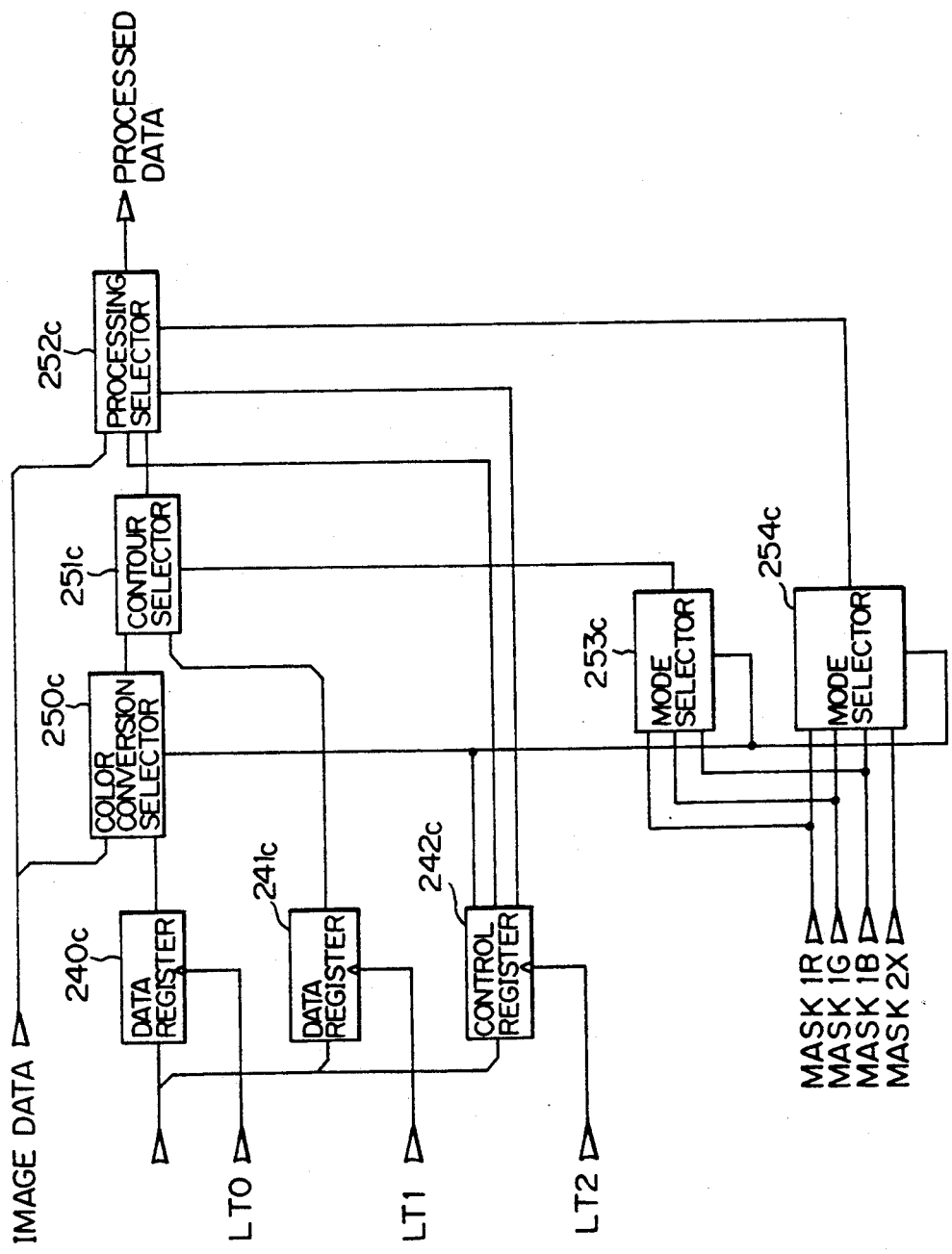
FIG. 30 is a diagram showing a coloring circuit.

FIG. 30 shows a coloring circuit which has data registers 240C and 241C, a control register 242C, a color conversion selector 250C, a contour selector 252C, a processing selector 252C, and mode selectors 253C and 254C. As shown, a CPU data bus is connected to the inputs of the data registers 240C and 241C and the input of the control register 242C. Write strobes LT0 and LT1 set color data in the data registers 240C and 241C, respectively. A write strobe LT2 sets control data in the control register 242C. The color conversion selector 250C is connected to the output of the data register 240C. The contour selector 251C is connected to the output of the color conversion selector 250C. The output of the data register 241C is connected to the contour selector 251C. The processing selector 252C is connected to the output of the contour selector 251C.

The output of the control register 142C is connected to the color conversion selector 250C, mode selectors 253C and 254C, and processing selector 252C. The outputs of the mode selectors 253C and 254C are connected to the contour selector 251C and processing selector 252C, respectively. Inverted output signals MASK1 and MASK2 of the mode selectors 256 and 257 and associated with the individual signals are applied to the mode selectors 253C and 254C. The control register 242C causes the color conversion selector 250C to select either one of image data and color data, while controlling the mode selectors 253C and 254C to change the processing. A data input signal to the processing selector 252C is associated with all 1 (positive) and all 0 (negative) in the erase area. The control line determines whether or not to enable the entire circuit.

When the circuit is OFF, the processing selector 252C selects image data. When the circuit is ON, the processing selector 252C selects data in response to ON and OFF of the mode selectors 253C and 254C, as shown in Table 1 below.

TABLE 1

| MODE SELECTOR 253C | MODE SELECTOR 254C | SELECTED DATA |
| --- | --- | --- |
| ON | ON | COLOR CONVERSION SELECTOR |
| ON | OFF | DATA ERASE DATA OF 250C |
| OFF | ON | DATA REGISTER |
| OFF | OFF | DATA ERASE DATA OF 241C |

The content of processing of the mode selector 253C depends on the output of the color conversion selector 250C. Specifically, when the color conversion selector 250C selects color data of the data register 240, the mode selector 253C produces an output MASK1X. When the color conversion selector 250C selects image data, the mode selector 253C produces OR of MASK1R, MASK1G and MASK1B. Likewise, the content of processing of the mode selector 254C depends on the output of the color conversion selector 250C. Specifically, when the color conversion selector 250C selects color data of the data register 240C, the mode selector 254C produces NOR of MASK1X and MASK2X. When the color conversion selector 250C selects image data, the mode selector 254C produces a logical output produced by:

$$(\text{MASK1R OR MASK1G or MASK1B}) \text{ or } \text{MASK2X}$$

The mode selector 254C restores the complementary component to original.

FIG. 31 demonstrates image processing practicable with this embodiment. As shown, image data representative of an original image 230 is read ((a), FIG. 31). The image data is separated into C, M and Y color components 230$a$, 230$b$ and 230$c$ ((b), FIG. 31). The color components 230$a$, 230$b$ and 230$c$ are individually masked by the previously stated thickening and thinning procedure to be thereby converted into masked C component 231$a$, M component 231$b$, and Y component 231$c$ ((c), FIG. 31). The masked components 231$a$, 231$b$ and 231$c$ are combined ((d), FIG. 31) and then colored with the original image being referenced ((e), FIG. 31).

FIG. 32 shows another image processing practicable with the illustrative embodiment. As shown, image data representative of an image 230 is read ((a), FIG. 32). The image data is separated into a C component 230$a$ and a Y component 230$c$ ((b), FIG. 32). The components 230$a$ and 230$c$ are individually masked by the thinning and thickening procedure to produce a C component 231$a$ and a Y component 231$c$ ((c), FIG. 32). The components 231$a$ and 231$c$ are combined ((d), FIG. 32) and then colored with the original image being referenced ((e), FIG. 32).

FIG. 33 shows specific images which may be produced by this embodiment. When an original image 235 ((a), FIG. 33) is to be transformed into a processed image 236 ((b), FIG. 33), the color conversion selector 250C outputs image data and the signals MASK1X and MASK2X are a thinned signal and a masked signal, respectively. To produce a processed image 237 ((c), FIG. 33), the color conversion selector 250C outputs color data and the signals MASK1X and MASK2X are a thinned signal and either one of a masked and a deviation corrected signal, respectively. To produce a processed image 238 ((d), FIG. 33), the color conversion selector 250C outputs image data and the signals MASK1X and MASK2X both are thinned signals. To produce a processed image 239 ((e), FIG. 33), the color conversion selector 250$c$ outputs color data and the signals MASK1X and MASK2X both are masked signals.

In the processed images (b) and (d) shown in FIG. 33, a non-binarized image is also outputted in the binarized image areas of the individual colors and representative data of the original image 235 ((a), FIG. 33).

The masked and thinned images may be colored in any of seven colors, i.e., R, G, B, C, M, Y and Bk (black).

It will be seen that this embodiment eliminates the contradiction in colors ascribable to the color-by-color masking and thinning procedures by thickening processing and the masking and combining processing.

Furthermore, with the illustrative embodiment, it is possible to mask a color original document (logotype) color by color (Y, M, C, Bk, R, G and B).

Third Embodiment

Figure 34:
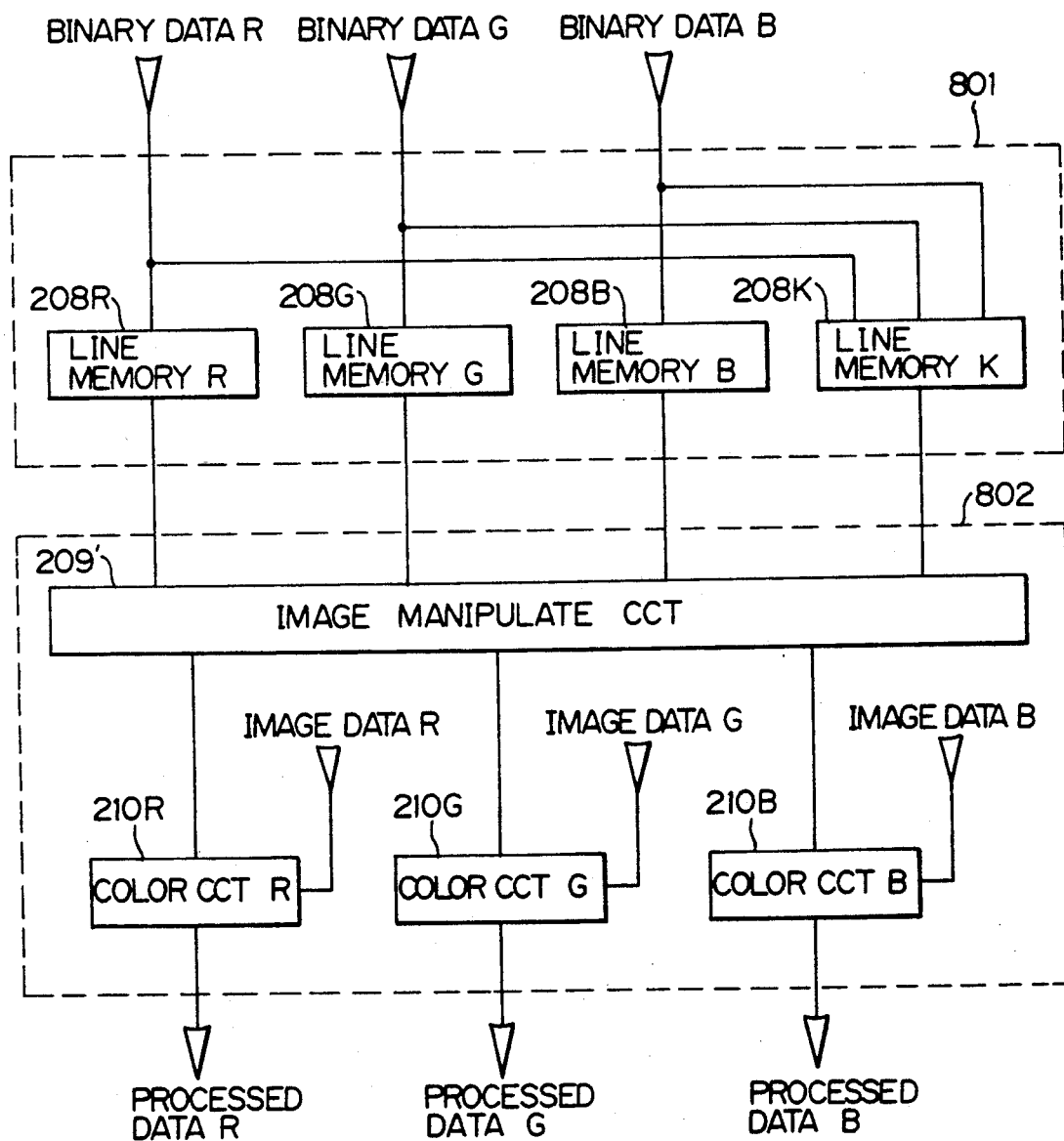
FIG. 34 is a block diagram schematically showing an image reading section and an image processing section representative of a third embodiment of the present invention.

Referring to FIG. 34, there is shown an image reading section and an image processing section representative of a third embodiment of the present invention. In the figure, the components identical with the components shown in FIG. 22 are designated by the same reference numerals.

Figure 35:
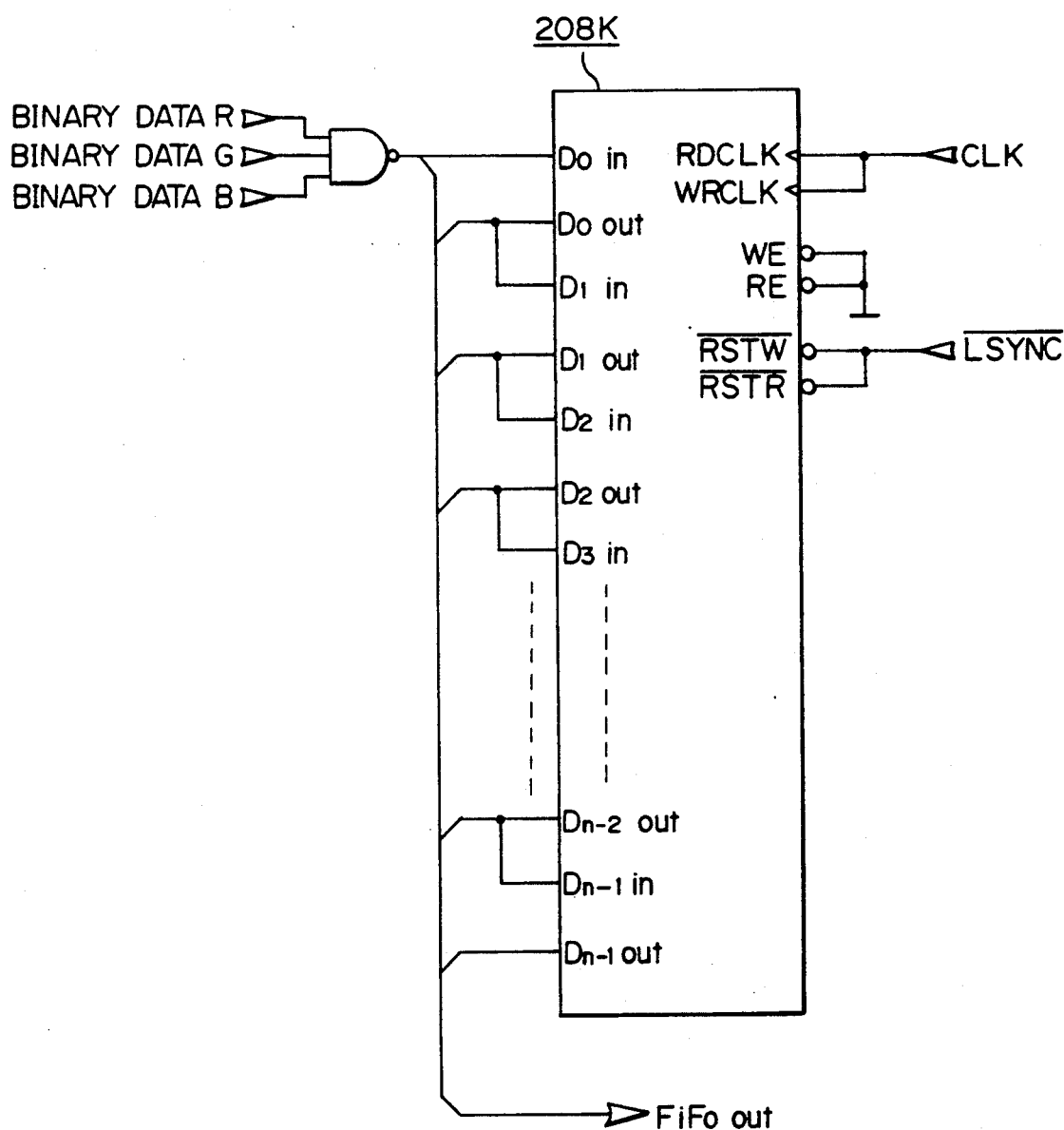
FIGS. 35 and 36 each show connections of terminals of a line memory.

FIG. 35 shows a first line memory included in this embodiment and implemented with a memory device NEC $\mu$42505C. Binary data R, G and B associated image data are applied to the first line memory, and 1-bit data is fed to a terminal $D_{0in}$ with components other than a white component being in "H". The first line memory is used as a line memory 208K shown in FIG. 34. The other terminals are connected and operated in the same manner as described with reference to FIG. 12.

Figure 36:
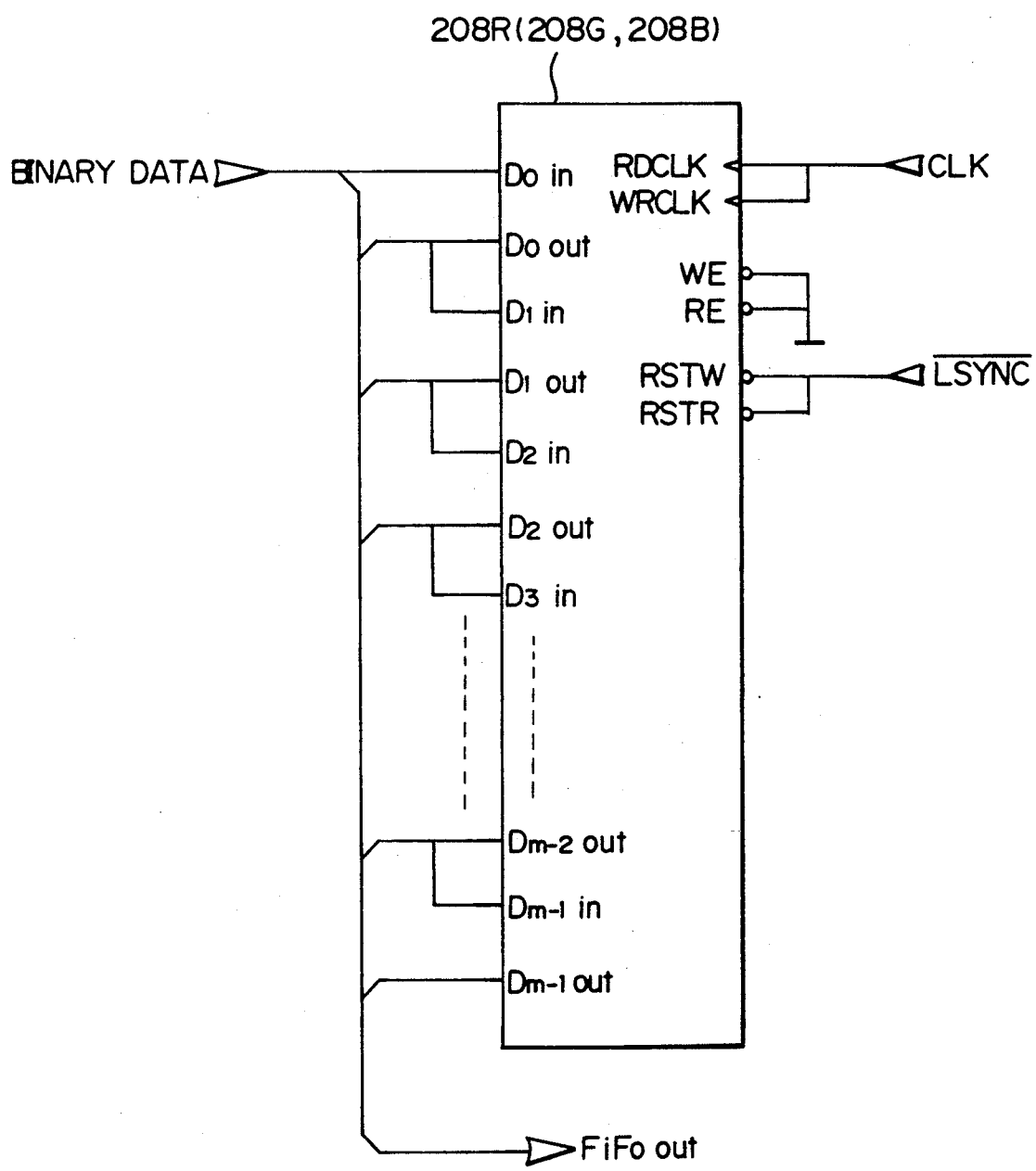

FIG. 36 shows a second line memory also included in the illustrative embodiment and implemented with NEC $\mu$PD42505C. Binary data R (associated with line memory 208R) is applied to the second line memory as 1-bit data. The second line memory is used as each of the line memories 208R, 208G and 208B shown in FIG. 34. The other terminals are connected and operated in the same manner as described with reference to FIG. 12.

Figure 37:
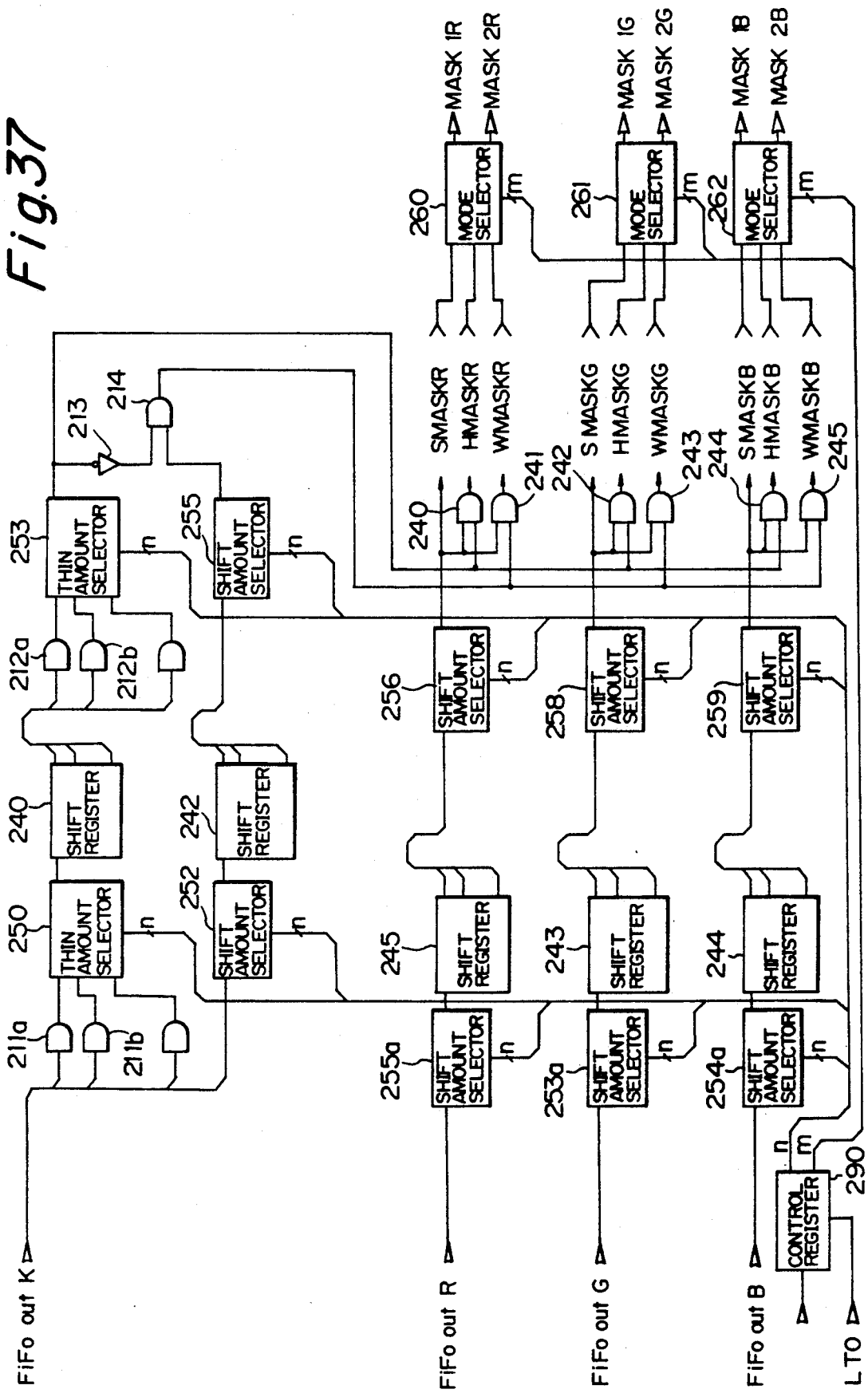
FIG. 37 is a diagram showing an image manipulating circuit.

FIG. 37 shows an image manipulating circuit of the illustrative embodiment. In the figure, components identical with the components shown in FIg. 25 are designated by the same reference numerals. As shown, the image manipulating circuit has shift amount selectors 225$a$, 253$a$ and 254$a$ assigned to binary data R, G and B, respectively. The circuit is void of the thickening amount processing circuit section shown in FIG. 25. A shift register 245 is connected to the shift amount selector 255$a$. The output of the shift register 245 is connected to a shift amount selector 256. A shift register 243 is connected to the shift amount selector 253$a$. The output of the shift register 243 is connected to a shift amount selector 258. A shift register 244 is connected to the shift amount selector 254$a$. The output of the shift register 244 is connected to a shift amount selector 259.

A thinning amount selector 253 identical with the selector 253 of FIg. 25 is connected at its output to one input of an AND gate 214 via an inverter 213. A shift amount selector 255 identical with the selector 255 of FIG. 25 is connected at its output to the other input of the AND gate 214. The output of the shift amount selector 256 is connected to one input of AND gates 240 and 241. The output of the shift amount selector 258 is connected to one input of AND gates 242 and 243. The output of the shift amount selector 259 is connected to one input of AND gates 244 and 245. The output of the thinning amount selector 253 is connected to the other input of the AND gates 240, 242 and 244. The output of the AND gate 214 is connected to the other input of the AND gates 241, 243 and 245.

The output of the shift amount selector 256 and the outputs of the AND gates 240 and 241 are connected to a mode selector 260. The output of the shift amount selector 258 and the outputs of the AND gates 242 and 243 are connected to a mode selector 261. The output of the shift amount selector 259 and the outputs of the AND gates 244 and 245 are connected to a mode selector 262. A control register 290 is connected to the shift amount selectors 255$a$, 253$a$, 254$a$, 252, thinning amount selector 256, shift amount selectors 256, 258 and 259, thinning amount selector 253, shift amount selector 255, and mode selectors 260, 261 and 262.

The rest of the construction of this embodiment is identical with the second embodiment.

In FIG. 37, the output signals SMASKR, SMASKG and SMASKB of the shift amount selectors 256, 258 and 259 are corrected data. The output signals HMASKR, HMASKG and HMASKB of the AND gates 240, 242 and 244 are thinned data. The output signals WMASKR, WMASKG and WMASKB of the AND gates 241, 243 and 245 are masked data.

This embodiment is capable of processing an image in the same manner as described with reference to FIG. 25.

Figure 38:
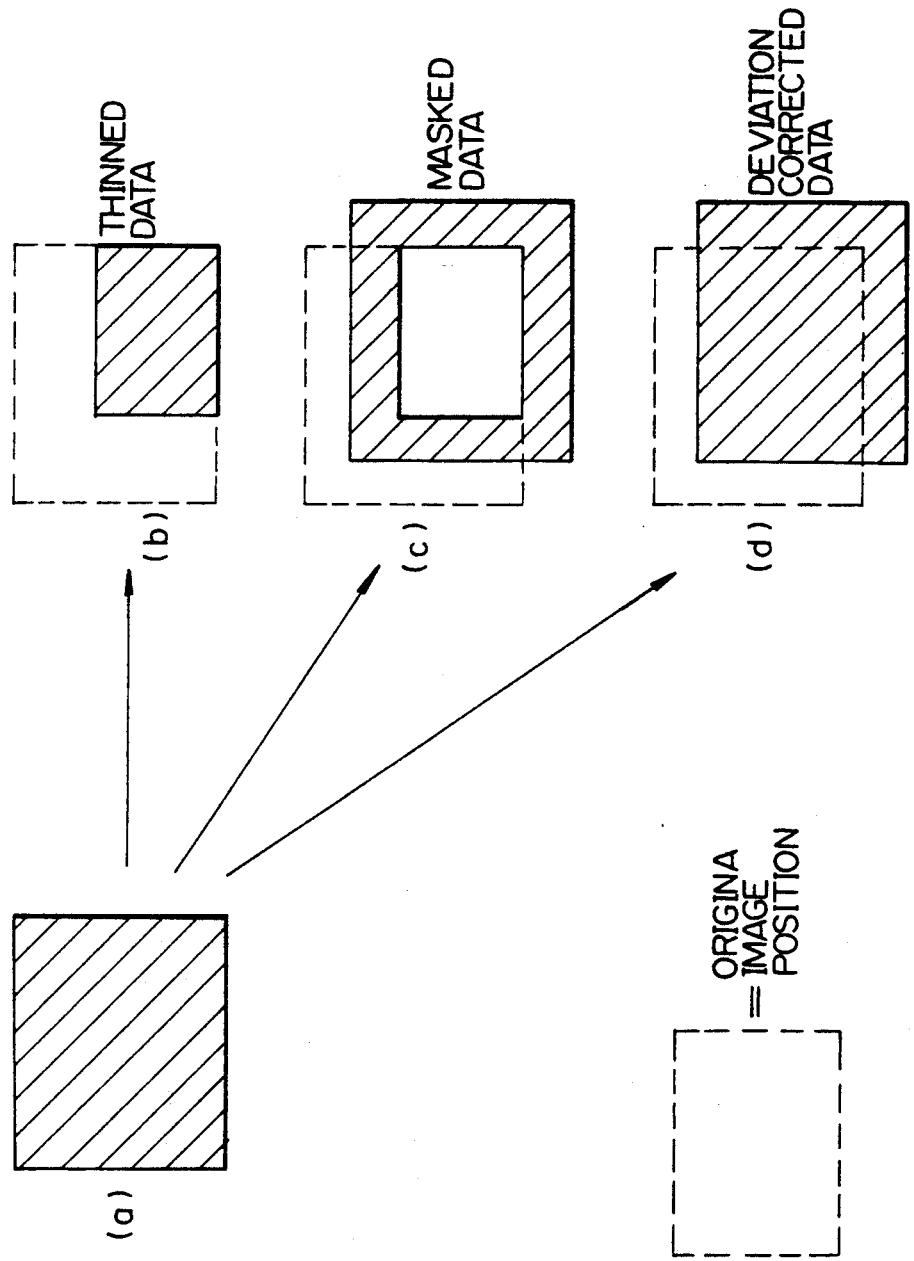
FIG. 38 shows thinned data, masked data, and deviation corrected data.

FIG. 38 shows original image data (a), thinned data (b), masked data (c), and deviation corrected data (d) produced by this embodiment.

The illustrative embodiment colors an image in exactly the same manner as the second embodiment, and redundant description will be avoided for simplicity.

Figure 39:
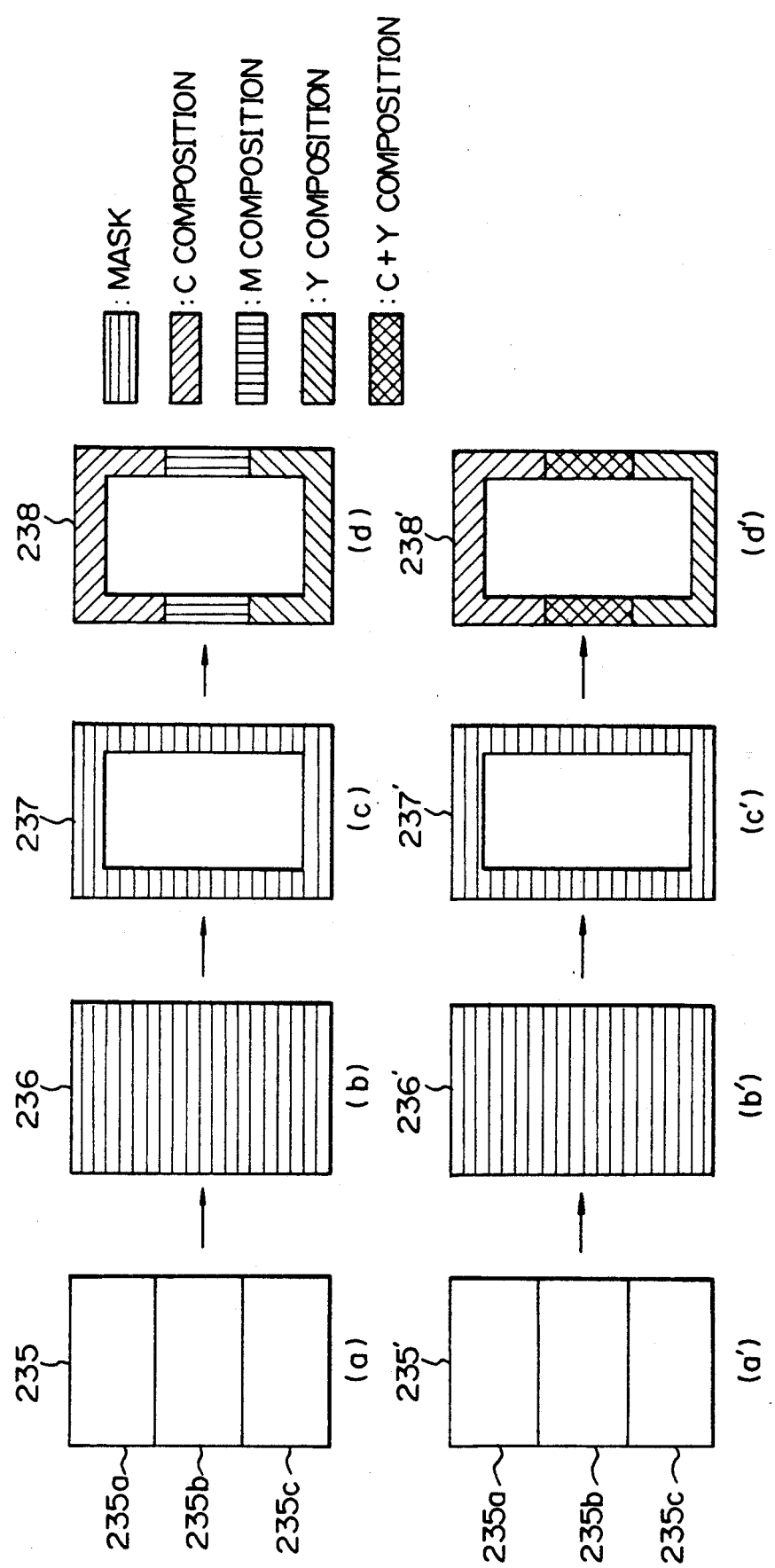
FIG. 39 shows image processing.

FIG. 39 shows specific image processing practicable with this embodiment. As shown, image data representative of an original image 235 is read ((a), FIG. 39). The read image data is binarized and masked ((b), FIG. 39) to produce a masked image ((c), FIG. 39). Finally, the masked image is colored with reference to the original image 235 ((d), FIG. 39).

FIG. 40 shows specific processed images which may be produced by the illustrative embodiment. An original image is shown in (a) of FIG. 40. When a processed image 251 (b) is produced, the color conversion selector 250C, FIG. 30, outputs image data while the signals MASK1X and MASK2X are the thinned signal and masked signal, respectively. To form a processed image 252 (c), the color conversion selector 250C outputs color data while the signals MASK1X and MASK2X each are either one of the thinning signal and deviation corrected signal. To transform a processed image 253 (d), the color conversion selector 250C selects image data while both the signals MASK1X and MASK2X are the thinning signals. To form a processed image 254 (e), the color conversion selector 250C selects color data while both the signals MASK1X and MASK2X are the masked signals.

It is to be noted that in (b) and (d) of FIG. 40 the nonbinarized image is also outputted in the image areas of individual colors which are to be binarized, constituting data representative of the original image 250.

The masked image and thinned image may be colored in several different colors (R, G, B, C, M, Y and Bk).

As stated above, the illustrative embodiment eliminates the contradiction in color ascribable to the color-by-color masking and thin processing by binarizing a white component and other color components of an image and then executing masking.

Since this embodiment masks an original image easily and executes processing by referencing individual colors of the original image, it is capable of trimming or filling ((b), FIG. 40) characters or similar images without effecting tones thereof.

Figure 41:
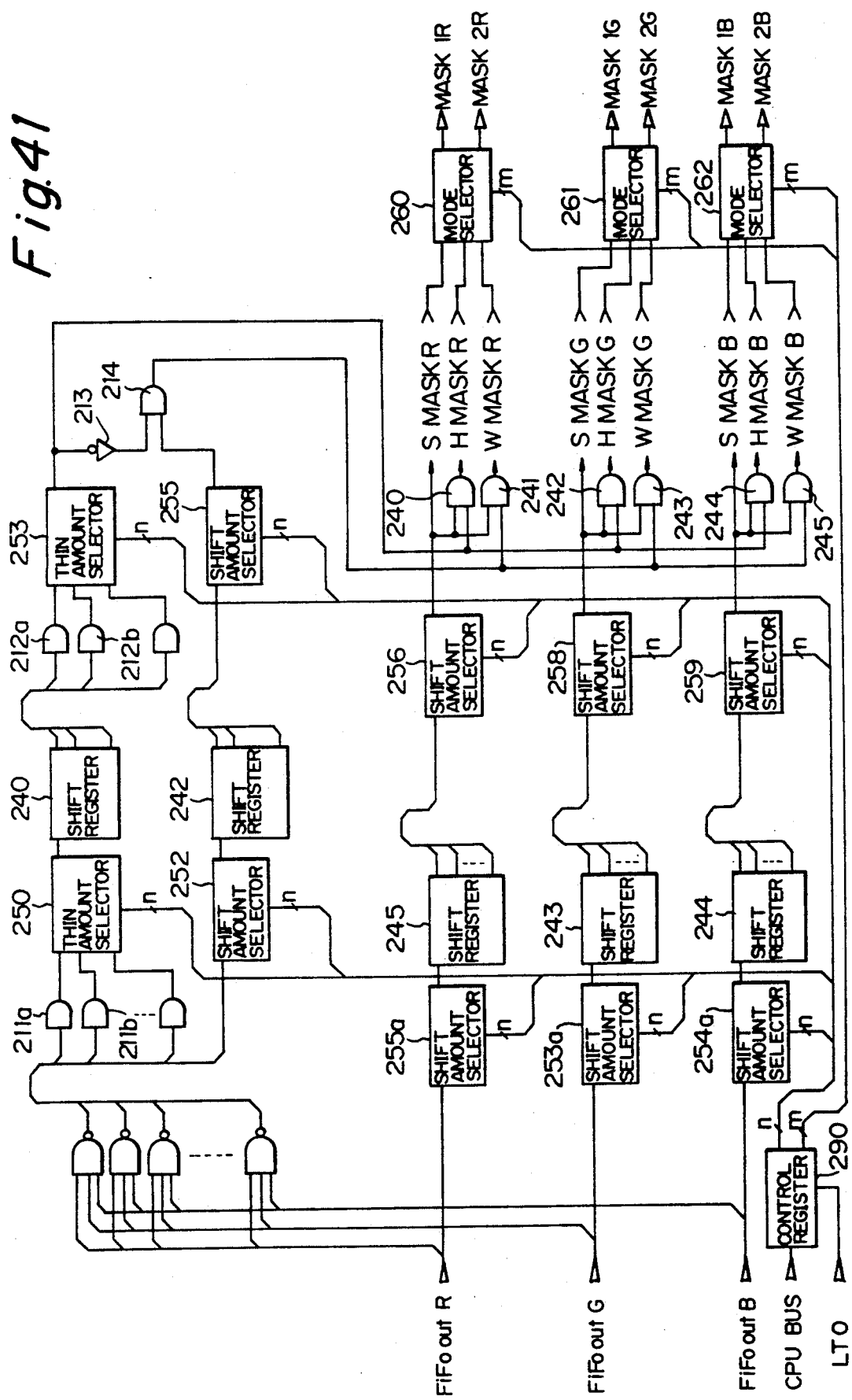
FIG. 41 is a diagram showing another specific construction of the image manipulating circuit included in the second embodiment.

FIG. 41 shows another specific construction of the image manipulating circuit included in this embodiment. This circuit is constructed such that the NAND gate produces an output when the output of the FIFO memory is absent. This eliminates the need for the line memory otherwise assigned to white. With the circuit of FIG. 41, it is possible to implement a modification of this embodiment which uses the image reading section and image processing section shown in FIG. 22, the line memory shown in FIG. 36, and the coloring circuit shown in FIG. 30. Such a modification will reduce the required capacity of a line memory to ⅔.

As described above, the second and third embodiments are free from the contradiction in color in a processed image which is produced by color-by-color mask and thin processing. The resultant image, therefore, appears as natural as an original image.

Fourth Embodiment

A fourth embodiment which will be described is implemented with the same circuitry as the second or third embodiment and is different from the latter only in the processing sequence. Hence, the circuitry of the fourth embodiment will not be described specifically.

Figure 42:
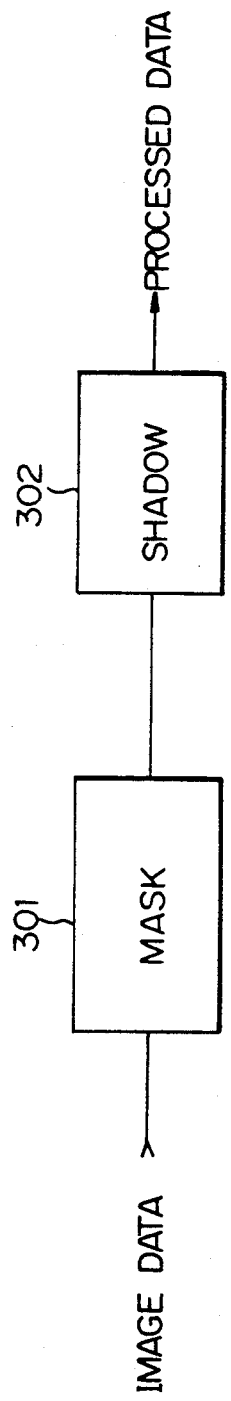
FIG. 42 is block diagram schematically showing a circuit for executing mask processing and then shadow processing in a fourth embodiment of the present invention.

Basically, this embodiment effects mask processing and shadow processing by forming an auxiliary image. In addition, the illustrative embodiment provides a resultant image with a particular effect by changing the sequence of the individual processing. Specifically, in the first to third embodiments, the shadow and mask processing each is effected in such a manner as to free a resultant image from contradiction in color. In contrast, as shown in FIG. 42, this embodiment applies input image data to a mask processing section 301 to mask it, applies the masked image data to a shadow processing section 302, and then outputs the processed data. Alternatively, as shown in FIG. 43, the embodiment may apply input image data to the shadow processing section 302, apply the image data with a shadow to the mask processing section 301, and then output the processed data.

Figure 44:
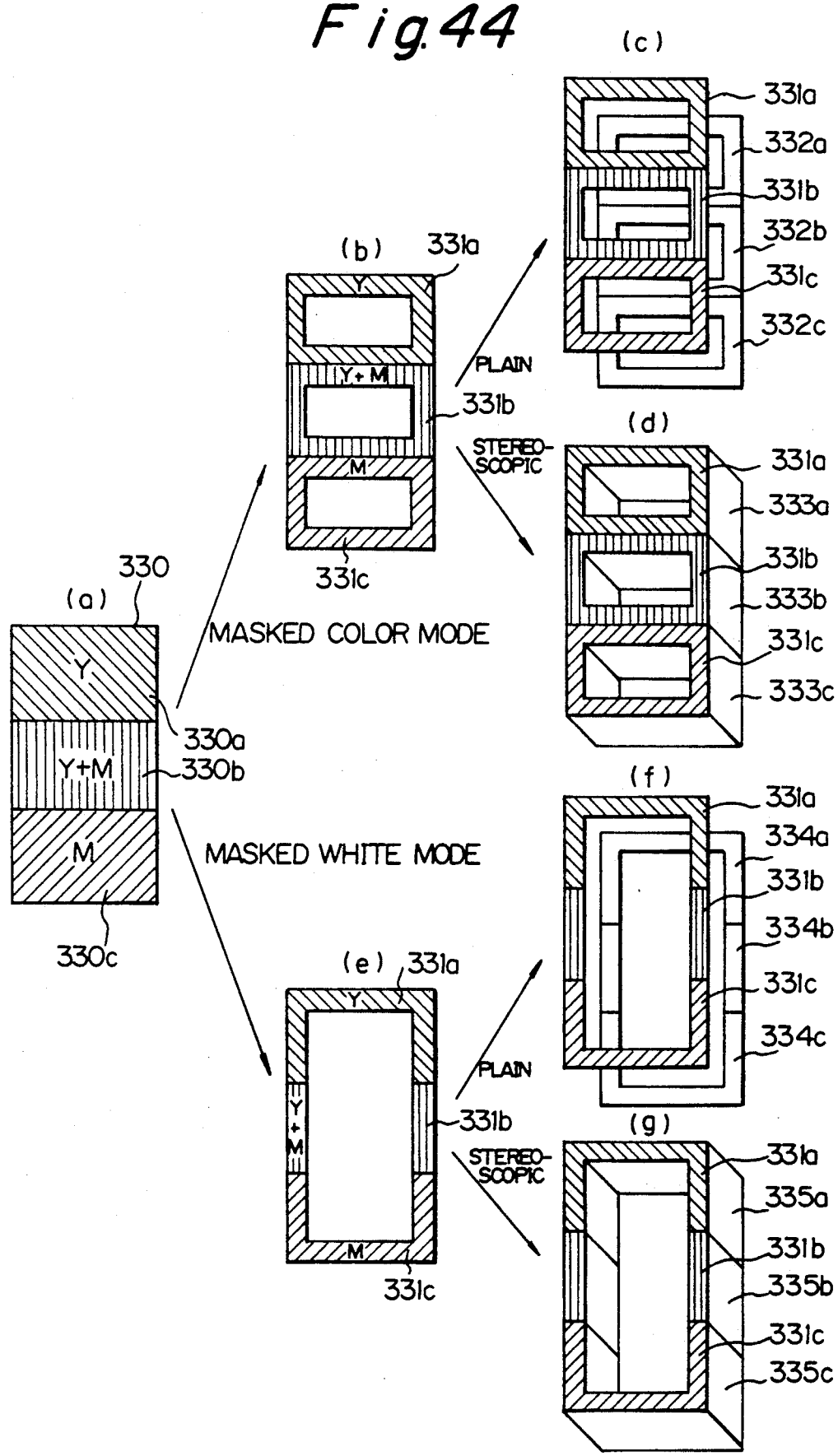
FIG. 44 shows a processed image produced by the circuit of FIG. 42.

Assume that the mask processing is executed first, as shown in FIG. 42. Then, as shown in FIG. 44, an original image 330 (a) is separated into a Y component 330a, a (Y+M) component 330b and an M component 330c. The individual color components 330a to 330c are masked as in the mask processing shown in FIG. 32 (masked color mode). Thereafter, the masked color components are colored with the colors of the original image (a) being referenced to thereby produce a Y component 331a, a (Y+M) component 331b, and an M component 331c ((b), FIG. 44). When the plain shadow processing described with reference to FIG. 11 is executed with the components 331b to 331c, shadows 332a, 332b and 332c will be produced ((c), FIG. 44). On the other hand, when the stereoscopic shadow processing shown in FIG. 18 is executed, shadows 333a, 333b and 333c will be produced ((d), FIG. 44).

Another procedure shown in FIG. 44 is such that the original image 330 ((a), FIG. 44) is masked by the processing shown in FIG. 39 (masked white mode), and then colored as the components 331a to 331c ((e), FIG. 44). Applying the plain shadow processing to the components 331a to 331c will produce shadows 334a to 334c ((f), FIG. 44), while applying the stereoscopic shadow processing will produce shadows 335a to 335c ((g), FIG. 44). In such a sequence of steps, the portions 331a, 331b and 331c are colored by Y, (Y+M) and M data, respectively, during the course of mask processing. The portions 332a, 333a, 334a and 335a, the portions 332b, 333b, 334b and 335b, and the portions 332c, 333c, 334c and 335c are colored by Y, (Y+M) and M data, respectively, during the course of shadow processing.

Figure 43:
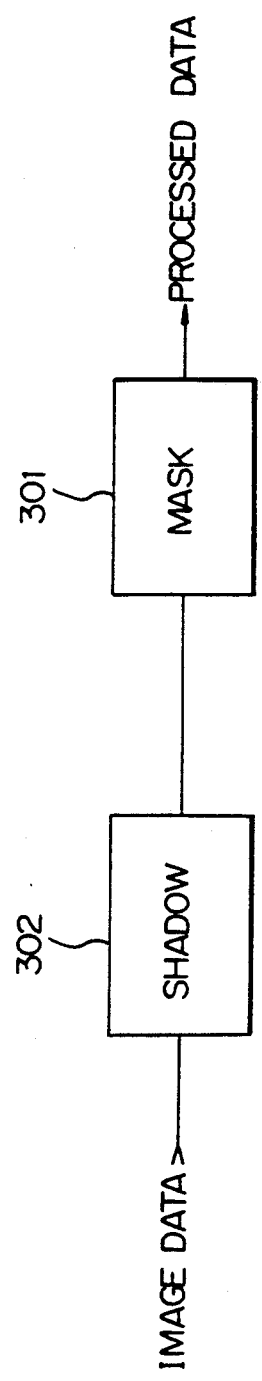
FIG. 43 is a block diagram schematically showing a circuit for executing shadow processing and then mask processing.
Figure 45:
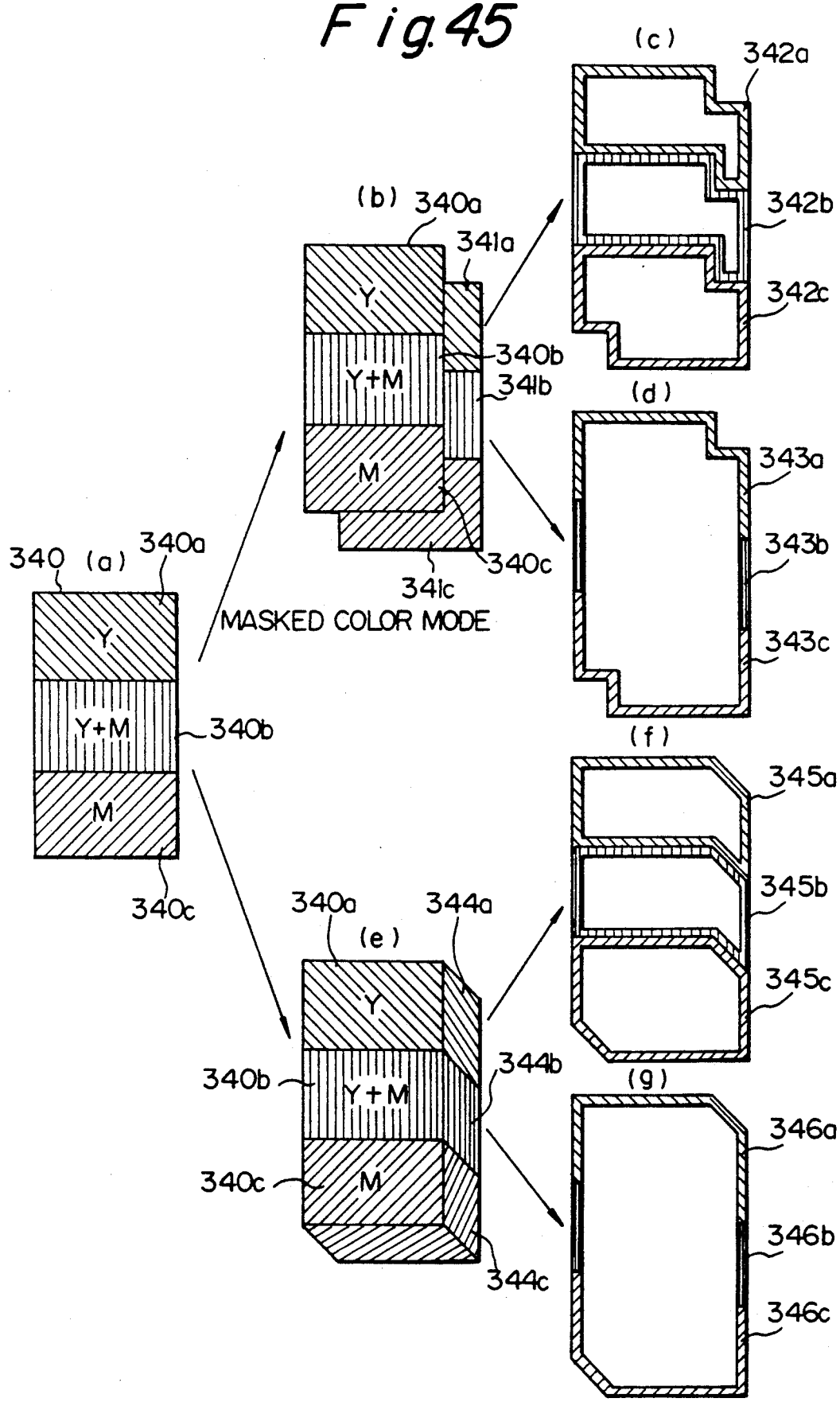
FIG. 45 shows a processed image produced by the circuit of FIG. 43.

On the other hand, assume that the shadow processing is executed first, as shown in FIG. 43. Then, as shown in FIG. 45, an original image 340 ((a), FIG. 45) is separated into a Y component 340a, a (Y+M) component 340b and an M component 340c. Executing the plain shadow processing with the individual components 340a to 340c produces shadows, i.e., a Y component 341a, a (Y+M) component 341a and an M component 341c by referencing the colors of the original image 340 ((b), FIG. 45). Subsequently, mask processing is executed in the previously stated masked color mode to produce contour areas 342a to 342c of the individual colors ((c), FIG. 45). Alternatively, mask processing may be executed in the masked white mode to leave only the contour of the entire image ((d), FIG. 45). In the contour (d), portions 343a, 343b and 343c corresponding respectively to the image portions 340a, 340b and 340c and the shadow portions 341a, 341b and 341c are colored in Y, (Y+M) and M with reference to the colors of the original image 340.

When the stereoscopic shadow processing is executed with the original image 340, a Y component 334a, a (Y+M) component 334b and an M component 344c are produced as shadows on the basis of the colors of the original image 340 ((e), FIG. 45). Applying the masked color mode to such image components and shadow components produces masked contour areas 345a, 345b and 345c which are colored in Y, (Y+M) and M ((f), FIG. 45). Alternatively, the masked white mode may be executed with the image and shadow components (e) to leave the contour of the entire image ((g), FIG. 45). In the contour (g), portions 346a, 346b and 346c corresponding respectively to the image portions 340a, 340b and 340c and shadow portions 344a, 344b and 344c ((e), FIG. 45) are colored in Y, (Y+M) and M with reference to the colors of the original image 340. In such a sequence of steps, portions 341a to 341c and portions 344a, 344b and 344c are colored respectively in Y, (Y+M) and M during the course of shadow processing, while portions 342a, 343a, 335a and 336a, portions 342b, 343b, 345b and 346b, and portions 342c, 343c, 345c and 346c are colored by Y, (Y+M) and M color data, respectively.

Figure 46:
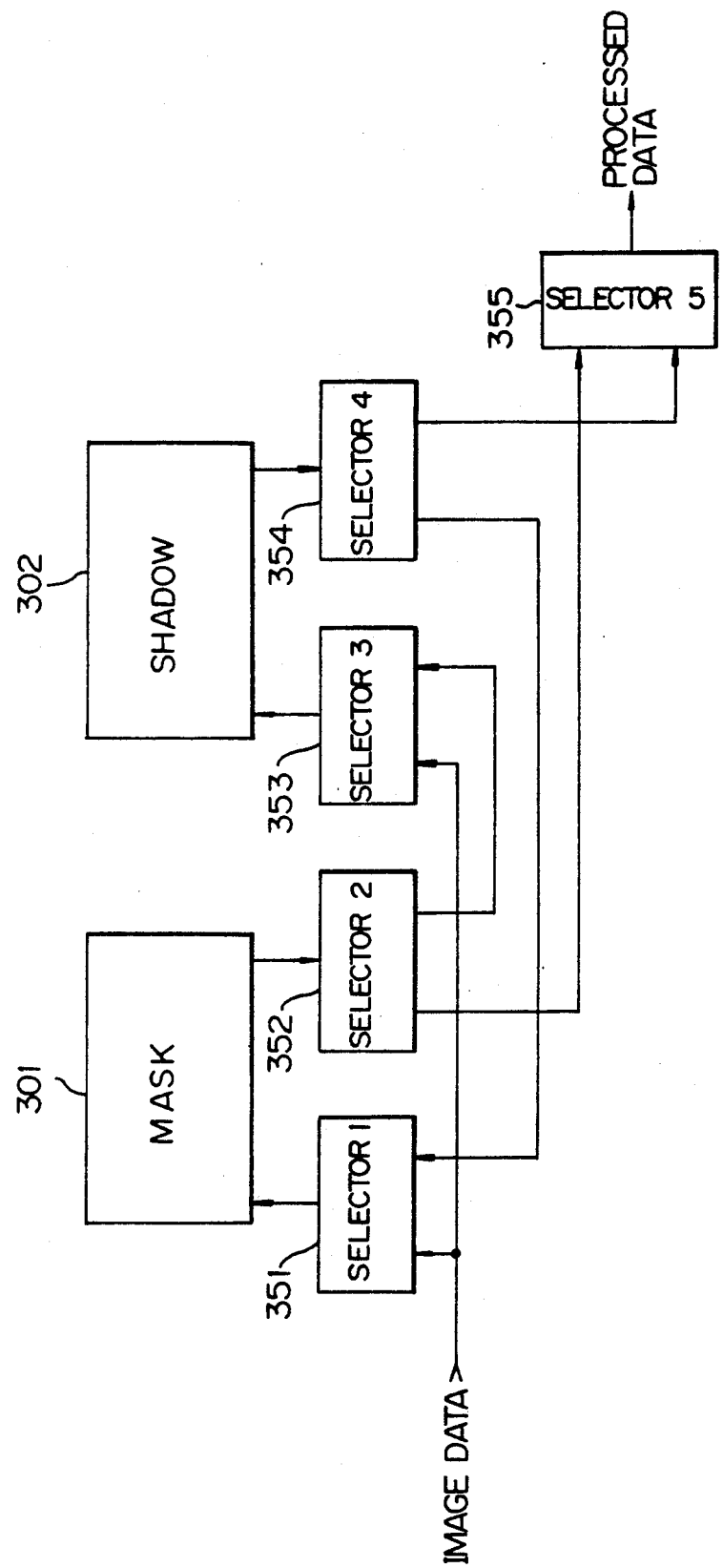
FIG. 46 is a block diagram schematically showing a specific construction of a circuit which allows mask processing and shadow processing to be executed as desired.

As stated above, the original image 330 or 340 may be processed by any desired combination of processing sequence and processing mode, i.e., the masked color mode and masked white mode processing and the plain and stereoscopic shadow processing to produce any one of the images (b) to (g) shown in each of FIGS. 44 and 45. FIG. 46 shows circuitry for selecting such an image, i.e., image processing schematically. As shown, the circuitry has five selectors 351 to 355 for selecting the sequence and processing of a mask processing section (circuit) 301 and a shadow processing section (circuit) 302.

Specifically, selectors 351 to 355 are used to select an input for mask processing, an output for mask processing, an input for shadow processing, an output for shadow processing, and an output for manipulation. More specifically, the processed images (b) and (e) shown in FIG. 44 are achievable by causing the selector 351 to select mask processing with the image data and causing the second selector 352 to select the selector 355. Likewise, the processed images (c), (d), (f) and (g) shown in FIG. 44 are achievable by causing the selector 351 to select mask processing, causing the selectors 352 and 353 to select shadow processing, and causing the selector 354 to select the selector 355. The processed images (b) and (e) shown in FIG. 45 may be produced by causing the selector 353 to select shadow processing with the input data, and causing the selector 354 to select the selector 355. Likewise, the processed images (c), (d), (f) and (g) shown in FIG. 45 are achievable by causing the selector 353 to select shadow processing, causing the selector 354 to select the selector 351, causing the selector 351 to select mask processing, and causing the selector 352 to select the selector 355.

Actual operations for executing the above-described processing are as follows.

Figure 47:
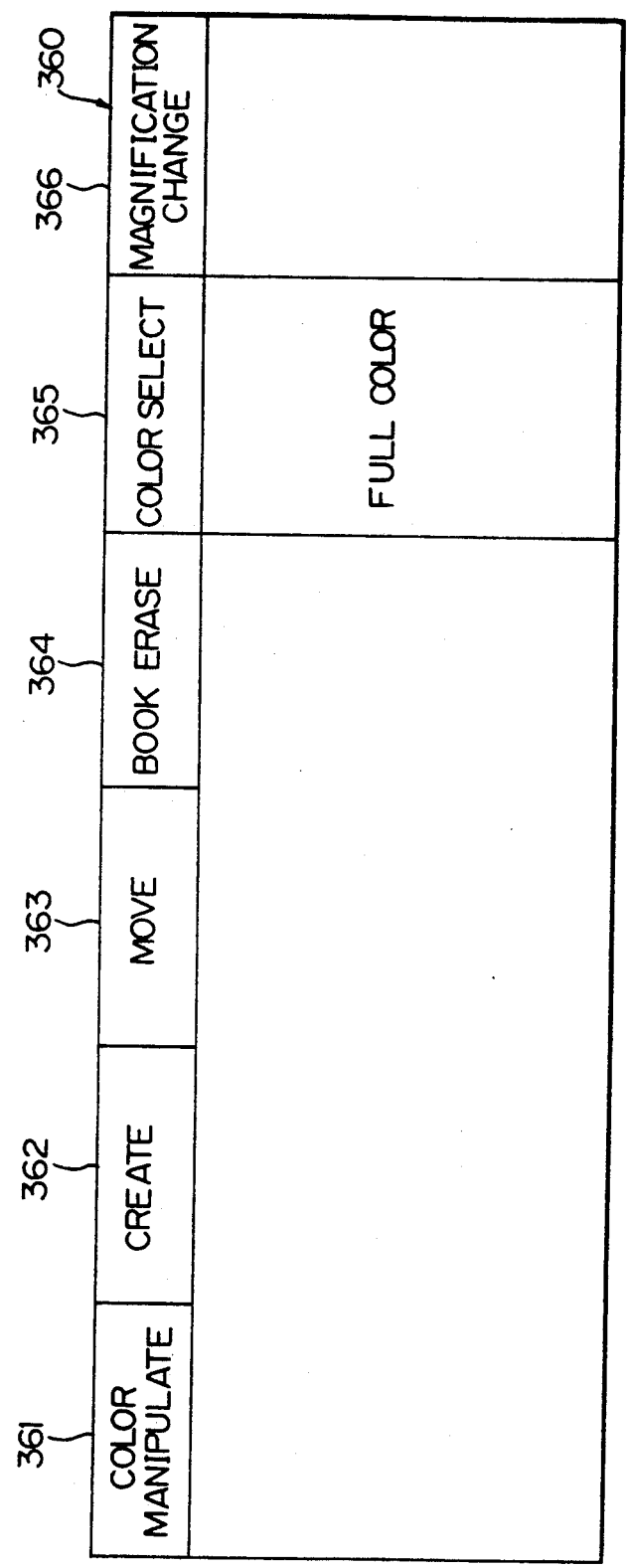
FIG. 47 is a plan view showing a menu being displayed.

An operation and display panel provided on a copier includes an area which is accessible for selecting desired processing on a menu. FIG. 47 shows a specific arrangement of such an exclusive area of the operation and display panel. The menu is implemented with a so-called touch panel having transparent switch elements arranged in a matrix on the front end of a display surface. The switch elements each perform a switching operation when the operator touches them lightly. As represented by the initial screen 360 in FIG. 47, the menu has a color manipulate key 361, a create key 362, a move key 363, a book erase key 364, a color key 365, and a magnification key 366.

Figure 48:
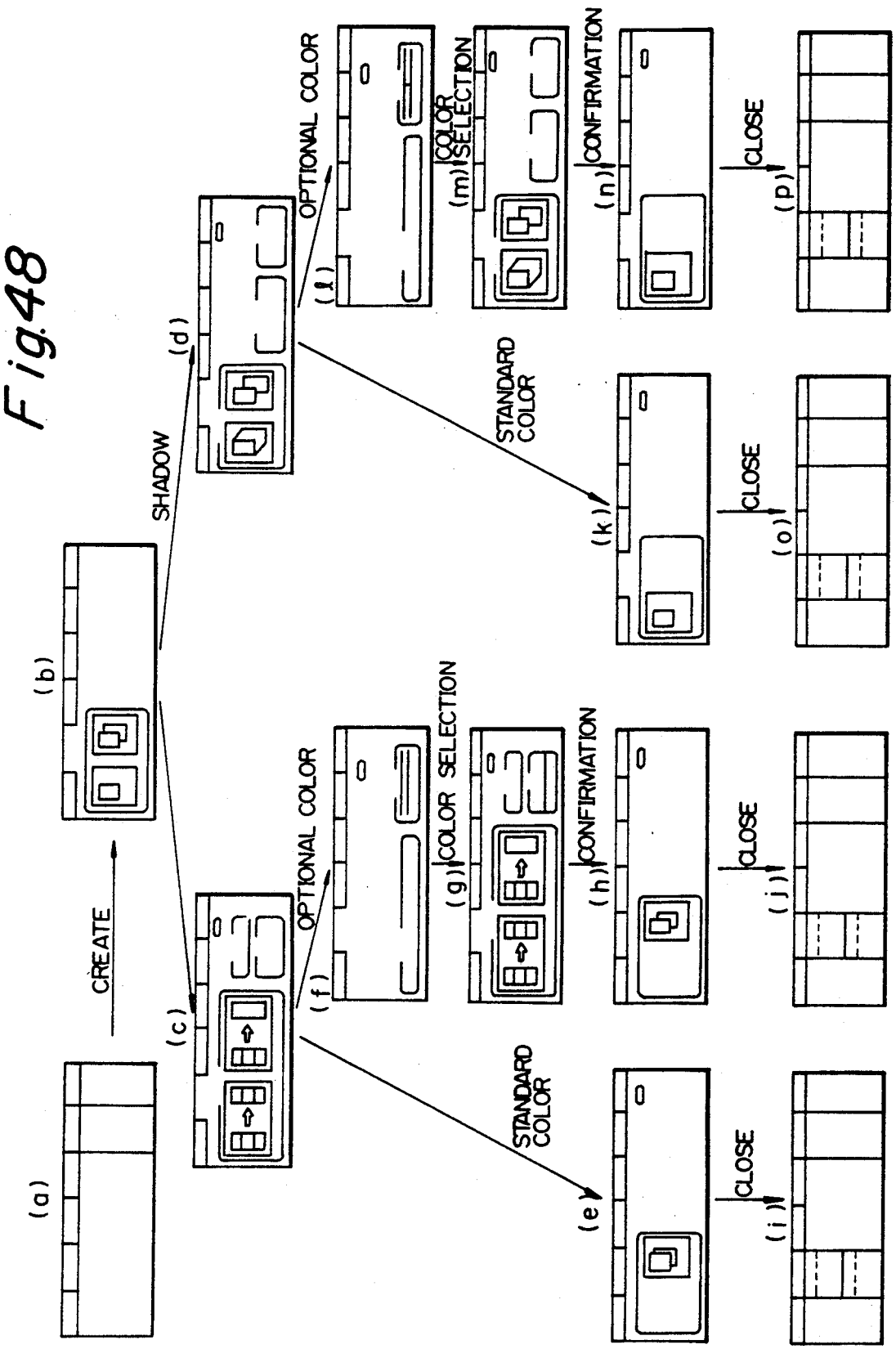
FIG. 48 shows a menu structure.
Figure 49:
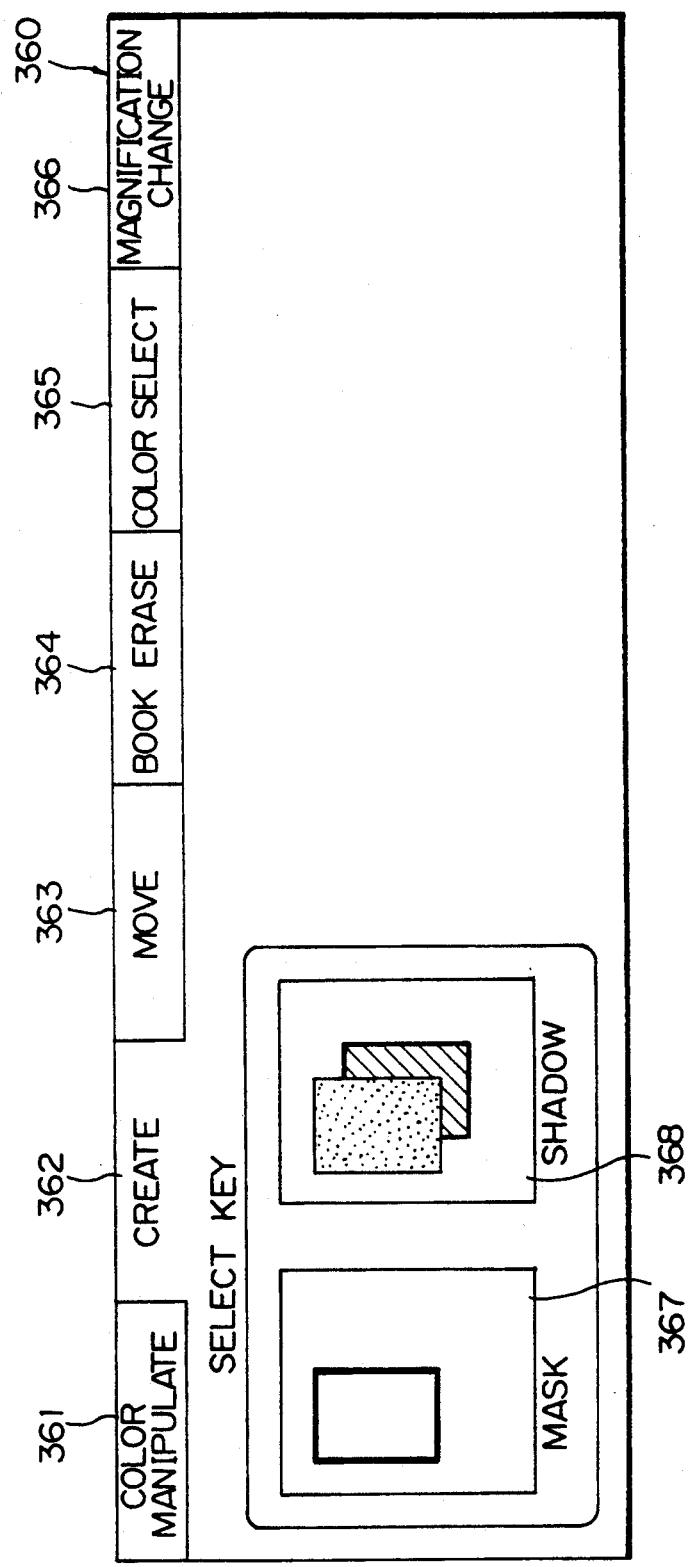
Figure 50:
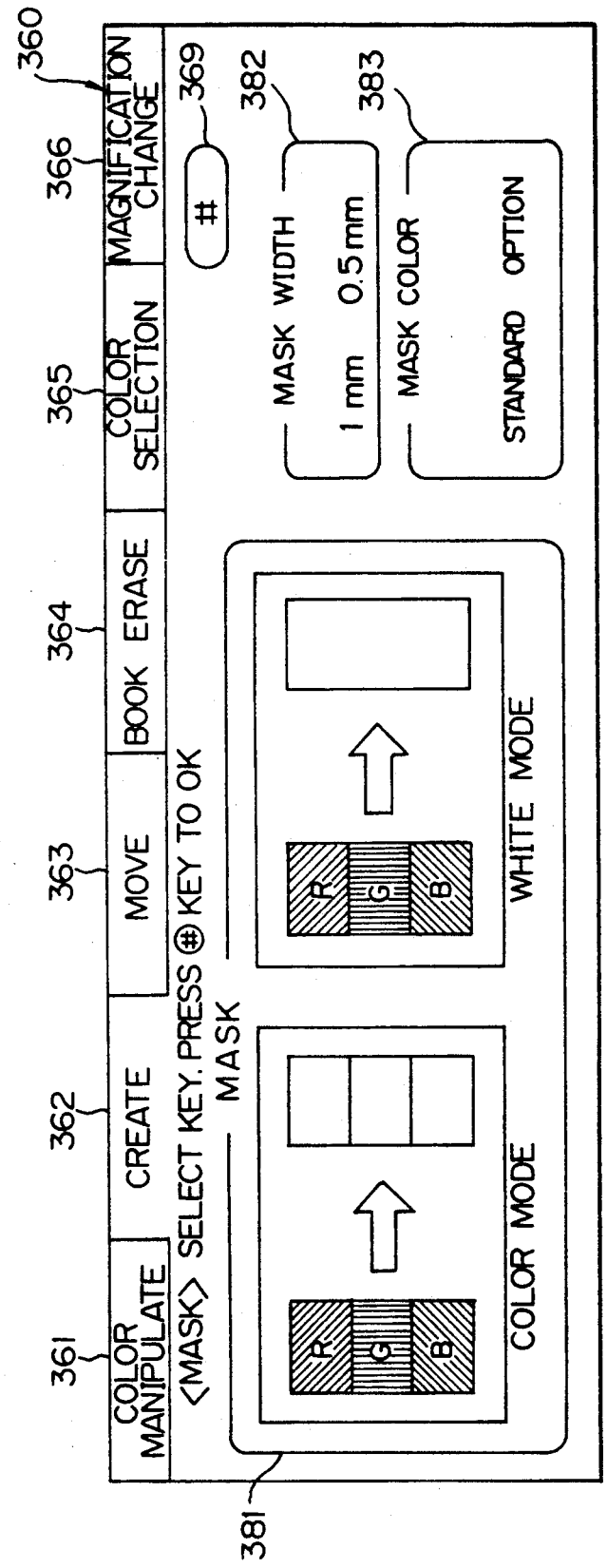
Figure 51:
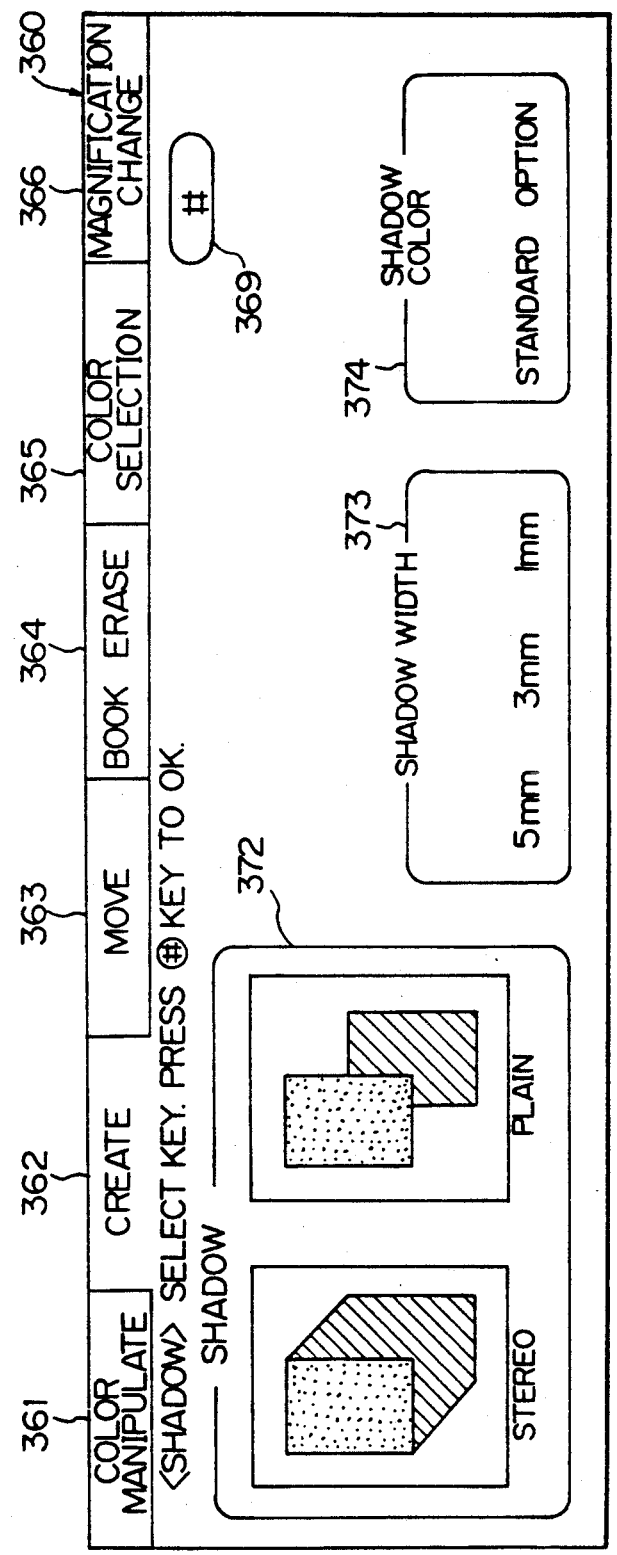
Figure 52:
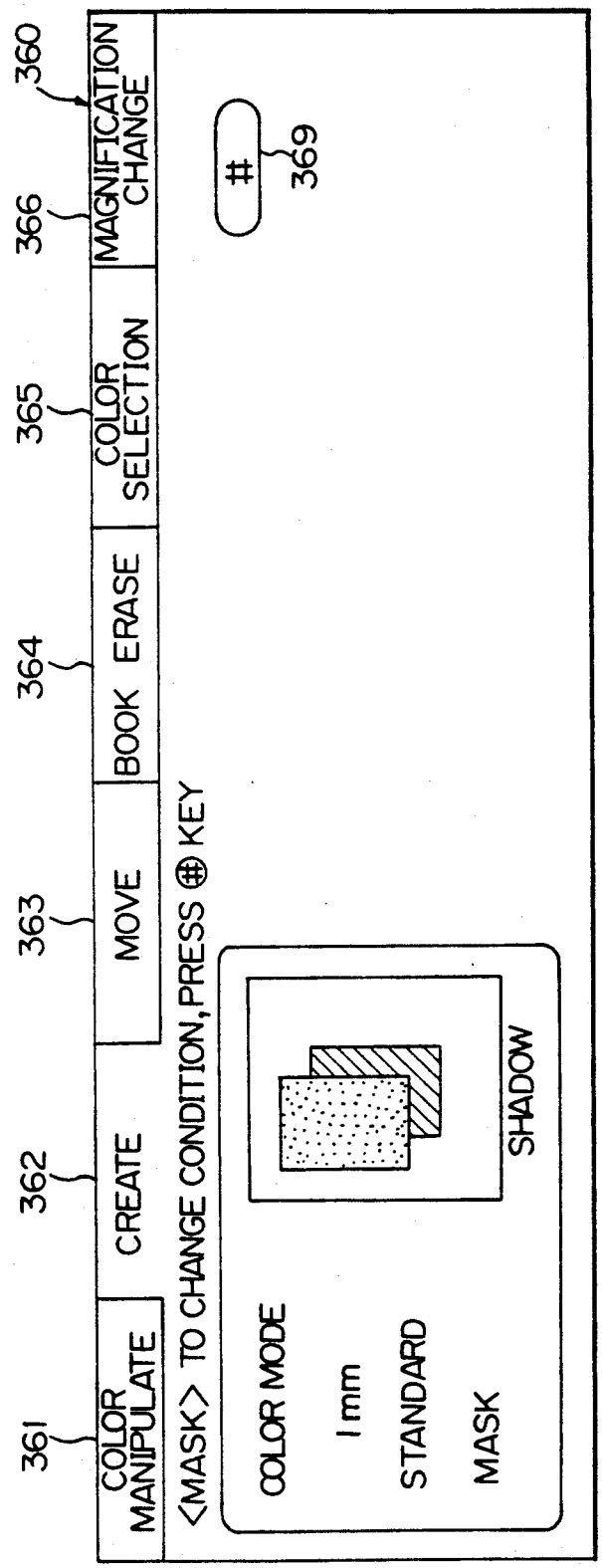

FIG. 48 shows a specific structure of the menu. As shown, when the create key 362 is pressed on the initial screen 360 ((a), FIG. 48), a mask key 367 and a shadow key 368 appear on the screen 360 ((b), FIG. 48). This is shown in an enlarged scale in FIG. 49. When the mask key 367 is pressed in the picture shown in FIG. 49, the picture changes to a picture (c) shown in FIG. 48 and shown in an enlarged scale in FIG. 50. When the shadow key 368 is pressed, a picture (d) shown in FIG. 48 appears. The picture (d) is shown in an enlarged scale in FIG. 51.

Assume that a shape key 381 is pressed to select a desired masking shape, a width key 382 is pressed to select a desired width, a color key 383 is pressed to select standard colors, and then a # key 369 is pressed. Then, a picture (e) shown in FIG. 48 appears on the screen. The words "standard colors" mentioned above refer to colors close to R, G, B, C, M, Y and Bk and in which shadows may be formed, e.g., light red for red and light yellow for yellow. On the other hand, assume that the shape key 381 and width key 382 are pressed, the color key 383 is pressed to select optional colors, and then the # key 369 is pressed. Then, a picture (f) shown in FIG. 48 appears. The picture (f) is shown in an enlarged scale in FIG. 53. The terms "optional colors" mean that all the associated shadows (auxiliary image) are colored in a desired same color, as stated earlier with reference to FIG. 30. Concerning the optional colors, shadow data associated with desired data can be outputted if the data of the data register 161 is outputted unconditionally with the data MASK2X of the mode selector 173C, FIG. 17, being neglected.

Figure 53:
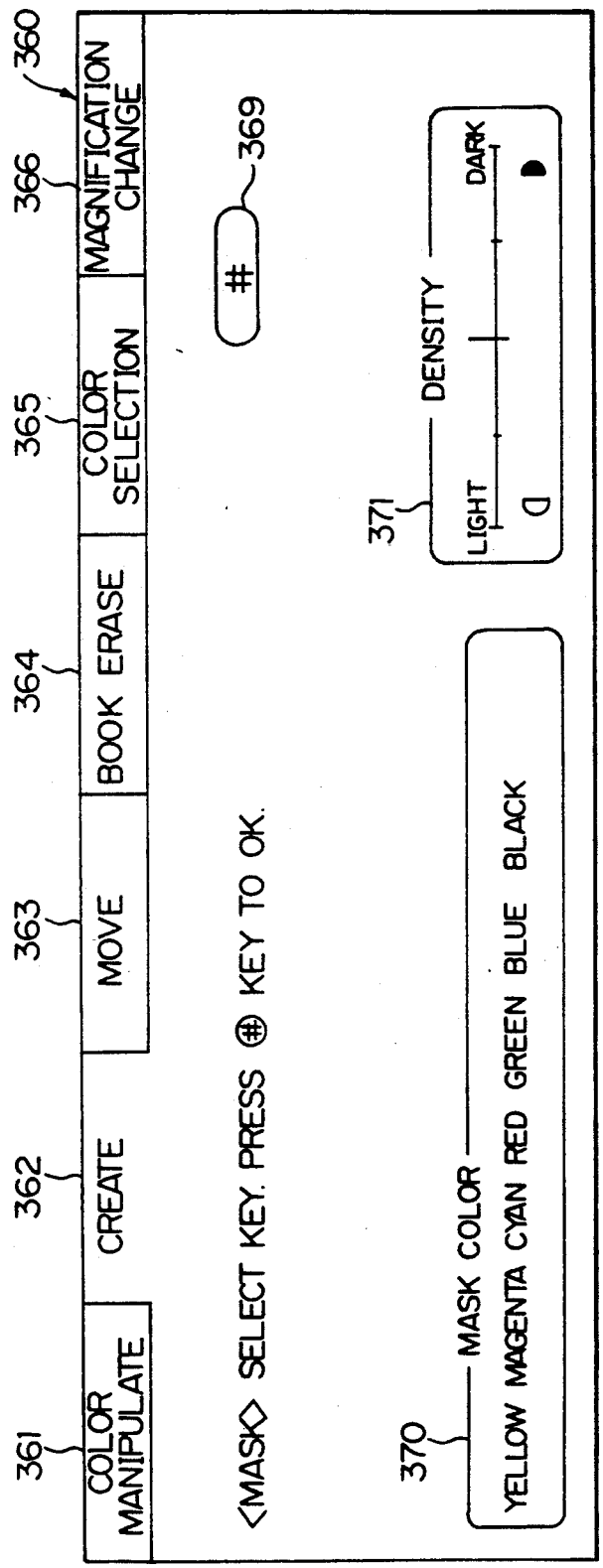
Figure 54:
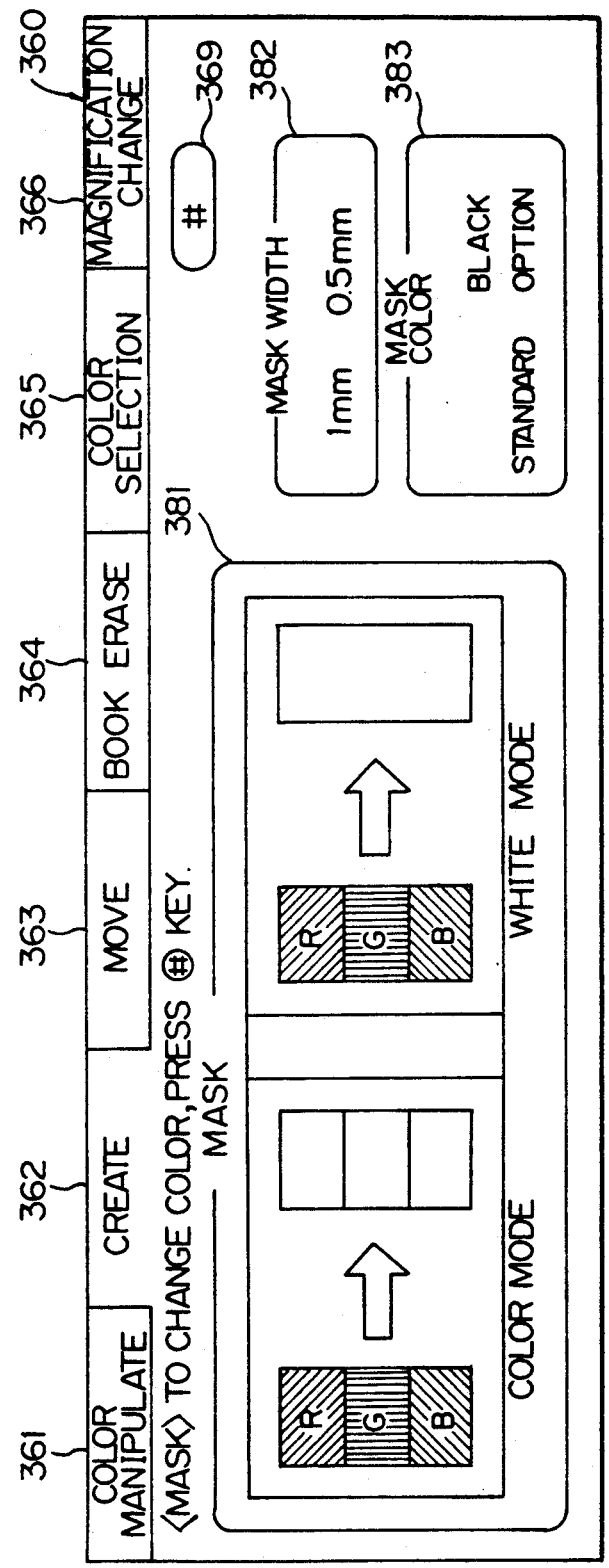
Figure 55:
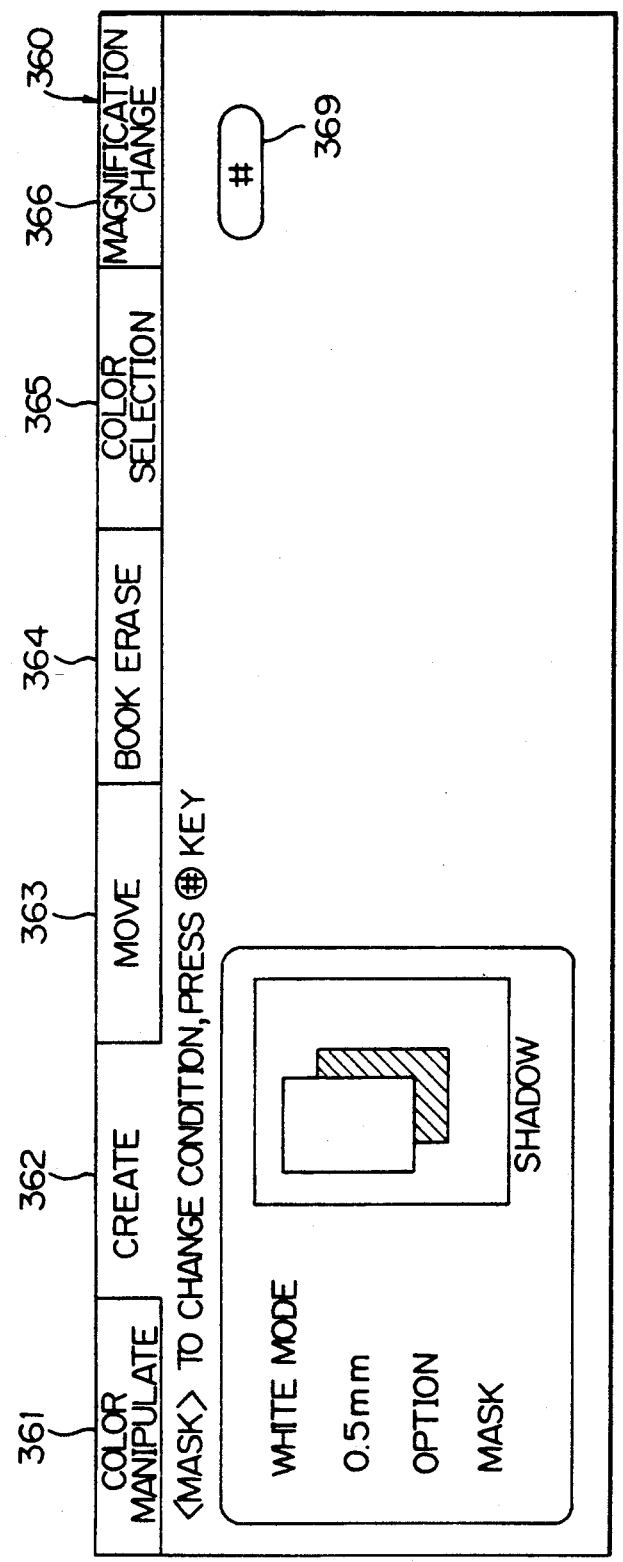

In the picture 360 shown in (f) of FIG. 48 and FIG. 53, a color key 370 for designating a masking color and a density key 371 for selecting density appear. When the keys 370 and 371 are pressed to select a desired masking color and density and, then, the # key 369 is pressed, a picture (g) shown in FIG. 48 and shown in an enlarged scale in FIG. 54 appears on the screen. In the picture (g), the mode selected in the picture (c) is inverted with respect to black and white so as display the color selected in the picture (f). If the operator does not intend to change the color, the operator presses the create key 362 with the result that a picture (h) shown in FIG. 48 appears. This picture (h) is shown in an enlarged scale in FIG. 55. If the operator desires to change the color, the operator may press the # key 368 to call the picture (f) again.

After the standard color mode or the optional color mode has been set on the screen 360, confirmation is made on the screen 360. Specifically, when the masking conditions are agreed to, the create key 362 is pressed with the result that a picture (i) (enlarged in FIG. 56) or a picture (j) (enlarged in FIG. 57) appears in place of the picture (e) or (h). When any of the marking condition is not agreed to, the # key 369 is pressed to call the picture (b) so as to perform the same sequence of steps again.

Figure 58:
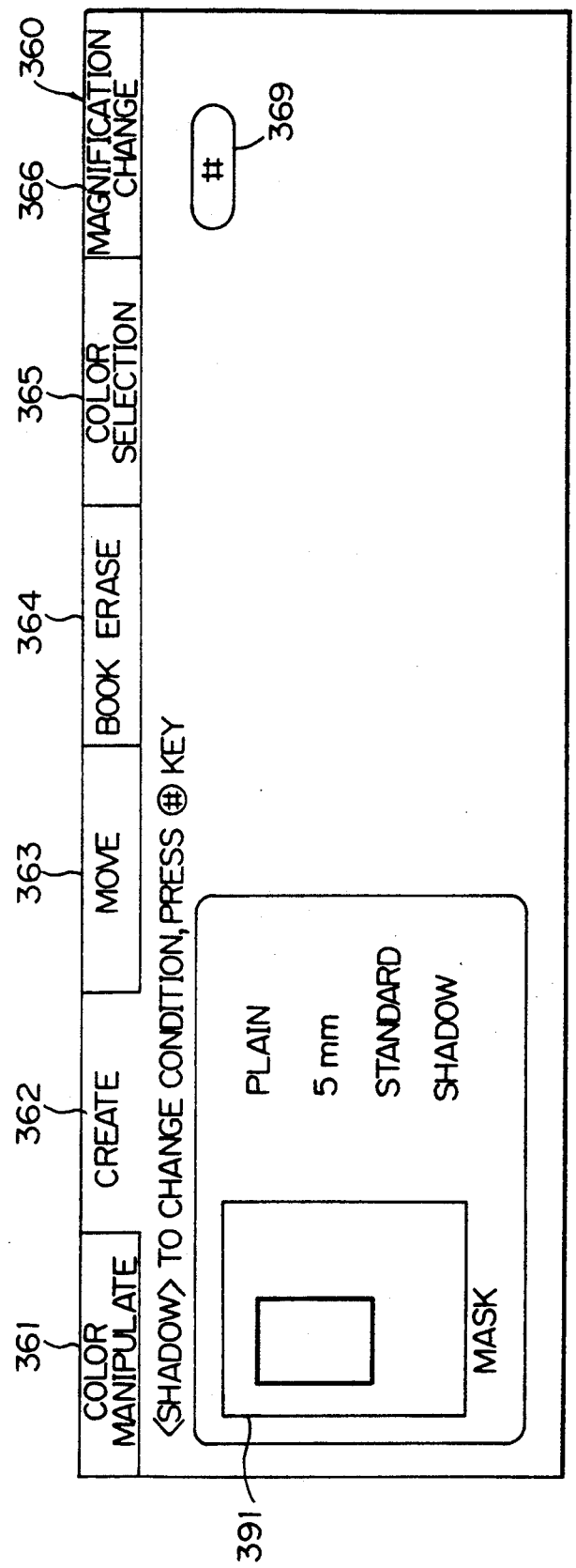
Figure 59:
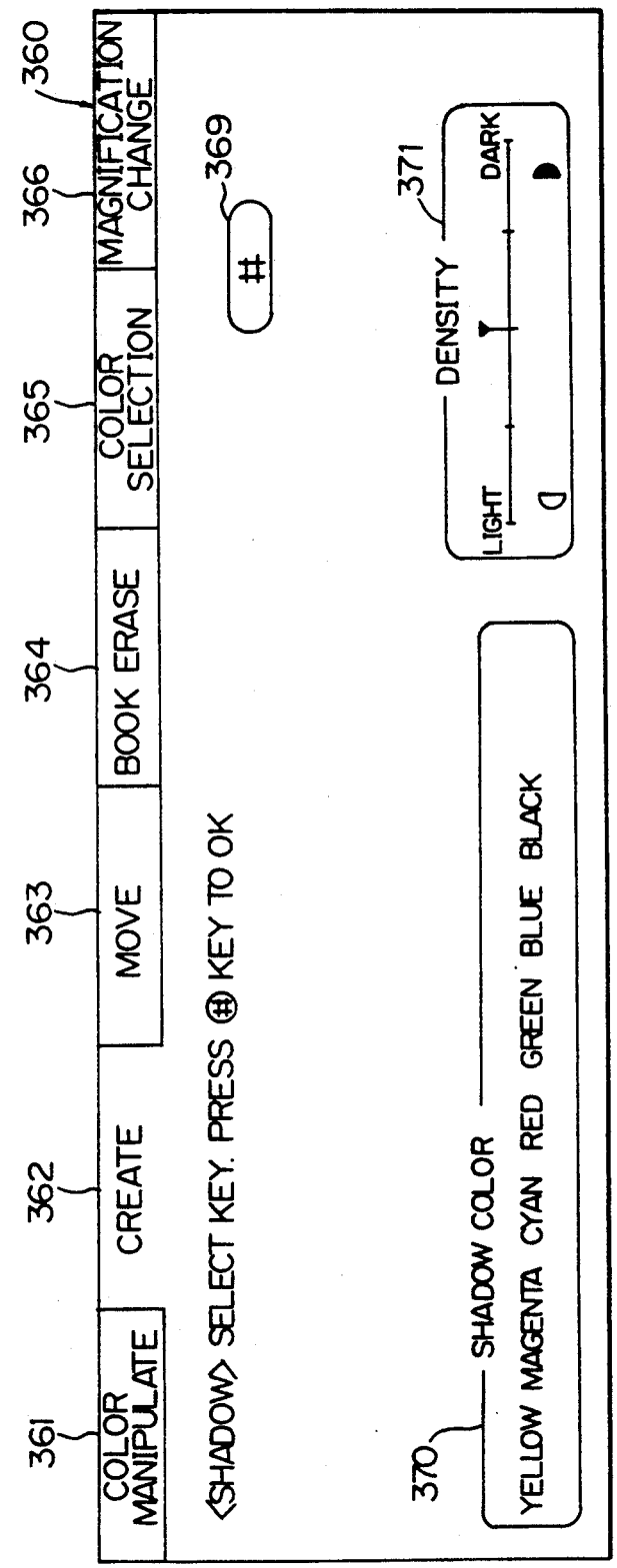
Figure 60:
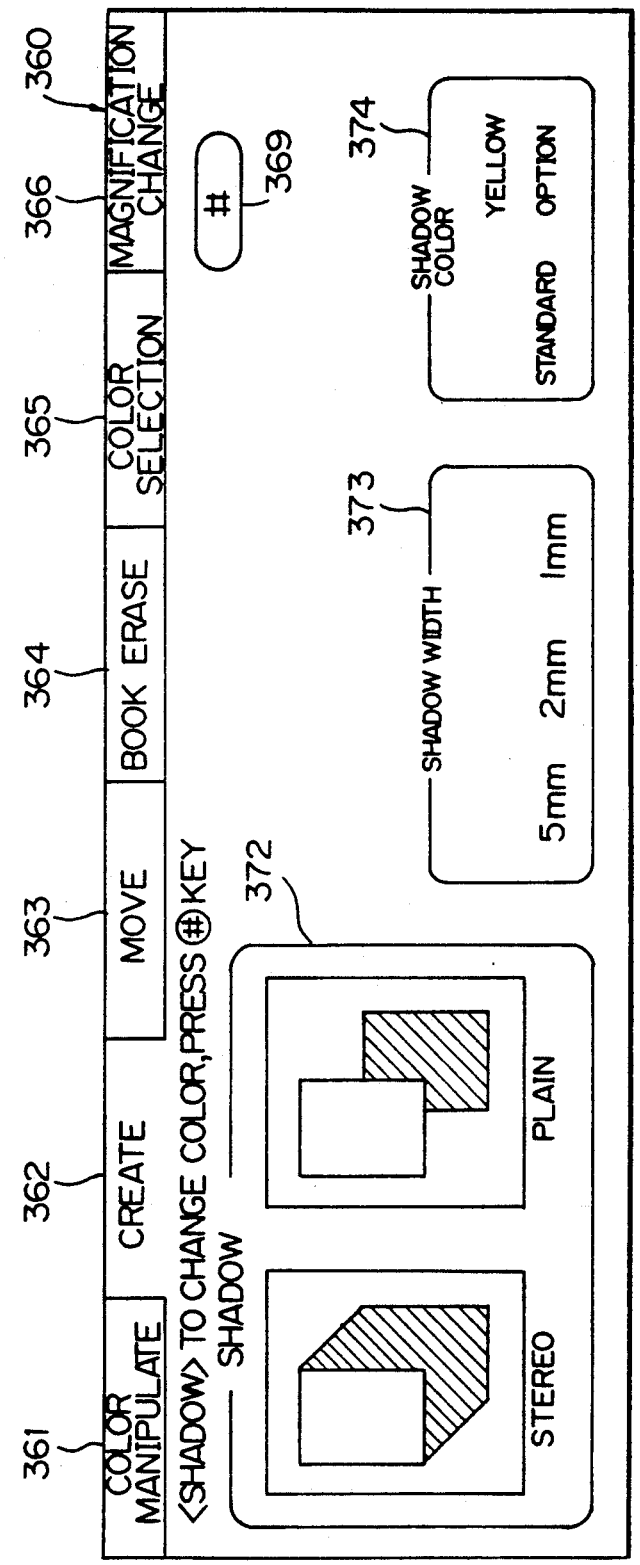
Figure 61:
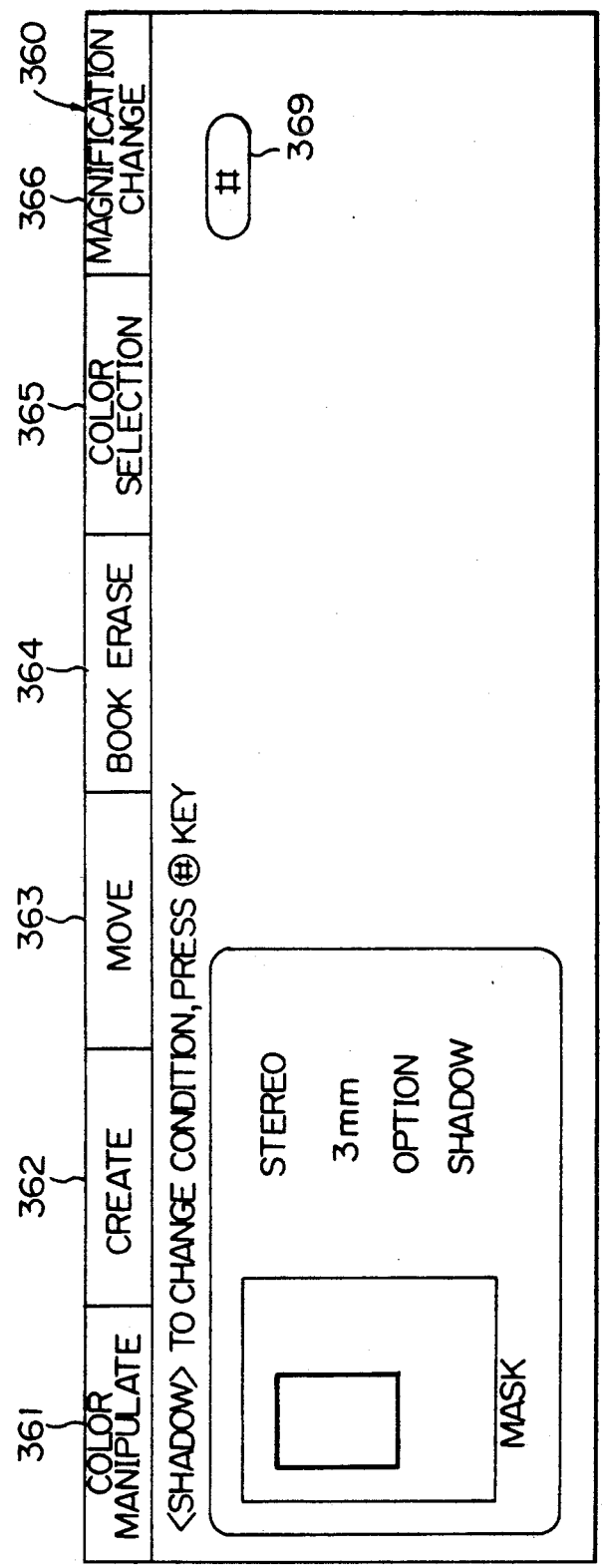

For shadow processing, the shape key 372 and width key 373 are pressed on the picture (d) (enlarged in FIG. 51) to select a shape and a width of a shadow. Thereafter, when the color key 374 is pressed to select standard colors and then the # key 369 is pressed, a picture (k) (enlarged in FIG. 58) appears. On the other hand, when the optional colors are selected, a picture (l) (enlarged in FIG. 59) appears on the operation of the # key 369. On the resultant screen 360, the color key 370 is pressed to select a color of a shadow and the density key 371 is pressed to select density of the color. As a result, the picture changes to a picture (m) (enlarged in FIG. 60). In the picture (m), there is indicated the color selected in the picture (f) with the mode selected in the picture (l) being inverted with respect to black and white. If the color of a shadow is not to be changed, the create key 362 is pressed to call a picture (n) (enlarged in FIG. 61).

On the screen (k) or (n), the create key 362 is pressed if the selected image processing conditions are not to be changed. As a result, a picture (o) (enlarged in FIG. 62) or a picture (p) (enlarged in FIG. 63) appears in place of the picture (k) or (n). In the conditions shown in the picture (o), plain shadow processing will be executed over a width of 5 millimeters. In the conditions shown in the picture (p), stereoscopic shadow processing will be executed over a width of 5 millimeters. When any of the processing conditions is to be changed, the # key 369 is pressed to call the picture (b).

Figure 64:
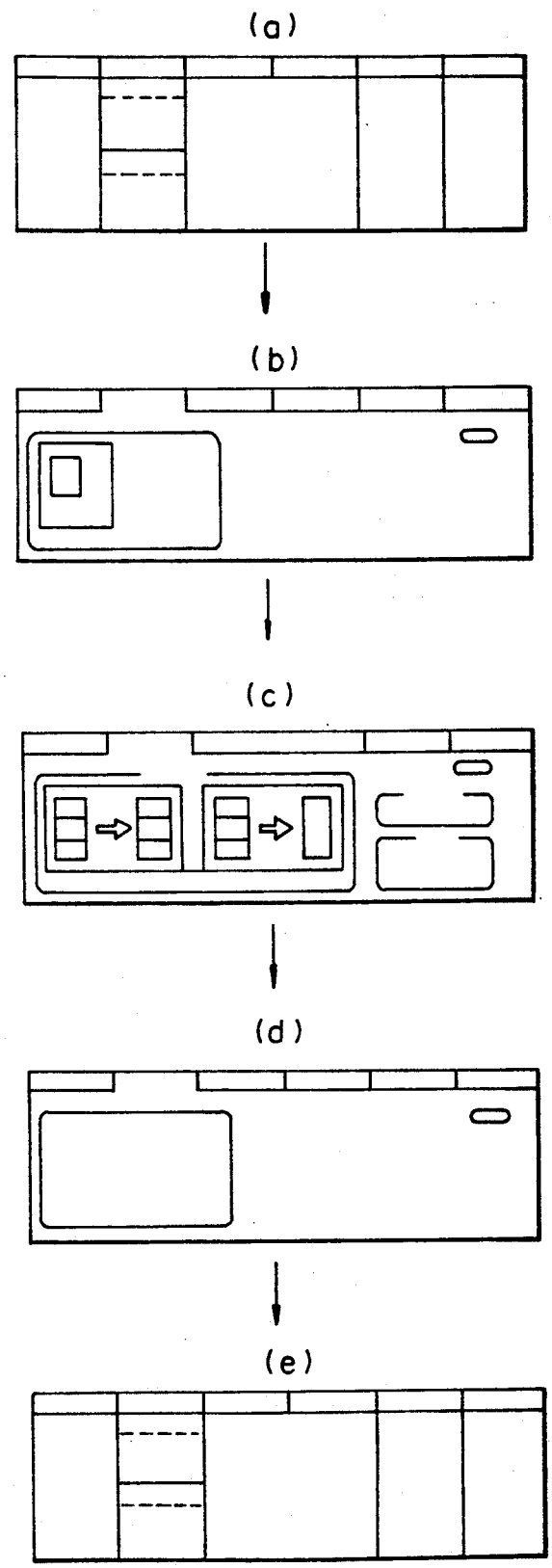
Figure 66:
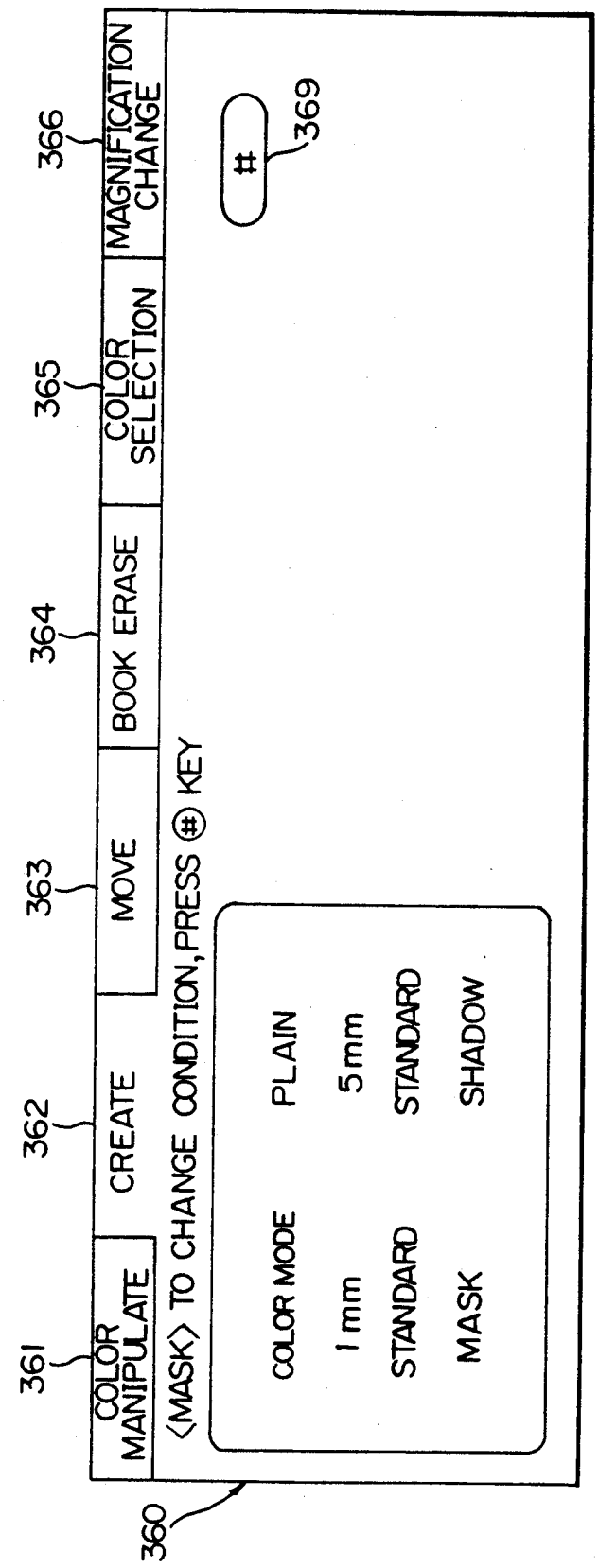

The menu structure shown in FIG. 48 allows the mask and shadow processing to be executed independently of each other. When such two different kinds of processing are to be combined as described with reference to FIGS. 44 and 45, menus shown in FIGS. 64 and 65 are used. Specifically, as shown in FIG. 64, when shadow and mask processing are to be executed in this order, a picture (a) identical with the picture (o) of FIG. 48, appears first. On the operation of the create key 362 on the picture (a), the picture changes from (a) to (b) (identical with (k) of FIG. 48). When a key portion 391 associated with masking is pressed in the picture (b), a picture (c) (identical with (c) of FIG. 48) appears so that masking may be selected to effect masking with an image with a shadow. When the mode key 381 is pressed in the picture (c) to select a color mode, for example, a picture (d) (enlarged in FIG. 66) is called. If the conditions indicated in the picture (d) are agreed to, the create key 362 is pressed with the result that a picture (e) (enlarged in FIG. 67) appears for confirmation. When any of the processing conditions is to be changed, the # key 369 is pressed to call the picture (d). In this manner, image processing stated earlier with reference to FIG. 45 is executed.

Figure 68:
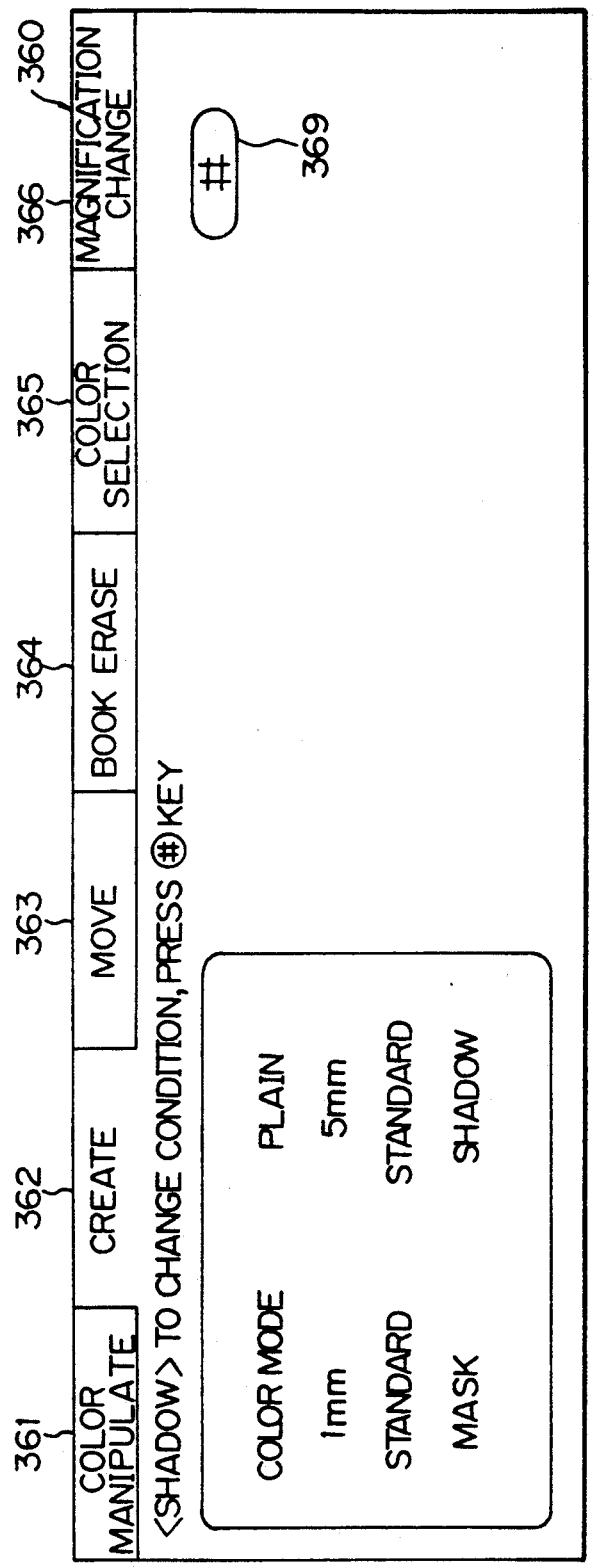

In the case that mask processing is to be executed prior to shadow processing, the menu shown in FIG. 65 is used. Assume that, in the color mode of a picture (a) shown in FIG. 65 (identical with (i) of FIG. 48), a masking condition is entered such that an image is masked except for a width of 1 millimeter. On the operation of the create key 362, a picture (b) (identical with (e) of FIG. 48) appears. When a key portion 382 associated with a shadow is pressed on the picture (b), shadow processing is selected and the picture changes from (b) to (c) (identical with (d) of FIG. 48). In the picture (c), a key portion associated with a shadow mode selection is pressed to select desired shadow modes. In this example, a plain shadow, a width of 5 millimeters, and standard colors are selected. As a result, a picture (d) (enlarged in FIG. 68) appears on the screen. If the modes in the picture (d) are agreed to, the create key 362 is pressed and, as a result, a picture (e) (enlarged in FIG. 69) appears for confirmation. If any of the modes in the picture (d) are not agreed to, the # key 369 is pressed to call the preceding picture. Such a procedure allows the image processing described with reference to FIG. 44 to be executed.

Of course, the specific shadow mode (plain or stereoscopic), color mode (standard or optional), mask mode (masked color or masked white) and mask or shadow width described above may be combined as desired to execute various kinds of processing.

In summary, the present invention has various unprecedented advantages, as follows.

When a color document image is masked or provided with a shadow, the resultant image is adequately colored.

A color image can be provided with a shadow in a predetermined direction and in colors which correspond to components constituting the color image and are free from mutual interference. The processed image, therefore, appears as natural as the original image to the eye.

A processed image masked and thinned color by color does not involve contradiction in color and, therefore, appears as natural as an original image.

An auxiliary image is processed with no contradiction in relation to an original image.

A processed image achieves a particular effect depending on which of mask processing and shadow processing is executed first.

Various modifications will become possible for those skilled in the art after receiving the teachings of the present disclosure without departing from the scope thereof.

What is claimed is:

1. An image processing apparatus comprising:
   reading means for reading a color image to produce multi-level data representative of said color image;
   binarizing means for binarizing the multi-level data read by the reading means color component by color component;
   storing means for storing the binarized multi-level data binarized by said binarizing means;
   operational control means for causing said reading means and said storing means to operate on a real time basis;
   moving means for moving each binary data of a particular color component produced by said binarizing means in a predetermined direction; and
   combining means for combining the binary data of the color components and moved data produced by said moving means.

2. An image processing apparatus comprising:
   reading means for reading a color image to produce multi-level image data representative of said color image;
   storing means for binarizing the multi-level image data read by the reading means color by color to generate binarized image data and storing said binarized image data,
   operating means for performing logical operations with the binarized data stored in said storing means by referencing individual colors;
   operation processing means for forming an auxiliary image on the basis of results of operations produced by said operating means, wherein said operation processing means forms said auxiliary image by executing mask processing and then shadow processing;

recording means for recording said auxiliary image; and operation control means for causing said reading means said storing means, said operating means, said operation processing means, and said recording means to operate on a real time basis.

3. An image processing apparatus comprising:

reading means for reading a color image to produce multi-level image data representative of said color image;

storing means for binarizing the multi-level image data read by the reading means color by color to generate binarized image data and storing said binarized image data;

operating means for performing logical operations with the binarized data stored in said storing means by referencing individual colors;

operation processing means for forming an auxiliary image on the basis of operations produced by said operating means, wherein said operation processing means forms said auxiliary image by executing shadow processing and then mask processing;

recording means for recording said auxiliary image; and operation control means for causing said reading means, said storing means, said operating means, said operation processing means, and said recording means to operate on a real time basis.

4. A color image data processing apparatus comprising:

inputting means for receiving color image data while separating said color image data on a color basis;

mask signal generating means receiving said separated color image data for determining a difference of colors from said separated color image data to thereby generate mask signals from respective image data of different colors;

image processing means for delaying the image data of the same color together with the mask signal associated with said image data line by line and combining the image data of various colors having been masked; and outputting means for outputting the image data processed by said image processing means.

5. An apparatus as claimed in claim 4, further comprising:

shadow processing means for providing a shadow of a selected color; and operating means for selecting one of a standard color mode in which said shadow processing means gives a shadow of the same color as the image data and a designated color mode in which said shadow processing means gives a shadow of a different color from the image data;

said image processing means delaying the image data of original colors when said operating means selects said standard color mode or delaying the image data whose colors have been changed in said designated color mode.

6. An apparatus as claimed in claim 4, wherein said inputting means comprises reading means.

7. An apparatus as claimed in claim 4, wherein said outputting means comprises writing means.

8. An apparatus as claimed in claim 4, wherein said inputting means and said outputting means comprise reading means and writing means, respectively.

9. A color image data processing apparatus comprising:

inputting means for receiving color image data while separating said color image data on a color basis;

mask signal generating means receiving said separated color image data for determining a difference of colors to thereby generate mask signals from respective image data of the same colors;

image processing means for effecting shadow processing with the color image data on the basis of said mask signals; and outputting means for outputting color by color the color image data processed by said image processing means.

10. An apparatus as claimed in claim 9, wherein said inputting means comprises reading means.

11. An apparatus as claimed in claim 9, wherein said outputting means comprises writing means.

12. An apparatus as claimed in claim 9, wherein said inputting means and said outputting means comprise reading means and writing means, respectively.

13. A color image data processing apparatus comprising:

inputting means for receiving multi-level color image data while separating said multi-level color image data on a color basis;

converting means for converting the multi-level color image data to bi-level color image data color by color;

mask signal generating means receiving said separated and converted bi-level color image data for determining a difference of colors to thereby generate mask signals from respective bi-level color image data of the same colors;

image processing means for effecting shadow processing with the color image data on the basis of said mask signals; and outputting means for outputting the color image data processed by said image processing means while separating said color image data on a color basis.

14. An apparatus as claimed in claim 13, wherein said inputting means comprises reading means.

15. An apparatus as claimed in claim 13, wherein said outputting means comprises writing means.

16. An apparatus as claimed in claim 15, wherein said inputting means and said outputting means comprise reading means and writing means, respectively.

17. A color image data processing apparatus comprising:

inputting means for inputting color image data while separating said color image data on a color basis;

operating means for selecting either of a white mode and a color mode;

mask signal generating means for discriminating, in said white mode, white and other colors to thereby generate mask signals from respective color image data other than white or determining, in said color mode, a difference of colors to thereby generate mask signals from the respective color image data of the same colors;

image processing means for effecting image processing with the color image data on the basis of said mask signals; and outputting means for outputting the color image data processed by said image processing means while separating said color image data on a color basis.

18. An apparatus as claimed in claim 17, wherein said image processing shadow processing.

19. An apparatus as claimed in claim 17, wherein said inputting means comprises reading means.

20. An apparatus as claimed in claim 17, wherein said outputting means comprises writing means.

21. An apparatus as claimed in claim 17, wherein said inputting means and said outputting means comprise reading means and writing means, respectively.

22. A color image data processing apparatus comprising:
   inputting means for inputting multi-level color image data while separating said multi-level color image data on a color basis;
   converting means for converting the multi-level color image data to bi-level color image data color by color;
   operating means for selecting either of a white mode and a color mode;
   mask signal generating means for discriminating, in said white mode, white and other colors to thereby generate mask signals from respective bi-level color image data other than white or determining, in said color mode, a difference of tints to thereby generate mask signals from the respective bi-level color image data of the same colors;
   image processing means for effecting image processing with the bi-level color image data on the basis of said mask signals; and
   outputting means for outputting the color image data processed by said image processing means while separating said color image data on a color basis.

23. An apparatus as claimed in claim 22, wherein said image processing comprises shadow processing.

24. An apparatus as claimed in claim 22, wherein said inputting means comprises reading means.

25. An apparatus as claimed in claim 22, wherein said outputting means comprises writing means.

26. An apparatus as claimed in claim 22, wherein said inputting means and said outputting means comprise reading means and writing means, respectively.

27. An image processing apparatus comprising:
   reading means for reading a color image to produce multi-level image data representative of said color image;
   storing means for binarizing the multi-level image data read by the reading means color by color to generate binarized image data and storing said binarized image data;
   operating means for performing logical operations with the binarized data stored in said storing means by referencing individual colors;
   operation processing means for forming an auxiliary image on the basis of results of operations produced by said operating means, wherein said operation processing means forms said auxiliary image by executing mask processing and then shadow processing; and
   recording means for recording said auxiliary image.

28. An image processing apparatus comprising:
   reading means for reading a color image to produce multi-level image data representative of said color image;
   storing means for binarizing the multi-level image data read by the reading means color by color to generate binarized image data and storing said binarized image data;
   operating means for performing logical operations with the binarized data stored in said storing means by referencing individual colors;
   operation processing means for forming an auxiliary image on the basis of operations produced by said operating means, wherein said operation processing means forms said auxiliary image by executing shadow processing and then mask processing; and
   recording means for recording said auxiliary image.

* * * * *